United States Patent
Bailey et al.

(10) Patent No.: US 9,680,868 B2
(45) Date of Patent: Jun. 13, 2017

(54) SYSTEMS AND METHODS FOR MATCHING AND SCORING SAMENESS

(71) Applicant: NuData Security Inc., Vancouver (CA)

(72) Inventors: Christopher Everett Bailey, Langley (CA); Randy Lukashuk, Errington (CA); Gary Wayne Richardson, Port Moody (CA)

(73) Assignee: NuData Security Inc., Vancouver (CA)

( * ) Notice: Subject to any disclaimer, the term of this patent is extended or adjusted under 35 U.S.C. 154(b) by 0 days.

(21) Appl. No.: 15/256,616

(22) Filed: Sep. 4, 2016

(65) Prior Publication Data

US 2017/0070526 A1    Mar. 9, 2017

Related U.S. Application Data

(60) Provisional application No. 62/214,969, filed on Sep. 5, 2015.

(51) Int. Cl.
*H04L 29/06* (2006.01)
*H04L 29/08* (2006.01)
(Continued)

(52) U.S. Cl.
CPC ............ *H04L 63/1466* (2013.01); *G06F 7/08* (2013.01); *G06F 17/3033* (2013.01);
(Continued)

(58) Field of Classification Search
CPC  H04L 63/1425; H04L 63/1433; G06F 21/577
(Continued)

(56) References Cited

U.S. PATENT DOCUMENTS

| 5,774,525 A | 6/1998 | Kanevsky et al. |
| 5,940,751 A * | 8/1999 | Kaplan .................... G06K 9/00 455/405 |

(Continued)

FOREIGN PATENT DOCUMENTS

| CA | 2426168 A1 | 5/2002 |
| JP | 2008/052727 A | 3/2008 |

(Continued)

OTHER PUBLICATIONS

U.S. Appl. No. 12/935,927, filed Oct. 1, 2010, Bailey.
(Continued)

*Primary Examiner* — Ellen Tran
(74) *Attorney, Agent, or Firm* — Wolf, Greenfield & Sacks, P.C.

(57) ABSTRACT

Systems and methods for matching and scoring sameness. In some embodiments, a computer-implemented method is provided, comprising acts of: identifying an anchor value X from the digital interaction; identifying, in a record of the digital interaction, a data structure associated with an anchor type T of the anchor value, wherein a plurality of anchor values of the anchor type T are divided into a plurality of buckets of anchor values; identifying a bucket B of the plurality of buckets of anchor values, wherein the anchor value X falls into the bucket B; and operating on the data structure associated with the anchor type T to indicate that at least one anchor value from the bucket B has been observed in connection with the digital interaction.

24 Claims, 23 Drawing Sheets

(51) Int. Cl.
*G06F 17/30* (2006.01)
*H04L 12/24* (2006.01)
*G06F 21/60* (2013.01)
*G06F 7/08* (2006.01)
*H04L 12/26* (2006.01)

(52) U.S. Cl.
CPC .... *G06F 17/3053* (2013.01); *G06F 17/30598* (2013.01); *G06F 17/30867* (2013.01); *G06F 21/602* (2013.01); *H04L 41/20* (2013.01); *H04L 43/12* (2013.01); *H04L 43/16* (2013.01); *H04L 63/1416* (2013.01); *H04L 63/1425* (2013.01); *H04L 67/02* (2013.01); *H04L 67/303* (2013.01)

(58) Field of Classification Search
USPC .......................................................... 726/25
See application file for complete search history.

(56) References Cited

U.S. PATENT DOCUMENTS

| | | | |
|---|---|---|---|
| 6,829,711 | B1 | 12/2004 | Kwok et al. |
| 7,680,891 | B1 | 3/2010 | Pongsajapan |
| 7,945,952 | B1 | 5/2011 | Behforooz |
| 8,001,597 | B2 | 8/2011 | Crooks |
| 8,082,349 | B1 | 12/2011 | Bhargava et al. |
| 8,386,393 | B2 | 2/2013 | Michelsen et al. |
| 8,510,795 | B1 | 8/2013 | Gargi |
| 8,898,766 | B2 | 11/2014 | Garmark et al. |
| 9,256,715 | B2 | 2/2016 | Draluk et al. |
| 9,275,215 | B2 | 3/2016 | Bailey |
| 9,378,354 | B2 | 6/2016 | Bailey |
| 9,485,118 | B1 | 11/2016 | Atlas et al. |
| 2003/0101357 | A1 | 5/2003 | Ronen et al. |
| 2004/0254793 | A1 | 12/2004 | Herley et al. |
| 2005/0097320 | A1 | 5/2005 | Golan et al. |
| 2005/0114705 | A1 | 5/2005 | Reshef et al. |
| 2005/0144067 | A1 | 6/2005 | Farahat et al. |
| 2005/0209974 | A1 | 9/2005 | Okunseinde |
| 2006/0206941 | A1 | 9/2006 | Collins |
| 2006/0212931 | A1 | 9/2006 | Shull et al. |
| 2006/0230039 | A1 | 10/2006 | Shull et al. |
| 2006/0282660 | A1 | 12/2006 | Varghese et al. |
| 2007/0043681 | A1 | 2/2007 | Morgan et al. |
| 2007/0124201 | A1 | 5/2007 | Hu et al. |
| 2007/0124806 | A1 | 5/2007 | Shulman et al. |
| 2007/0226053 | A1 | 9/2007 | Carl et al. |
| 2008/0040285 | A1 | 2/2008 | Wakmueller |
| 2008/0114885 | A1* | 5/2008 | Kulkarni ............... G06Q 40/00 709/229 |
| 2008/0127302 | A1 | 5/2008 | Qvarfordt et al. |
| 2008/0133321 | A1 | 6/2008 | Pennock et al. |
| 2008/0133347 | A1 | 6/2008 | Josifovski et al. |
| 2008/0133348 | A1 | 6/2008 | Reed et al. |
| 2008/0162338 | A1* | 7/2008 | Samuels ............... G06F 21/40 705/38 |
| 2008/0189768 | A1 | 8/2008 | Callahan et al. |
| 2008/0301040 | A1 | 12/2008 | Knudson et al. |
| 2009/0012855 | A1 | 1/2009 | Jamal et al. |
| 2009/0019182 | A1 | 1/2009 | Riise et al. |
| 2009/0113294 | A1 | 4/2009 | Sanghavi et al. |
| 2009/0138723 | A1 | 5/2009 | Nyang et al. |
| 2009/0249477 | A1 | 10/2009 | Punera |
| 2009/0328163 | A1 | 12/2009 | Preece |
| 2010/0077482 | A1 | 3/2010 | Adams |
| 2011/0016052 | A1 | 1/2011 | Scragg |
| 2011/0016534 | A1 | 1/2011 | Jakobsson et al. |
| 2011/0029902 | A1 | 2/2011 | Bailey |
| 2011/0047605 | A1 | 2/2011 | Sontag et al. |
| 2011/0247071 | A1 | 10/2011 | Hooks et al. |
| 2012/0096557 | A1 | 4/2012 | Britton et al. |
| 2012/0207046 | A1 | 8/2012 | DiPietro et al. |
| 2012/0310838 | A1 | 12/2012 | Harris et al. |
| 2013/0239206 | A1 | 9/2013 | Draluk et al. |
| 2013/0276125 | A1 | 10/2013 | Bailey |
| 2013/0339186 | A1 | 12/2013 | French et al. |
| 2014/0317750 | A1 | 10/2014 | Bailey |
| 2014/0317751 | A1 | 10/2014 | Bailey |
| 2014/0325657 | A1 | 10/2014 | Bailey |
| 2014/0380448 | A1 | 12/2014 | Bailey |
| 2015/0106888 | A1* | 4/2015 | Cheng ............... G06F 21/62 726/5 |
| 2016/0180557 | A1 | 6/2016 | Yousaf et al. |
| 2016/0359872 | A1 | 12/2016 | Yadav et al. |

FOREIGN PATENT DOCUMENTS

| | | |
|---|---|---|
| WO | WO 01/80525 A1 | 10/2001 |
| WO | WO 2005/119648 A2 | 12/2005 |
| WO | WO 2007/136665 A2 | 11/2007 |
| WO | WO 2008/025019 A1 | 2/2008 |
| WO | WO 2008/027642 A2 | 3/2008 |
| WO | WO 2009/122302 A2 | 10/2009 |

OTHER PUBLICATIONS

U.S. Appl. No. 14/218,824, filed Mar. 18, 2014, Bailey.
U.S. Appl. No. 14/218,839, filed Mar. 18, 2014, Bailey.
U.S. Appl. No. 14/481,698, filed Sep. 9, 2014, Bailey.
U.S. Appl. No. 13/834,733, filed Mar. 15, 2013, Bailey.
U.S. Appl. No. 14/218,806, filed Mar. 18, 2014, Bailey.
U.S. Appl. No. 15/256,607, Sep. 4, 2016, Bailey.
U.S. Appl. No. 15/256,610, filed Sep. 4, 2016, Bailey.
U.S. Appl. No. 15/256,611, filed Sep. 4, 2016, Bailey.
U.S. Appl. No. 15/256,597, filed Sep. 4, 2016, Bailey.
U.S. Appl. No. 15/256,600, filed Sep. 4, 2016, Bailey.
U.S. Appl. No. 15/256,603, filed Sep. 4, 2016, Bailey.
U.S. Appl. No. 15/256,612, filed Sep. 4, 2016, Bailey.
U.S. Appl. No. 15/256,613, filed Sep. 4, 2016, Bailey.
U.S. Appl. No. 15/256,617, filed Sep. 4, 2016, Bailey.
EP 09727261.1, Mar. 7, 2012, Extended European Search Report.
EP 14765198.8, Sep. 13, 2016, Extended European Search Report.
PCT/IB2009/005645, Sep. 2, 2009, Invitation to Pay Additional Fees.
PCT/IB2009/005645, Nov. 20, 2009, International Search Report and Written Opinion.
PCT/IB2009/005645, Oct. 14, 2010, International Preliminary Report on Patentability.
PCT/CA2014/050229, Jun. 17, 2014, International Search Report and Written Opinion.
PCT/CA2014/050229, Sep. 24, 2015, International Preliminary Report on Patentability.
U.S. Appl. No. 15/256,607, filed Sep. 4, 2016, Bailey et al.
U.S. Appl. No. 15/256,610, filed Sep. 4, 2016, Bailey et al.
U.S. Appl. No. 15/256,611, filed Sep. 4, 2016, Bailey et al.
U.S. Appl. No. 15/256,597, filed Sep. 4, 2016, Bailey et al.
U.S. Appl. No. 15/256,600, filed Sep. 4, 2016, Bailey et al.
U.S. Appl. No. 15/256,603, filed Sep. 4, 2016, Bailey et al.
U.S. Appl. No. 15/411,805, filed Jan. 20, 2017, Bailey et al.
U.S. Appl. No. 15/256,612, filed Sep. 4, 2016, Bailey et al.
U.S. Appl. No. 15/256,613, filed Sep. 4, 2016, Bailey et al.
U.S. Appl. No. 15/256,617, filed Sep. 4, 2016, Bailey et al.
PCT/IB2016/001454, Feb. 23, 2017, International Search Report and Written Opinion.
Extended European Search Report from European Patent Application EP 09727261.1 dated Mar. 7, 2012.
Extended European Search Report from European Patent Application EP 14765198.8 dated Sep. 13, 2016.
Invitation to Pay Additional Fees for International Application No. PCT/IB2009/005645 mailed Sep. 2, 2009.
International Search Report and Written Opinion for International Application No. PCT/IB2009/005645 dated Nov. 20, 2009.
International Preliminary Report on Patentability for International Application No. PCT/IB2009/005645 mailed Oct. 14, 2010.
International Search Report and Written Opinion for International Application No. PCT/CA2014/050229 mailed Jun. 17, 2014.

(56) References Cited

OTHER PUBLICATIONS

International Preliminary Report on Patentability for International Application No. PCT/CA2014/050229 mailed Sep. 24, 2015.
Adverlab Blog Spot, "CAPTCHA Advertising, Part II," Jan. 8, 2007. http:/adverlab.blospot.com/2007/01/captcha-advertising-part-ii.html, retrieved on Jul. 24, 2008.
Adverlab Blog Spot, "CAPTCHA Advertising," Oct. 27, 2005. http://www.adverlab.blogspot.com/2005/10/captcha-advertising.html, retrieved on Jul. 24, 2008.
Athanasopoulos et al. "Enhanced CAPTCHAs: Using Animation to Tell Humans and Computers Apart," H. Leitol and E. Markatos (Eds): CMS 2006, LNCS 4237, pp. 97-108, 2006. IFIP international Federation for Information Processing 2006.
Chemane et al., MCDM model for selecting Internet access technologies—A case study in Mozambique. Proceedings of the International Conference on Computer as a Tool. EUROCON 2005, Belgrade, Serbia & Montenegro, Nov. 22-24, 2005. pp. 1738-1741, Nov. 22, 2005.
Delfigo Corporation. "DSGateway: Context-Based Identity Assurance," Copyright 2009. http://www.delfigosecurity.com/products, retrieved on Mar. 11, 2009.
Fischer, I. et al. "Visual CAPTCHAs for Document Authentication," 2006 IEEE 8th Workshop on Multimedia Signal Processing, MMSP '06, Victoria, Canada, Oct. 1, 2006, pp. 471-474.
Giasson, "Expand your ad network with an interactive video ad unit that generates unprecedented user engagement—and protects websites and services from hackers." Leap Marketing NuCaptcha Concept Videos. Leap Marketing Technologies. Available at http://microsoft.leapmaketing.com/. Last accessed Feb. 23, 2009. 3 pages.
Godin, S., Seth's Blog, "Commercializing Captcha," Dec. 1, 2006. http://sethgodin.typepad.com/seths_blog/2006/12/commercializing.html, retrived on May 17, 2012.
JY's Weblog, "Ads in Captchas," May 1, 2007. http://jy.typepad.com/jy/2007/01/ads_in_captchas.html.
Kearns, D., "Start-up Measures Users' Trustworthiness for Authentication into Sites," Network World, Jan. 21, 2009. http://www.networkworld.com/newsletters/dir/2009/011909id2.html, retrieved on Mar. 11, 2009.
Liao, W.-H., et al. "Embedding Information within Dynamic Visual Patterns," 2004 IEEE International Conference on Multimedia and Expo: Jun. 27-30, 2004, Taipei, Taiwan, IEEE Operations Center, Piscataway, NJ, vol. 2, Jun. 27, 2004, pp. 895-898.
Naone, E., Technology Review, "The Captcha Arms Race," Mar./Apr. 2009.
Schultz, "Reputation scoring changes the enterprise security game." ComputerWorld. Apr. 3, 2009. 3 pages.
Teleport Jobs Webmaster Tools, "Free CAPTCHA," Copyright 2004-2007. http://www.teleportjobs.com/captcha.asp, retrieved on Jul. 24, 2008.
International Search Report and Written Opinion for International Application No. PCT/IB2016/001454 dated Feb. 23, 2017.

\* cited by examiner

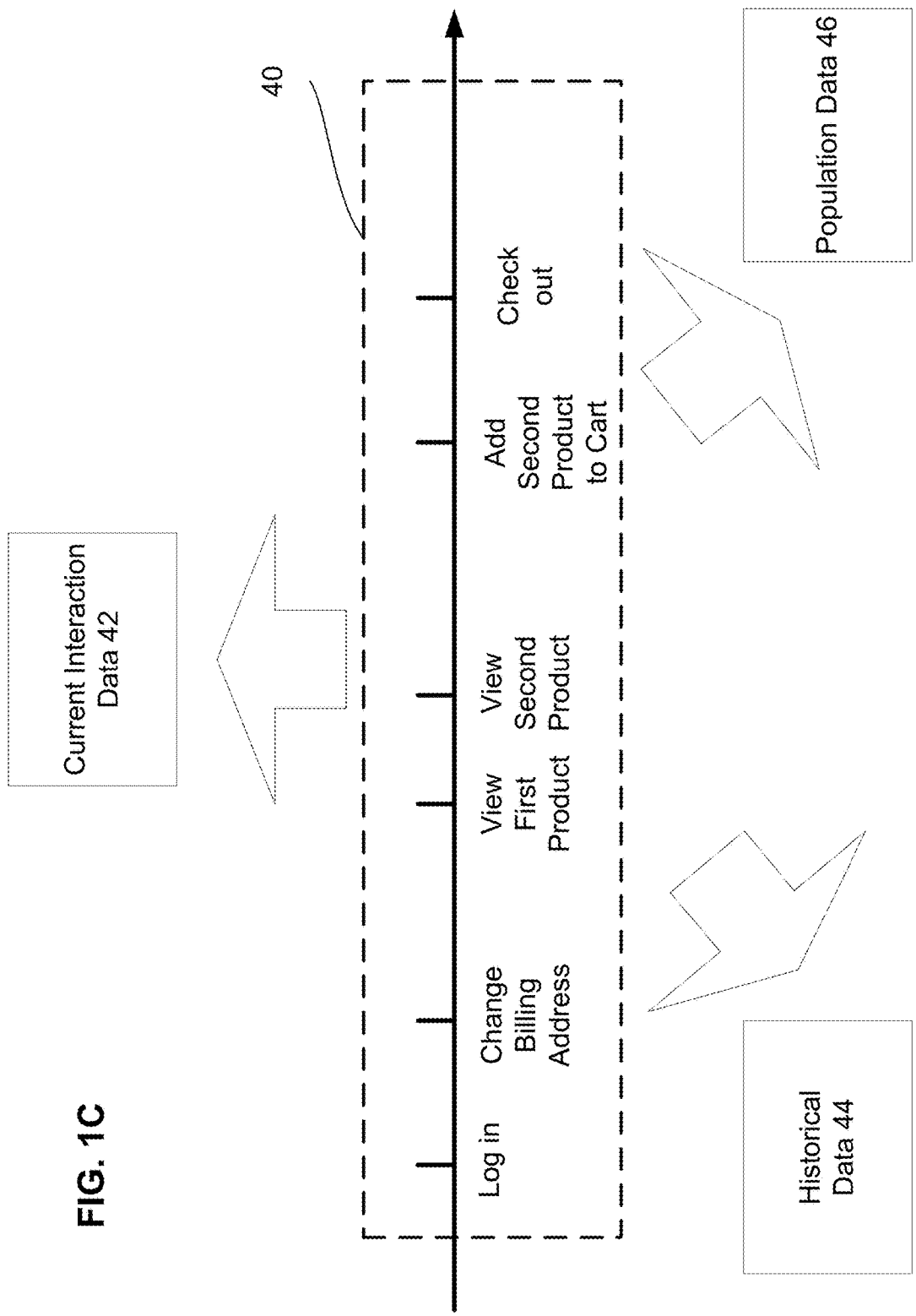

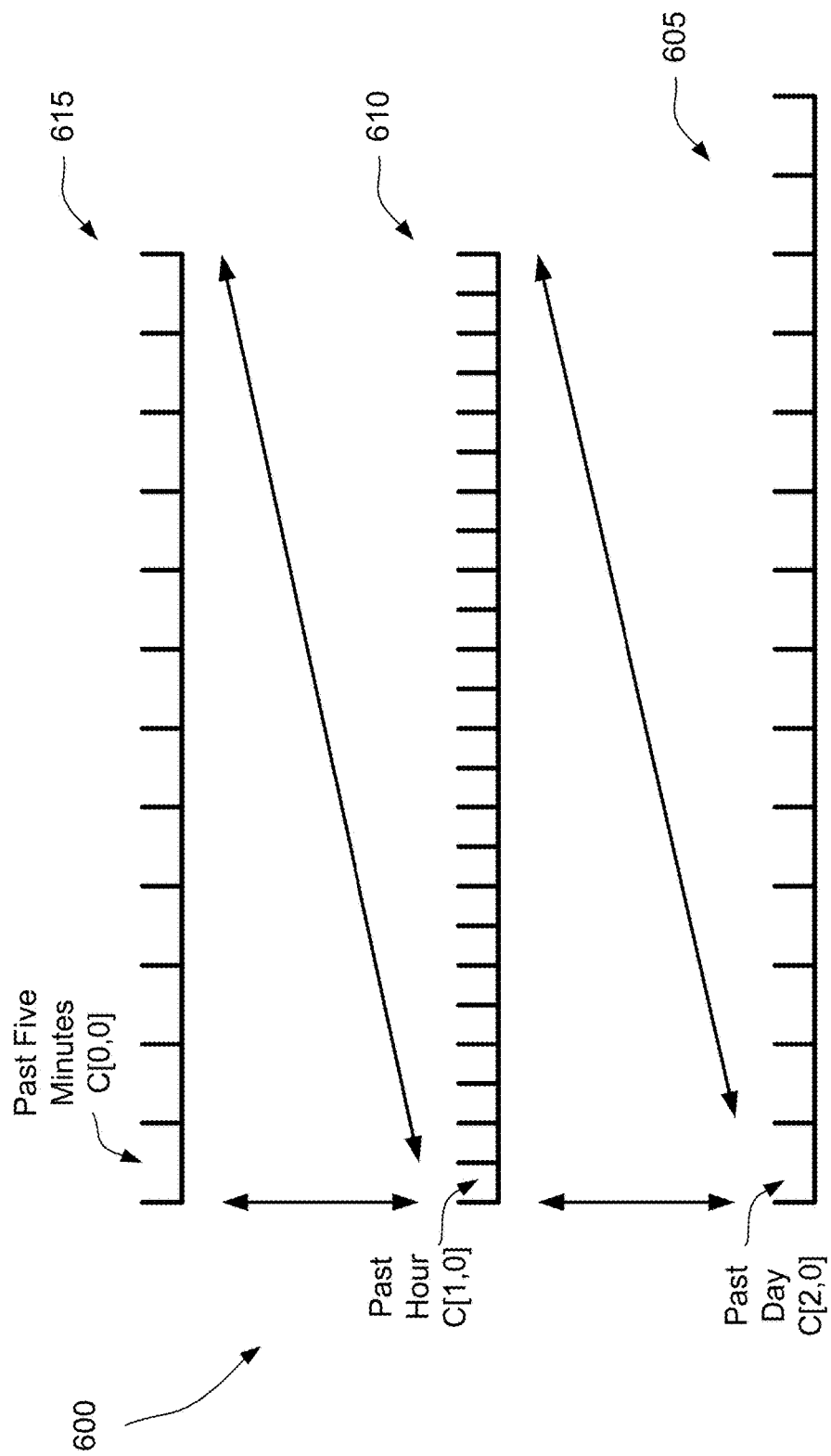

US 9,680,868 B2

SYSTEMS AND METHODS FOR MATCHING AND SCORING SAMENESS

RELATED APPLICATION

This application claims the benefit under 35 U.S.C. §119 of U.S. Provisional Patent Application No. 62/214,969, filed on Sep. 5, 2015, which is hereby incorporated by reference in its entirety.

This application is filed on the same day as application Ser. No. 15/256,597, entitled "SYSTEMS AND METHODS FOR DETECTING AND SCORING ANOMALIES," and application Ser. No. 15/256,607, entitled "SYSTEMS AND METHODS FOR DETECTING AND :PREVENTING SPOOFING." Each of these applications is hereby incorporated by reference in its entirety.

BACKGROUND

A large organization with an online presence often receives tens of thousands requests per minute to initiate digital interactions. A security system supporting multiple large organizations may handle millions of digital interactions at the same time, and the total number of digital interactions analyzed by the security system each week may easily exceed one billion.

As organizations increasingly demand real time results, a security system may have to analyze a large amount of data and accurately determine whether a digital interaction is legitimate, all within fractions of a second. This presents tremendous technical challenges, especially given the large overall volume of digital interactions handled by the security system.

SUMMARY

In accordance with some embodiments, a computer-implemented method is provided for analyzing a first digital interaction, the method comprising acts of: identifying a plurality of first-degree anchor values from the first digital interaction, wherein the plurality of first-degree anchor values comprise first-degree anchor values X and Y; accessing a profile of the first-degree anchor value X, wherein: the profile of the first-degree anchor value X comprises a plurality of sets of second-degree anchor values; and each set of the plurality of sets of second-degree anchor values corresponds to a respective anchor type and comprises one or more second-degree anchor values of that anchor type; determining how closely the first-degree anchor values X and Y are associated, comprising: determining whether the first-degree anchor value Y appears as a second-degree anchor value in a set of second-degree anchor values in the profile of the first-degree anchor value X; and in response to determining that the first-degree anchor value Y appears as a second-degree anchor value in a set of second-degree anchor values in the profile of the first-degree anchor value X, using information stored in the profile of the first-degree anchor value X to determine how frequently the first-degree anchor Y was previously observed from a same digital interaction as the first-degree anchor value X; generating an association score indicative of how closely the plurality of first-degree anchors are associated, based at least in part on how closely the first-degree anchor values X and Y are associated.

In accordance with some embodiments, a computer-implemented method is provided for providing a profile of an anchor value, comprising acts of: detecting a plurality of digital interactions at different points in time; for each digital interaction of the plurality of digital interactions: identifying from the digital interaction an anchor value X of an anchor type T; and updating a profile of the anchor value X, wherein: the profile of the anchor value X comprises a plurality of counters $C[i,j]$ ($i=0, \ldots, M-1; j=0, \ldots, N_i-1$); for each $i=0, \ldots, M-1$ and $j=0, \ldots, N_i-1$, the counter $C[i,j]$ indicates a number of times an event E is observed during a time interval $I_{i,j}$; and updating the profile of the anchor value X comprises: analyzing the digital interaction to determine if the event Z is observed in connection with the digital interaction; and in response to determining that the event Z is observed in connection with the digital interaction, incrementing the counter $C[i,0]$ for each $i=0, \ldots, M-1$.

In accordance with some embodiments, a computer-implemented method is provided for analyzing a digital interaction, the method comprising acts of: identifying an anchor value X from the digital interaction; identifying, in a record of the digital interaction, a data structure associated with an anchor type T of the anchor value, wherein a plurality of anchor values of the anchor type T are divided into a plurality of buckets of anchor values; identifying a bucket B of the plurality of buckets of anchor values, wherein the anchor value X falls into the bucket B; operating on the data structure associated with the anchor type T to indicate that at least one anchor value from the bucket B has been observed in connection with the digital interaction; looking up the anchor value X in the data structure associated with the anchor type T to determine if the anchor value X has been stored in the data structure associated with the anchor type T; and in response to determining that the anchor value X has not been stored in the data structure associated with the anchor type T, storing the anchor value X in the data structure associated with the anchor type T.

In accordance with some embodiments, a computer-implemented method is provided for analyzing a first digital interaction, the method comprising acts of: identifying an anchor value X from the first digital interaction; identifying a first plurality of past digital interactions from which the anchor value X was previously observed, wherein each past digital interaction of the first plurality of past digital interactions has associated therewith a respective sameness score; select a second plurality of past digital interactions from the first plurality of past digital interactions based at least in part on the respective sameness scores; generating a profile for the anchor value X based on the second plurality of past digital interactions, wherein: the profile comprises historical information regarding each attribute of a plurality of attributes; and the plurality of attributes are selected based on measurements taken from the second plurality of past digital interactions; for at least one attribute $A_1$ of the plurality of attributes, determining a value $V_1$ based on one or more measurements taken from the first digital interaction, wherein the one or more measurements relate to a physical interaction between a user and a device; determining a biometric score for the first digital interaction at least in part by comparing the value $V_1$ of the at least one attribute $A_1$ against the historical information regarding the at least one attribute $A_1$.

In accordance with some embodiments, a system is provided, comprising at least one processor and at least one computer-readable storage medium having stored thereon instructions which, when executed, program the at least one processor to perform any of the above methods.

In accordance with some embodiments, at least one computer-readable storage medium having stored thereon instructions which, when executed, program at least one processor to perform any of the above methods.

BRIEF DESCRIPTION OF DRAWINGS

FIG. 1C shows an illustrative flow 40 within a digital interaction, in accordance with some embodiments.

FIG. 6 shows an illustrative data structure 600 for maintaining statistics over one or more intervals of time, in accordance with some embodiments.

DETAILED DESCRIPTION

Figure 1A:
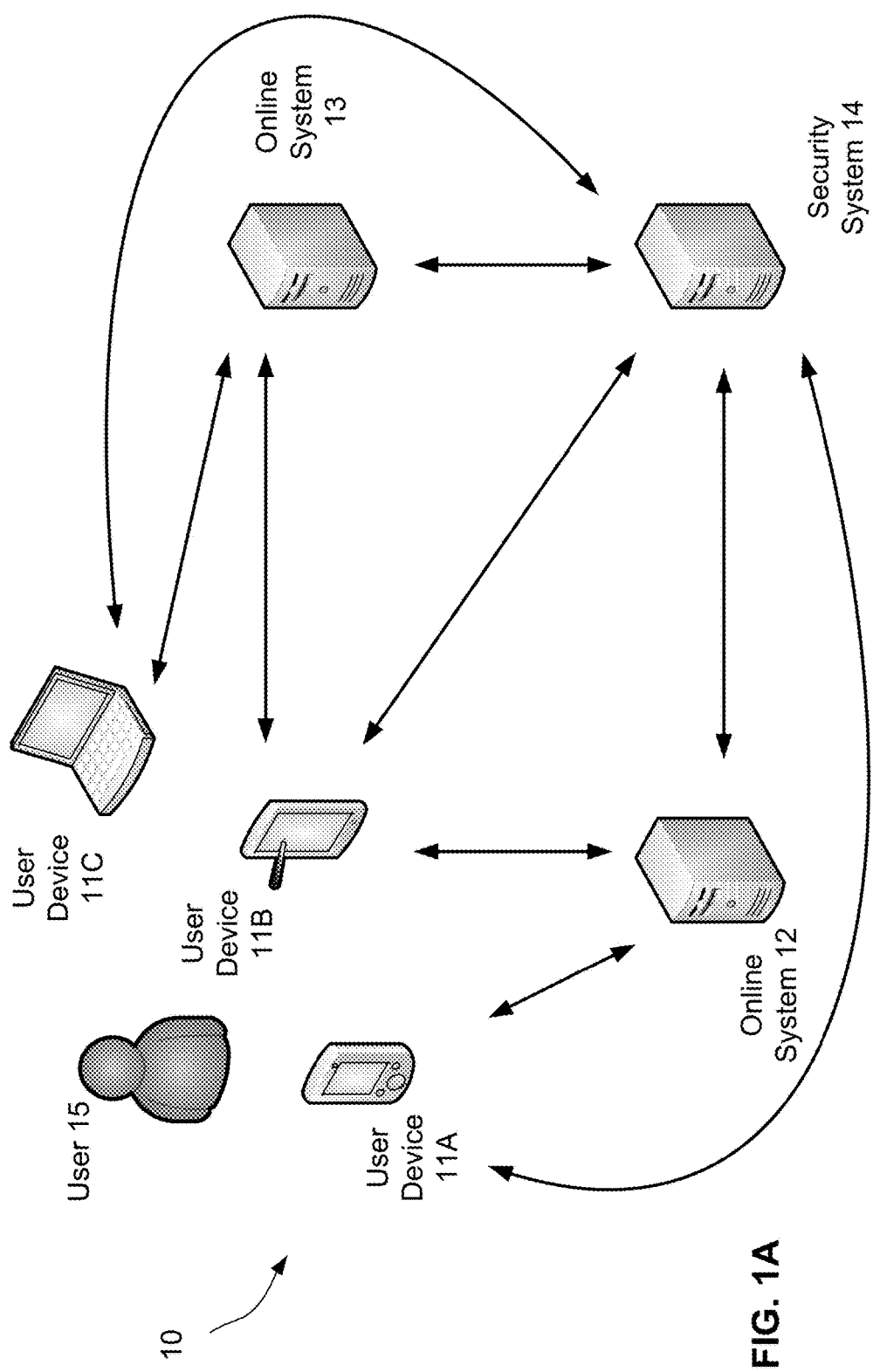
FIG. 1A shows an illustrative system 10 via which digital interactions may take place, in accordance with some embodiments.

Aspects of the present disclosure relate to systems and methods for matching and scoring sameness.

The inventors have recognized and appreciated various technical challenges in building trust between an online system and a user who interacts with the online system over time. Unlike a store clerk who sees a customer in person and remembers what the customer looks like and how the customer behaves, an online system may have limited ways to "see" or "remember" a user. For example, after the user logs in successfully for the first time from a device, the online system may store a device identifier extracted from data packets received from the device, and may associate the device identifier with the user's account. When a new attempt to log into the account is detected, the online system may check whether a device identifier extracted from newly received data packets match any stored identifier associated with the account. However, this method may not always be effective because a device identifier may be spoofed. Accordingly, in some embodiments, improved techniques are provided for determining whether an entity currently observed in a certain context (e.g., accessing a certain account, charging a certain credit card, sending data packets with a certain device identifier, connecting from a certain network address, etc.) is likely a same user whom an online system has previously encountered in that context or a related context.

The inventors have recognized and appreciated that a security system for matching and scoring sameness may process an extremely large amount of data. For instance, a security system may analyze digital interactions for multiple large organizations. The web site of each organization may handle hundreds of login attempts per second, so that the security system may receive thousands, tens of thousands, or hundreds of thousands of requests per second to match sameness. In some instances, a few megabytes of data may be captured from each digital interaction (e.g., URL being accessed, user device information, keystroke recording, etc.) and, in evaluating the captured data, the security system may retrieve and analyze a few megabytes of historical, population, and/or other data. Thus, the security system may analyze a few gigabytes of data per second just to support 1000 requests per second. Accordingly, in some embodiments, techniques are provided for aggregating data to facilitate efficient storage and/or analysis.

Some security systems flag all suspicious digital interactions for manual review, which may cause delays in sending acknowledgements to users. Moderate delays may be acceptable to organizations selling physical goods over the Internet, because for each order there may be a time window during which the ordered physical goods are picked from a warehouse and packaged for shipment, and a manual review may be conducted during that time window. However, many digital interactions involve sale of digital goods (e.g., music, game, etc.), transfer of funds, etc. For such interactions, a security system may be expected to respond to each request in real time, for example, within hundreds or tens of milliseconds. Such quick responses may improve user experience. For instance, a user making a transfer or ordering a song, game, etc. may wish to receive real time confirmation that the transaction has gone through.

The inventors have recognized and appreciated that some security systems focus on detecting patterns indicative of fraud or other security concerns. Such a security system may, by design, be suspicious in every digital interaction. For instance, whenever an indicator of a security concern is detected (e.g., an attempt to access an account from a blacklisted network address, such as an IP address involved in a previous account takeover attack), the security system may require a user to perform one or more verification tasks (e.g., answering one or more security questions) to prove that the user is in fact who the user is purporting to be. The inventors have recognized and appreciated that such rigid rules may lead to false positive errors. For example, a legitimate user may be traveling and may attempt to access an account from an IP address that happens to be on a blacklist. As a result, a security system may block the attempted access, or the user may be required to perform one or more verification tasks before being granted access. This may have a negative impact on user experience.

Accordingly, in some embodiments, techniques are provided for reducing false positive errors by using a result from a sameness analysis as a mitigating factor in determining whether to grant access. For instance, if a security system determines there is a high likelihood that an entity requesting access is a same user whom an online system has previously encountered in a certain context (e.g., accessing a certain account, charging a certain credit card, sending data packets with a certain device identifier, connecting from a certain network address, etc.) or a related context, the security system may grant access despite detecting one or more suspicious patterns. This may reduce user experience friction while maintaining an adequate level of security.

Some security systems perform a security check only when a user takes a substantive action such as changing one or more access credentials (e.g., account identifier, password, etc.), changing contact information (e.g., email address, phone number, etc.), changing shipping address, making a purchase, etc. The inventors have recognized and appreciated that such a security system may have collected little information by the time the security check is initiated. Accordingly, in some embodiments, a security system may begin to analyze a digital interaction as soon as an entity arrives at a web site. For instance, the security system may begin collecting data from the digital interaction before the entity even attempts to log into a certain account. In some embodiments, the security system may compare the entity's behaviors against population data. Additionally, or alternatively, the security system may accumulate the collected data and, once the entity attempts to log into an account, compare the entity's behaviors against historical data associated with the account. In this manner, the security system may be able to draw some inferences as to whether the entity is likely a legitimate user, or a bot or human fraudster, before the entity takes any substantive action. Various techniques are described herein for performing such analyses in real time for a high volume of digital interactions.

The inventors have recognized and appreciated that, although many attacks exhibit known suspicious patterns, it may take time for such patterns to emerge. For instance, an attacker may gain control of multiple computers that are seemingly unrelated (e.g., computers that are associated with different users, different network addresses, different geographic locations, etc.), and may use the compromised computers to carry out an attack simultaneously. As a result, damage may have been done by the time any suspicious pattern is detected.

The inventors have recognized and appreciated that a security system may be able to flag potential concerns earlier by looking for expected patterns, as opposed to merely looking for suspicious patterns. For instance, as soon as an entity arrives at a web site and purports to be a particular user, behaviors of the entity (e.g., activity timing, navigation pattern, typing cadence, pointer movement, touchscreen gesture, device angle, device movement, etc.) may be analyzed and compared against one or more expected patterns. In this manner, a potential imposter may be detected early, for example, by simply detecting that the potential imposter's behaviors are different from typical behaviors of the user whom the potential imposter is purporting to be. Such detection may be possible before the potential imposter even takes any substantive action (e.g., changing one or more access credentials such as account identifier and password, changing contact information such as email address and phone number, changing shipping address, making a purchase, etc.). By contrast, a security system that solely relies on detection of malicious patterns may not have sufficient information to make any determination until the potential imposter takes one or more substantive actions.

In some embodiments, if a digital interaction exhibits one or more deviations from expected patterns, a security system may scrutinize the digital interaction more closely, even if the deviations are not yet sufficient to justify classifying the digital interaction as part of an attack. The security system may scrutinize a digital interaction in a non-invasive manner (e.g., recording keystrokes, measuring device angle and/or movement, etc.) so as to reduce user experience friction.

As an example, a security system may, at an outset of a digital interaction involving a certain account, detect an attempt to change credit card number and billing address, which may result in a new association between the credit card number and an identifier for the account. This new association may be a deviation from expected patterns (e.g., credit card numbers known to be associated with the account). However, by itself, this new association may not be sufficiently suspicious, as many users change credit card numbers and billing addresses for legitimate reasons. One approach may be to flag the attempt as a high risk action and require one or more verification tasks. The inventors have recognized and appreciated that such an approach may negatively impact user experience. Accordingly, in some embodiments, a deviation from expected patterns may trigger additional analysis that is non-invasive. For example, the security system may collect additional data from the digital interaction in a non-invasive manner and may analyze the data in real time, so that by the time the digital interaction progresses to a stage with potential for damage (e.g., charging the credit card or shipping goods), the security system may have already determined whether an entity involved in this digital interaction is likely a same user whom the security system has encountered previously.

I. Association Among Anchor Values

In some embodiments, a security system may examine and match patterns involving anchors that are observable from digital interactions. For instance, a security system may observe that data packets received in connection with a digital interaction indicate a certain source network address and/or a certain source device identifier. Additionally, or alternatively, the security system may observe that the a certain email address is used to log in and/or a certain credit card is charged in connection with the digital interaction.

Examples of anchors include, but are not limited to, account identifier, email address (e.g., user name and/or email domain), network address (e.g., IP address, sub address, etc.), phone number (e.g., area code and/or subscriber number), location (e.g., GPS coordinates, continent, country, territory, city, designated market area, etc.), device characteristic (e.g., brand, model, operating system, browser, device fingerprint, etc.), device identifier, etc.

In some embodiments, a security system may examine anchors observed from a digital interaction and determine if those anchors have a history of being observed together. For instance, in response to observing an email address X in connection with a digital interaction, the security system may access a set of network addresses, where each network address has been observed with the email address X in at least one digital interaction in the past. The security system may then check whether a network address Y observed in connection with the digital interaction is in the set of previously observed network addresses. Additionally, or alternatively, the security system may access a set of email addresses, where each email address has been observed with the network address Y in at least one digital interaction in the past, and may check whether the email address X is in the set of previously observed email addresses.

The inventors have recognized and appreciated that some security systems rely on binary inquiries such as, "has network address Y been seen with email address X before?" For instance, if a network address is observed together with an email address for the first time, a security system may deny access or require additional verification tasks. The inventors have recognized and appreciated that such an approach may be inadequate and may create friction in user experience. As one example, a user may have previously logged in once from a public network (e.g., a wireless hotspot at a coffee shop), and an attempt by an attacker to log in using the user's email address from the same public network may go undetected. As another example, a user may be visiting a friend and may attempt to log in from the friend's home network, and the user may be required to perform one or more verification tasks because the IP address of the friend's home network has never been observed with the user's email address.

Accordingly, in some embodiments, improved techniques are provided for assessing an extent to which an observed pattern matches one or more expected patterns. For instance, rather than simply determining whether a network address Y has been seen with an email address X before, a security system may determine how frequently the network address Y has been seen with the email address X. In some embodiments, the security system may store not only a set of network addresses that have been observed with the email address X, but also information indicative of a frequency by which each network address in the set has been observed with the email address X. For example, the security system may maintain a counter for each network address in the set and may use the counter to keep track of a number of times the network address has been observed with the email address X in some specified period of time (e.g., past five minutes, past hour, past day, past week, past two weeks, etc.). In this manner, a security system may flag a digital interaction as being suspicious even if there is some small number of occurrences of prior association (e.g., a user occasionally logging in from a wireless hotspot at a coffee shop).

The inventors have further recognized and appreciated that it may be desirable to analyze association among multiple anchors. For instance, an overall association score may be generated that is indicative of how closely the anchors are associated, where the overall association score may be based on association scores for pairs of anchors. For example, the overall association score may be computed as a weighted sum or weighted max of pairwise association scores. In this manner, a strong association between an email address X and device identifier Z (e.g., a user logging in using his own smartphone) may mitigate a weak association between the email address X and a network address Y (e.g., the user logging in for the first time from a friend's home network). This may reduce false positive errors, while maintaining an adequate level of security.

II. Techniques for Efficient Processing and Representation of Data

The inventors have recognized and appreciated that as a security system receives a stream of data for a digital interaction, it may be desirable to provide a digest of the data. For instance, the digest may be stored in a data structure that may be accessed efficiently, and the security system may keep the digest up-to-date as additional data arrives for the digital interaction. The inventors have recognized and appreciated that the availability of such a digest may significantly speed up processing of digital interactions, which may arrive at a rate of thousands, tens of thousands, or hundreds of thousands digital interactions per second, potentially resulting in over a billion digital interactions per day.

In some embodiments, a digest may be stored in a data structure that has a bounded size. In this manner, only a bounded amount of data (e.g., a few hundred kilobytes) may be analyzed in response to a query regarding a digital interaction, regardless of an amount of data that has been captured from the digital interaction (e.g., a few megabytes). In some embodiments, digests may be sufficiently small so that digests for all on-going digital interactions may be loaded into memory. Since accessing data from memory may be done more efficiently than accessing data from disk storage, a security system may be able to respond to queries more quickly by keeping more pertinent information in memory.

For instance, in some embodiments, an array of a certain size N may be used in a digest to store up to N distinct credit card numbers that have been seen in a digital interaction. Once the array has been filled, a suitable method may be used to determine whether to discard a newly observed credit card number, or replace one of the stored credit card numbers with the newly observed credit card number. In one example, the first N distinct credit card numbers observed in the digital interaction may be stored, and every subsequently observed credit card number may be discarded. In another example, the last N distinct credit card numbers observed in the digital interaction may be stored, and every newly observed credit card number may replace the oldest credit card number in the array. In yet another example, a suitable combination of N distinct credit card numbers of interest may be stored, including, but not limited to, one or more credit card numbers observed near a beginning of the digital interaction, one or more credit card numbers most recently observed from the digital interaction, one or more credit card numbers most frequently observed from the digital interaction, and/or one or more credit card numbers with some interesting history (e.g., previously involved in credit card cycling attacks).

The inventors have recognized and appreciated that it may be desirable to store additional information in a digest, beyond N distinct observed values. For instance, it may be desirable to store an indication of how many distinct values have been observed overall, and how such values are distributed. Accordingly, in some embodiments, possible values may be divided into a plurality of M buckets, and a bit string of length M may be stored in addition to, or instead of, N distinct observed values. Each bit in the bit string may correspond to a respective bucket, and may be initialized to 0. Whenever a value from a bucket is observed, the bit corresponding to that bucket may be set to 1. In some embodiments, a hash function may be applied to possible values and a modulo operation with modulus M may be applied to divide the resulting hashes into M buckets. However, it should be appreciated that aspects of the present disclosure are not limited to the use of hash-modding to divide values into buckets, as other methods may also be suitable.

The inventors have further recognized and appreciated various technical challenges in representing and matching expected patterns, as opposed to merely representing and matching suspicious patterns. For instance, the inventors have recognized and appreciated that some security systems discover suspicious patterns by analyzing data associated with prior attacks. Each attack may take place over a relative short period of time (e.g., a few days or even just a few hours) and may involve a relative small number of digital interactions (e.g., hundreds, thousands, or tens of thousands). Thus, a relatively small amount of data may be analyzed (e.g., a few kilobytes per digital interaction), and the analysis may be performed post hoc (e.g., a few hours, or even a few days, after an attack).

By contrast, to capture expected patterns of legitimate users, a security system may continuously monitor an extremely large stream of digital interactions (e.g., thousands, tens of thousands, or hundreds of thousands digital interactions per second, which may result in over a billion digital interactions per day). For instance, the security system may monitor digital interactions for multiple large organizations, and may continuously update representations of expected patterns based on the incoming digital interactions. Furthermore, to prevent attacks before damages are done, the security system may analyze each incoming digital interaction in real time to determine whether the incoming digital interaction match one or more expected patterns. Accordingly, in some embodiments, techniques are provided for representing expected patterns in ways that allow efficient storage and/or updating of the expected patterns, and/or efficient analysis of incoming digital interactions.

In some embodiments, a security system may use a histogram-based data structure to maintain statistics over one or more intervals of time. For instance, a plurality of counters may be used, where each counter may correspond to a respective time interval and may keep track of a number of times a certain event is observed during that time interval. In some embodiments, some of the time intervals may be consecutive. For example, a two-week interval may be divided into 14 consecutive one-day intervals, with a separate counter for each one-day interval to keep track of a number of times the event is observed during that one-day interval. Additionally, or alternatively, a one-day interval may be divided into 24 consecutive one-hour intervals, with a separate counter for each one-hour interval to keep track of a number of times the event is observed during that one-hour interval. Additionally, or alternatively, a one-hour interval may be divided into 12 consecutive five-minute intervals, with a separate counter for each five-minute interval to keep track of a number of times the event is observed during that five-minute interval.

In some embodiments, a security system may continually update one or more counters. For instance, counters corresponding to consecutive time intervals may be shifted periodically, so that the counter values may stay fresh. As an example, 12 counters may be used, each corresponding to a five-minute interval within the past hour. Every five minutes, the value in each counter may be copied into the next counter, where the value in the counter corresponding to the oldest interval may simply be overwritten, and the counter corresponding to the most recent interval may be reset to 0. Other implementations are also possible, for example, by arranging the counters in a linked list in reverse chronological order, and updating the linked list very five minutes by removing the counter corresponding to the oldest interval from the end of the list and adding a counter (initialized to 0) at the beginning of the list.

In some embodiments, an event may include observing a certain anchor value or combination of anchor values in a digital interaction. For example, an event may include observing an email address X and a network address Y in a same digital interaction. In some embodiments, a profile may be established for a first anchor value (e.g., the email address X), and counters such as those described above may be used to keep track of how many times a second anchor value (e.g., the network address Y) is seen with the first anchor value over various time intervals. Thus, to determine if two anchor values observed from a digital interaction are closely associated with each other, relevant information may simply be retrieved from profiles associated with the anchor values. This may eliminate or at least reduce on-the-fly processing of raw data associated with the anchor values, thereby improving responsiveness of the security system.

The inventors have recognized and appreciated that as the volume of digital interactions processed by a security system increases, the collection of counters maintained by the security system may become unwieldy. Accordingly, in some embodiments, anchor values of a same type may be divided into a plurality of buckets. Rather than maintaining one or more counters for each anchor value, the security system may maintain one or more counters for each bucket of anchor values. For instance, a counter may keep track of a number of times any network address from a bucket B of network addresses is seen with an email address X, as opposed to a number of times a particular network address Y is seen with the email address X. Thus, multiple counters (e.g., a separate counter for each anchor value in the bucket B) may be replaced with a single counter (e.g., an aggregate counter for all anchor values in the bucket B).

In this manner, a desired balance between precision and efficiency may be achieved by selecting an appropriate number of buckets. For instance, a larger number of buckets may provide a higher resolution, but more counters may be maintained and updated, whereas a smaller number of buckets may reduce storage requirement and speed up retrieval and updates, but more information may be lost.

The inventors have recognized and appreciated that it may be desirable to spread anchor values roughly evenly across a plurality of buckets. Accordingly, in some embodiments, a hash function may be applied to anchor values and a modulo operation may be applied to divide the resulting hashes into a plurality of buckets, where there may be one bucket for each residue of the modulo operation. An appropriate modulus may be chosen based on how many buckets are desired, and an appropriate hash function may be chosen to spread the anchor values roughly evenly across possible hashes. Examples of suitable hash functions include, but are not limited to, MD5, MD6, SHA-1, SHA-2, SHA-3, etc.

For example, there may be tens of thousands of possible user agents. The inventors have recognized and appreciated that it may not be important to precisely keep track of which user agents have been seen. Therefore, it may be sufficient to apply a hash-modding technique to divide the tens of thousands of possible user agents into, say, a hundred or fewer buckets. In this manner, if multiple user agents have been seen, there may be a high probability of multiple buckets being hit, which may provide sufficient information for a sameness analysis.

III. Behavior Biometrics

The inventors have recognized and appreciated that recognizing a user in an online setting presents technical challenges that do not arise a brick-and-mortar setting. For example, a person initiating a transaction at a brick-and-mortar office of an organization may be asked to physically present a photo ID, and an employee may conduct a visual inspection to ensure that the person who is requesting the transaction sufficiently resembles the person shown on the photo ID. By contrast, in an online setting, a user may simply submit one or more pieces of personal information (e.g., user name, password, answers to security questions, etc.) to initiate a digital interaction. Thus, an imposter who has stolen or otherwise obtained a legitimate user's personal information may be able to perform a fraudulent transaction online, without having to obtain a forged ID physically.

The inventors have recognized and appreciated that personal information such as name, account identifier, password, phone number, credit card number, billing address, shipping address, social security number, answers to security questions, etc. may be stored routinely by entities such as government agencies, healthcare organizations, merchants, law firms, etc. A data breach at any such entity may expose a large amount of personal information. Furthermore, answers to some security questions such as place of birth and name of high school may be found in public records. Therefore, authentication techniques that rely solely on knowledge of personal information may be ineffective in preventing online fraud or other security breaches.

The inventors have further recognized and appreciated that some security systems use multifactor authentication to determine whether to grant access to a user. For example, in addition to requiring a user to submit something the user knows (e.g., password), a security system may require the user to demonstrate that the user has something (e.g., a hardware token). The inventors have recognized and appreciated that such an approach may create undesirable user experience friction. For instance, the user may be unable to gain access if the hardware token is misplaced.

The inventors have recognized and appreciated that some security systems use behavior biometrics to authentic a user. For instance, a security system may analyze keystroke measurements taken from a user to detect certain patterns. At a subsequent attempt to log into the user's account, the security system may compare newly taken keystroke measurements against the previously detected patterns to determine if there is a match. The security system may grant access only if the newly taken keystroke measurements match the previously detected patterns.

Examples of behaviors that may be measured by a security system include, but are not limited to, activity timing, navigation pattern, typing cadence, pointer movement, touchscreen gesture, device angle, device movement, etc. The inventors have recognized and appreciated that an attacker may have no easy way to learn a user's incidental behaviors such as those mentioned above. Even if an attacker is able to observe a user's incidental behaviors over time, or steal information characterizing such behaviors, the attacker may have to expend significant effort to spoof incidental behaviors. For example, it may be difficult for an attacker to spoof gyroscope and accelerometer readings to mimic the way a user typically handles a mobile device. Furthermore, as a security system monitors a greater number of incidental behaviors (e.g., gyroscope readings, accelerometer readings, keystrokes, pointer movements, etc.), it may be increasingly difficult for an attacker to spoof all of the incidental behaviors simultaneously.

Thus, by comparing measurements of incidental behaviors taken from a digital interaction against a profile of expected patterns, a potential attacker may be detected even if the potential attacker is able to provide correct personal information such as account identifier and password. Conversely, a false positive error may be avoided when a user engages in seemingly suspicious behavior (e.g., logging in from a suspicious IP address), but incidental behaviors of the user may match a profile of expected patterns.

The inventors have recognized and appreciated various technical challenges for matching sameness in behavior biometrics. For instance, some security systems pool together measurements taken from all digital interactions associated with a certain account. The inventors have recognized and appreciated that there may be noise in such a collection of data. As one example, a user may share an account with another member in the user's family, so that the measurements may have been taken from multiple people who may behave differently. As result, there may no clear behavior pattern. Even if a pattern is discernable (e.g., from a family member who uses the account most frequently), using such a pattern for authentication may lead to false positive errors (e.g., denying access to other family members).

As another example, a user may occasionally behave differently from how the user usually behaves. For instance, the user may usually type at a first speed, but one day the user may start using a new keyboard and may type at a second speed that is significantly lower than the first speed because the user is not yet familiar the new keyboard. Denying access in such a situation may have a negative impact on the user's experience.

As another example, even if a behavior pattern is observed consistently from an account, that behavior pattern may be shared by many people. For instance, a legitimate user of the account may type at a similar speed as many users in a population. Therefore, even if that typing speed is observed from a digital interaction, a security system may not be able to infer with a high level of confidence that an entity engaging in the digital interaction is in fact the same user previously encountered.

Accordingly, in some embodiments, improved techniques are provided for analyzing measurements taken from a digital interaction to determine if an entity engaging in the digital interaction is a same user as previously encountered. For instance, a security system may match measurements taken from a digital interaction with a plurality of behavior patterns. For instance, a security system may identify a plurality of anchor values (e.g., an account identifier, a network address, an email address, a device identifier, a credit card number, etc.) from a digital interaction and may generate a profile for each of the anchor values. The profile for each anchor value may include one or more behavior patterns detected from a collection of past measurements associated with that anchor value, and measurements taken from the digital interaction may be compared against the one or more behavior patterns to determine if there is a sufficient match.

Alternatively, or additionally, a security system may generate a profile for a combination of anchor values observed from a digital interaction. The profile may include one or more behavior patterns detected from a collection of past measurements associated with that combination of anchor values (e.g., an account identifier and a device identifier). The inventors have recognized and appreciated that false positive errors may be reduced by segmenting past measurements by a combination of anchors, rather than segmenting past measurements by a single anchor. For instance, while multiple family members may share an account, each family member may tend to log in from a respective personal device, so that segmenting past measurements by account and device, as a combination, may result in multiple sets of measurements where each set may correspond to a single family member. By contrast, if the past measurements are segmented by account only, a resulting set may include measurements from different family members, which, as explained above, may lead to false positive errors.

In some embodiments, a behavior pattern may be generated dynamically. For instance, measurements taken from a past digital interaction may be stored in association with one or more anchor values observed from the past digital interaction. Thus, each anchor value may have associated therewith multiple sets of measurements, where each set of measurements may be taken from a respective past digital interaction from which the anchor value is observed. Upon identifying a plurality of anchor values from a digital interaction, a security system may use one or more of the identified anchor values to dynamically assemble a collection of past measurements. For example, the security system may retrieve one or more sets of measurements associated with an identified anchor value (or a combination of identified anchor values). The security system may then analyze the dynamically assembled collection of past measurements to detect one or more behavior patterns, and may compare measurements taken from the digital interaction against the one or more behavior patterns to determine if there is a sufficient match. Additionally, or alternatively, the security system may store the one or more detected behavior patterns in a profile associated with the identified anchor value (or the combination of identified anchor values).

Alternatively, or additionally, a profile may be selected dynamically from a plurality of stored profiles. For instance, a security system may maintain a plurality of profiles, where each profile may correspond to a certain anchor value or combination of anchor values. Upon identifying a plurality of anchor values from a digital interaction, a security system may use one or more of the identified anchor values to select one or more profiles from the plurality of stored profiles.

The inventors have recognized and appreciated that more accurate behavior patterns may be obtained by filtering past measurements, so that only high confidence past measurements are analyzed to detect behavior patterns. For instance, an attacker may attempt to log into a user's account from an IP address that has not been previously associated with the user's account. Additionally, or alternatively, the attacker may exhibit a different typing cadence compared to the user (e.g., when the attacker is typing in the user's password). A security system may nonetheless grant access, because the security system may not yet have sufficient information that indicates an attack. (As discussed above, denying access too readily may lead to too many false positives, which may negatively impact user experience.) However, the security system may associate a low level of confidence with measurements taken during that particular login attempt. At a subsequent login attempt, a profile may be generated for the account based on past measurements associated with the account. The past measurements may be filtered, for example, based on a confidence level threshold, so that measurements with low levels of confidence may be excluded. In this manner, even though the attacker is able to access the account, measurements taken from the attacker may not taint a profile subsequently generated for the account.

In some embodiments, a security system may select one or more behavior attributes to be included in a profile. The inventors have recognized and appreciated that a behavior attribute with respect to which consistent measurements are taken over time may be useful in matching sameness. For instance, if a user almost always holds his device at a certain angle, then device angle may be included as a behavior attribute in a profile. By contrast, if no particular pattern is discernable from device angle measurements (e.g., the user holds his device at different angles at different times in an apparently random fashion), then device angle may not be included as a behavior attribute in the profile.

The inventors have further recognized and appreciated that a behavior attribute may be useful in matching sameness if consistent measurements are taken over time with respect to that behavior attribute and such measurements are sufficiently different from typical measurements taken from a population. For instance, if a certain device angle is consistently observed from digital interactions associated with a certain anchor value (e.g., a certain account identifier), and that angle is different from angles commonly observed from digital interactions associated with other anchor values of a same type (e.g., other account identifiers), then observing that peculiar angle in a digital interaction may give a security system confidence that an entity engaging in the digital interaction is indeed a same user as previously encountered. Therefore, the security system may include device angle as a behavior attribute in a profile generated for that anchor value.

The inventors have recognized and appreciated additional benefits of matching sameness of legitimate users. In a traditional brick-and-mortar setting, a person who visits an establishment repeatedly may become recognized by staff members of the establishment. For example, a store clerk may come to recognize a customer over time as a loyal and frequent shopper. The store clerk may offer discounts to the customer, or otherwise attempt to improve the customer's shopping experience, so that the customer would remain a loyal and frequent shopper. The store clerk may trust the customer simply because the store clerk knows the customer is the same person the store clerk has encountered many times before. The inventors have recognized and appreciated that an ability to match sameness in an online setting may allow an organization to recognize valued online customers and take actions to improve such customers' experience. For example, an organization may provide preferential treatment to valued online customers to increase loyalty, as opposed to simply being suspicious of all online customers as potential fraudsters. Additionally, or alternatively, an organization may attempt to provide friction-free access to valued online customers, which may reduce abandonment of attempted purchases. Using one or more of the techniques described herein, these benefits may be achieved without compromising security.

IV. Further Descriptions

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the present disclosure are not limited to the use of any particular technique or combination of techniques.

FIG. 1A shows an illustrative system 10 via which digital interactions may take place, in accordance with some embodiments. In this example, the system 10 includes user devices 11A-C, online systems 12 and 13, and a security system 14. A user 15 may use the user devices 11A-C to engage in digital interactions. For instance, the user device 11A may be a smart phone and may be used by the user 15 to check email and download music, the user device 11B may be a tablet computer and may be used by the user 15 to shop and bank, and the user device 11C may be a laptop computer and may be used by the user 15 to watch TV and play games.

It should be appreciated that the user 15 may engage in other types of digital interactions in addition to, or instead of, those mentioned above, as aspects of the present disclosure are not limited to the analysis of any particular type of digital interactions. Also, digital interactions are not limited to interactions that are conducted via an Internet connection. For example, a digital interaction may involve an ATM transaction over a leased telephone line.

Furthermore, it should be appreciated that the particular combination of user devices 11A-C is provided solely for purposes of illustration, as the user 15 may use any suitable device or combination of devices to engage in digital interactions, and the user may use different devices to engage in a same type of digital interactions (e.g., checking email).

In some embodiments, a digital interaction may involve an interaction between the user 15 and an online system, such as the online system 12 or the online system 13. For instance, the online system 12 may include an application server that hosts a backend of a banking app used by the user 15, and the online system 13 may include a web server that hosts a retailer's web site that the user 15 visits using a web browser. It should be appreciated that the user 15 may interact with other online systems (not shown) in addition to, or instead of the online systems 12 and 13. For example, the user 15 may visit a pharmacy's web site to have a prescription filled and delivered, a travel agent's web site to book a trip, a government agency's web site to renew a license, etc.

In some embodiments, behaviors of the user 15 may be measured and analyzed by the security system 14. For instance, the online systems 12 and 13 may report, to the security system 14, behaviors observed from the user 15. Additionally, or alternatively, the user devices 11A-C may report, to the security system 14, behaviors observed from the user 15. As one example, a web page downloaded from the web site hosted by the online system 13 may include software (e.g., a JavaScript snippet) that programs the browser running on one of the user devices 11A-C to observe and report behaviors of the user 15. Such software may be provided by the security system 14 and inserted into the web page by the online system 13. As another example, an application running on one of the user devices 11A-C may be programmed to observe and report behaviors of the user 15. The behaviors observed by the application may include interactions between the user 15 and the application, and/or interactions between the user 15 and another application. As another example, an operating system running on one of the user devices 11A-C may be programmed to observe and report behaviors of the user 15.

It should be appreciated that software that observes and reports behaviors of a user may be written in any suitable language, and may be delivered to a user device in any suitable manner. For example, the software may be delivered by a firewall (e.g., an application firewall), a network operator (e.g., Comcast, Sprint, etc.), a network accelerator (e.g., Akamai), or any device along a communication path between the user device and an online system, or between the user device and a security system.

Although only one user (i.e., the user 15) is shown in FIG. 1A, it should be appreciated that the security system 14 may be programmed to measure and analyze behaviors of many users across the Internet. Furthermore, it should be appreciated that the security system 14 may interact with other online systems (not shown) in addition to, or instead of the online systems 12 and 13. The inventors have recognized and appreciated that, by analyzing digital interactions involving many different users and many different online systems, the security system 14 may have a more comprehensive and accurate understanding of how the users behave. However, aspects of the present disclosure are not limited to the analysis of measurements collected from different online systems, as one or more of the techniques described herein may be used to analyze measurements collected from a single online system. Likewise, aspects of the present disclosure are not limited to the analysis of measurements collected from different users, as one or more of the techniques described herein may be used to analyze measurements collected from a single user.

Figure 1B:
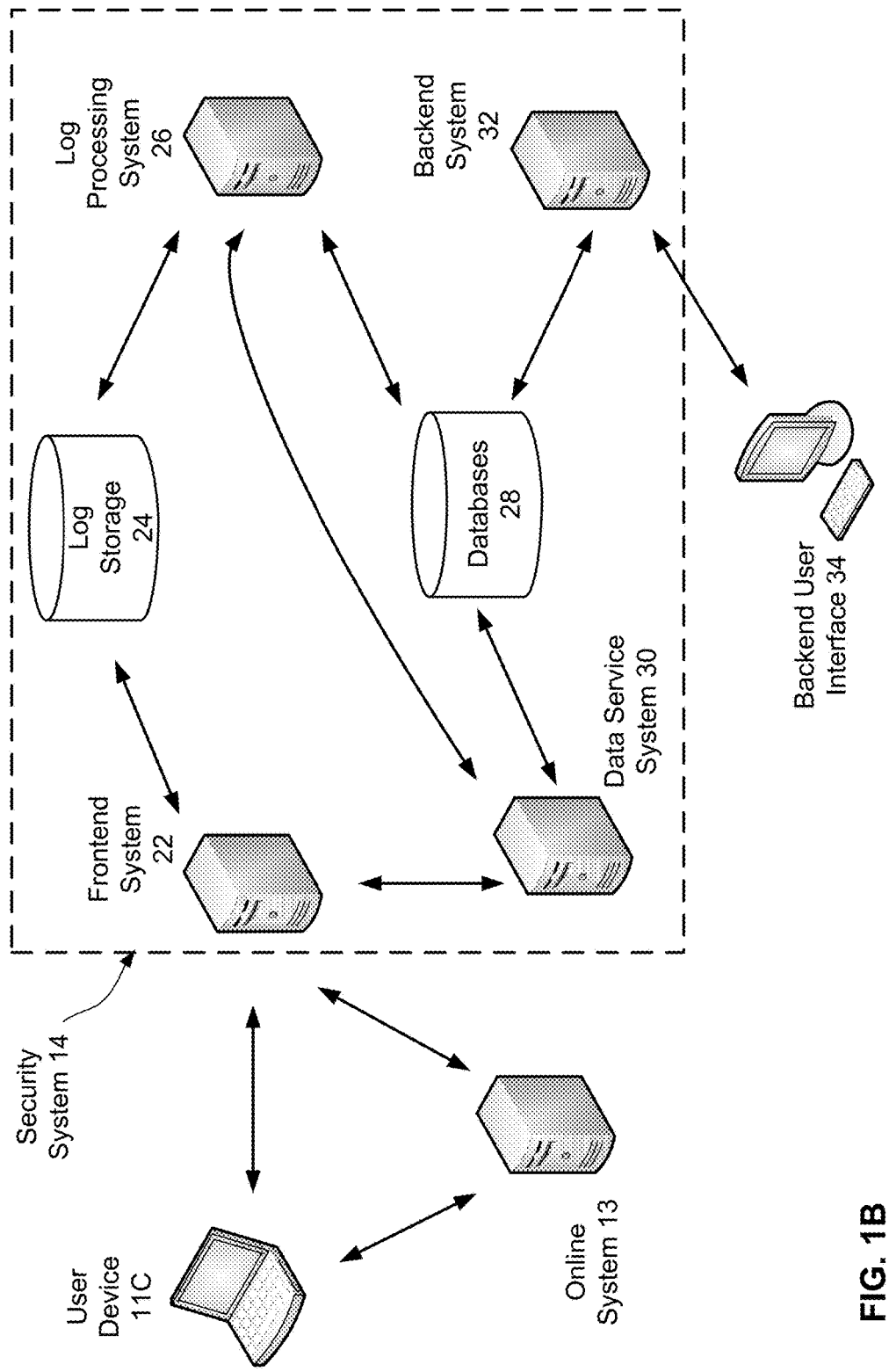
FIG. 1B shows an illustrative security system 14 for processing data collected from digital interactions, in accordance with some embodiments.

FIG. 1B shows an illustrative implementation of the security system 14 shown in FIG. 1A, in accordance with some embodiments. In this example, the security system 14 includes one or more frontend systems and/or one or more backend systems. For instance, the security system 14 may include a frontend system 22 configured to interact with user devices (e.g., the illustrative user device 11C shown in FIG. 1A) and/or online systems (e.g., the illustrative online system 13 shown in FIG. 1A). Additionally, or alternatively, the security system 14 may include a backend system 32 configured to interact with a backend user interface 34. In some embodiments, the backend user interface 34 may include a graphical user interface (e.g., a dashboard) for displaying current observations and/or historical trends regarding individual users and/or populations of users. Such an interface may be delivered in any suitable manner (e.g., as a web application or a cloud application), and may be used by any suitable party (e.g., security personnel of an organization).

In the example shown in FIG. 1B, the security system 14 includes a log storage 24. The log storage 24 may store log files comprising data received by the frontend system 22 from user devices (e.g., the user device 11C), online systems (e.g., the online system 13), and/or any other suitable sources. A log file may include any suitable information. For instance, in some embodiments, a log file may include keystrokes and/or mouse clicks recorded from a digital interaction over some length of time (e.g., several seconds, several minutes, several hours, etc.). Additionally, or alternatively, a log file may include other information of interest, such as account identifier, network address, user device identifier, user device characteristics, URL accessed, Stocking Keeping Unit (SKU) of viewed product, etc.

In some embodiments, the log storage 24 may store log files accumulated over some suitable period of time (e.g., a few years), which may amount to tens of billions, hundreds of billions, or trillions of log files. Each log file may be of any suitable size. For instance, in some embodiments, about 60 kilobytes of data may be captured from a digital interaction per minute, so that a log file recording a few minutes of user behavior may include a few hundred kilobytes of data, whereas a log file recording an hour of user behavior may include a few megabytes of data. Thus, the log storage 24 may store petabytes of data overall.

The inventors have recognized and appreciated it may be impractical to retrieve and analyze log files from the log storage 24 each time a request to match sameness is received. For instance, the security system 14 may be expected to respond to a request to match sameness within 100 msec, 80 msec, 60 msec, 40 msec, 20 msec, or less. The security system 14 may be unable to identify and analyze all relevant log files from the log storage 24 within such a short window of time. Accordingly, in some embodiments, a log processing system 26 may be provided to filter, transform, and/or route data from the log storage 24 to one or more databases 28.

The log processing system 26 may be implemented in any suitable manner. For instance, in some embodiments, the log processing system 26 may include one or more services configured to retrieve a log file from the log storage 24, extract useful information from the log file, transform one or more pieces of extracted information (e.g., adding latitude and longitude coordinates to an extracted address), and/or store the extracted and/or transformed information in one or more appropriate databases (e.g., among the one or more databases 28).

In some embodiments, the one or more services may include one or more services configured to route data from log files to one or more queues, and/or one or more services configured to process the data in the one or more queues. For instance, each queue may have a dedicated service for processing data in that queue. Any suitable number of instances of the service may be run, depending on a volume of data to be processed in the queue.

The one or more databases 28 may be accessed by any suitable component of the security system 14. As one example, the backend system 32 may query the one or more databases 28 to generate displays of current observations and/or historical trends regarding individual users and/or populations of users. As another example, a data service system 30 may query the one or more databases 28 to provide input to the frontend system 22.

Figure 10:
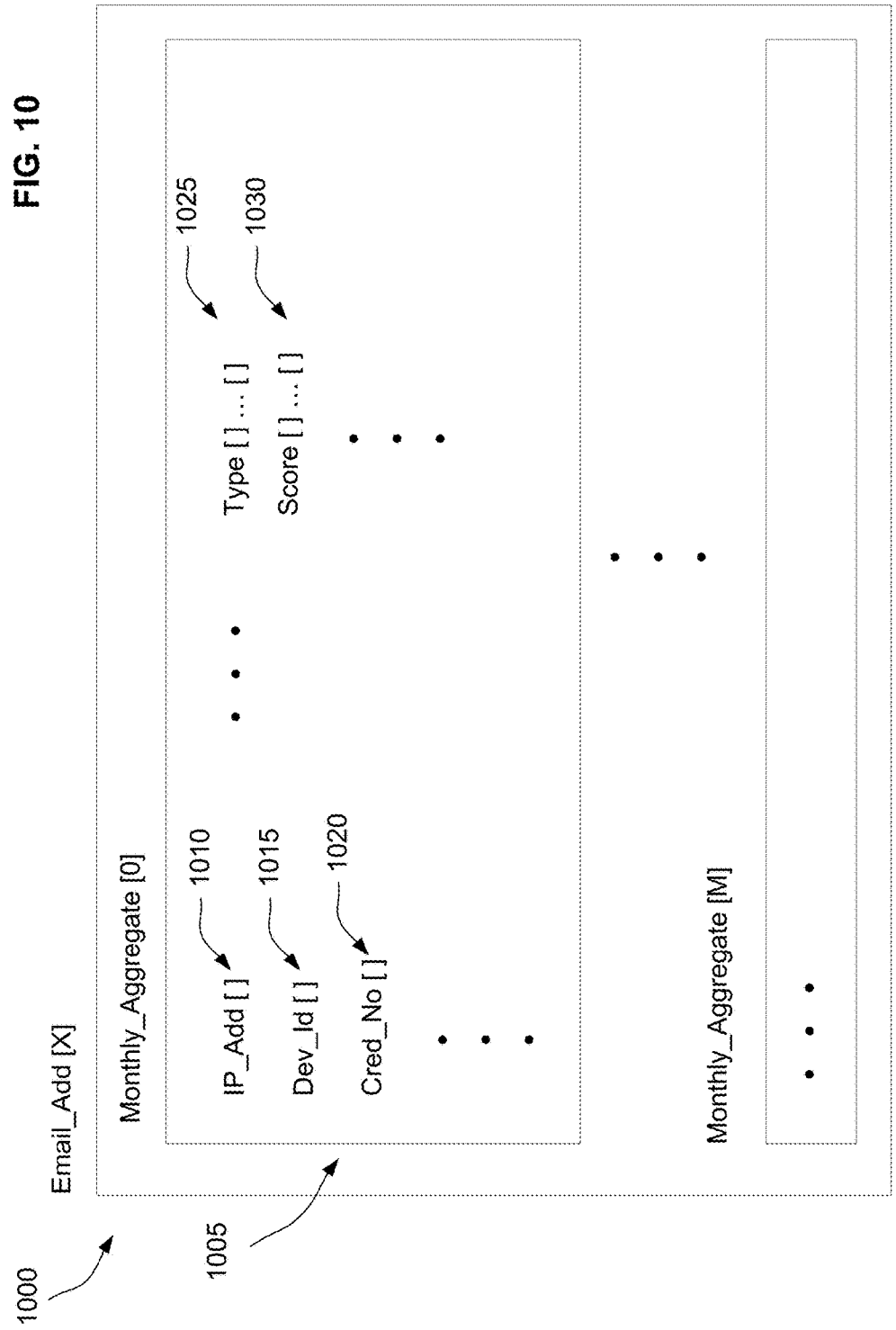
FIG. 10 shows an illustrative aggregate data structure 1000 for an anchor value, in accordance with some embodiments.

The inventors have recognized and appreciated that some database queries may be time consuming. For instance, if the frontend system 22 were to query the one or more databases 28 each time a request to match sameness is received, the frontend system 22 may be unable to respond to the request within 100 msec, 80 msec, 60 msec, 40 msec, 20 msec, or less. Accordingly, in some embodiments, the data service system 30 may maintain one or more data sources separate from the one or more databases 28. Examples of data sources maintained by the data service system 30 are shown in FIGS. 8B and 10, and are discussed below.

In some embodiments, a data source maintained by the data service system 30 may have a bounded size, regardless of how much data is analyzed to populate the data source. For instance, if there is a burst of activities from a certain account, an increased amount of data may be stored in the one or more databases 28 in association with that account. The data service system 30 may process the data stored in the one or more databases 28 down to a bounded size, so that the frontend system 22 may be able to respond to requests in constant time.

Various techniques are described herein for processing incoming data. For instance, in some embodiments, all possible network addresses may be divided into a certain number of buckets. Statistics may be maintained on such buckets, rather than individual network addresses. In this manner, a bounded number of statistics may be analyzed, even if an actual number of network addresses observed may fluctuate over time. One or more other techniques may also be used in addition to, or instead of bucketing, such as maintaining an array of a certain size.

In some embodiments, the data service system 30 may include a plurality of data services (e.g., implemented using a service-oriented architecture). For example, one or more data services may access the one or more databases 28 periodically (e.g., every hour, every few hours, every day, etc.), and may analyze the accessed data and populate one or more first data sources used by the frontend system 22. Additionally, or alternatively, one or more data services may receive data from the log processing system 26, and may use the received data to update one or more second data sources used by the frontend system 22. Such a second data source may supplement the one or more first data sources with recent data that has arrived since the last time the one or more first data sources were populated using data accessed from the one or more databases 28. In various embodiments, the one or more first data sources may be the same as, or different from, the one or more second data sources, or there may be some overlap.

Although details of implementation are shown in FIG. 1B and discussed above, it should be appreciated that aspects of the present disclosure are not limited to the use of any particular component, or combination of components, or to any particular arrangement of components. Furthermore, each of the frontend system 22, the log processing system 26, the data service system 30, and the backend system 32 may be implemented in any suitable manner, such as using one or more parallel processors operating at a same location or different locations.

FIG. 1C shows an illustrative flow 40 within a digital interaction, in accordance with some embodiments. In this example, the flow 40 may represent a sequence of activities conducted by a user on a merchant's web site. For instance, the user may log into the web site, change billing address, view a product details page of a first product, view a product details page of a second product, add the second product to a shopping cart, and then check out.

In some embodiments, a security system may receive data captured from the digital interaction throughout the flow 40. For instance, the security system may receive log files from a user device and/or an online system involved in the digital interaction (e.g., as shown in FIG. 1B and discussed above).

The security system may use the data captured from the digital interaction in any suitable manner. For instance, as shown in FIG. 1B, the security system may process the captured data and populate one or more databases (e.g., the one or more illustrative databases 28 shown in FIG. 1B). Additionally, or alternatively, the security system may populate one or more data sources adapted for efficient access. For instance, the security system may maintain current interaction data 42 in a suitable data structure (e.g., the illustrative data structure 850 shown in FIG. 8B). As one example, the security system may keep track of different network addresses observed at different points in the flow 40 (e.g., logging in and changing billing address via a first network address, viewing the first and second products via a second network address, and adding the second product to the cart and checking out via a third network address). As another example, the security system may keep track of different credit card numbers used in the digital interaction (e.g., different credit cards being entered in succession during checkout). The data structure may be maintained in any suitable manner (e.g., using the illustrative process 900 shown in FIG. 9) and by any suitable component of the security system (e.g., the illustrative frontend system 22 and/or the illustrative data service system 30).

In some embodiments, the security system may maintain historical data 44 in a suitable data structure (e.g., the illustrative data structure 1000 shown in FIG. 10), in addition to, or instead of the current interaction data 42. The historical data 44 may include one or more profiles (e.g., the illustrative profiles 300, 305, and 310 shown in FIG. 3 and/or the illustrative profiles 400 and 405 shown in FIG. 4). For instance, for each anchor value observed from the digital interaction, the security system may use the data captured from the digital interaction to update a profile associated with that anchor value.

In some embodiments, the security system may maintain population data 46, in addition to, or instead of the current interaction data 42 and/or the historical data 44. For instance, the security system may update, in real time, statistics such as breakdown of web site traffic by user agent, geographical location, product SKU, etc. As one example, the security system may use a hash-modding method to divide all known browser types into a certain number of buckets (e.g., 10 buckets, 100 buckets, etc.). For each bucket, the security system may calculate a percentage of overall web site traffic that falls within that bucket. As another example, the security system may use a hash-modding method to divide all known product SKUs into a certain number of buckets (e.g., 10 buckets, 100 buckets) and calculate respective traffic percentages. Additionally, or alternatively, the security system may calculate respective traffic percentages for combinations of buckets (e.g., a combination of a bucket of browser types, a bucket of product SKUs, etc.).

In some embodiments, the security system may render any one or more aspects of the current interaction data 42, the historical data 44, and/or the population data 46 (e.g., via the illustrative backend user interface 34 shown in FIG. 1B). For instance, the security system may render breakdown of web site traffic (e.g., with actual traffic measurements, or percentages of overall traffic) using a stacked area chart.

Figure 2:
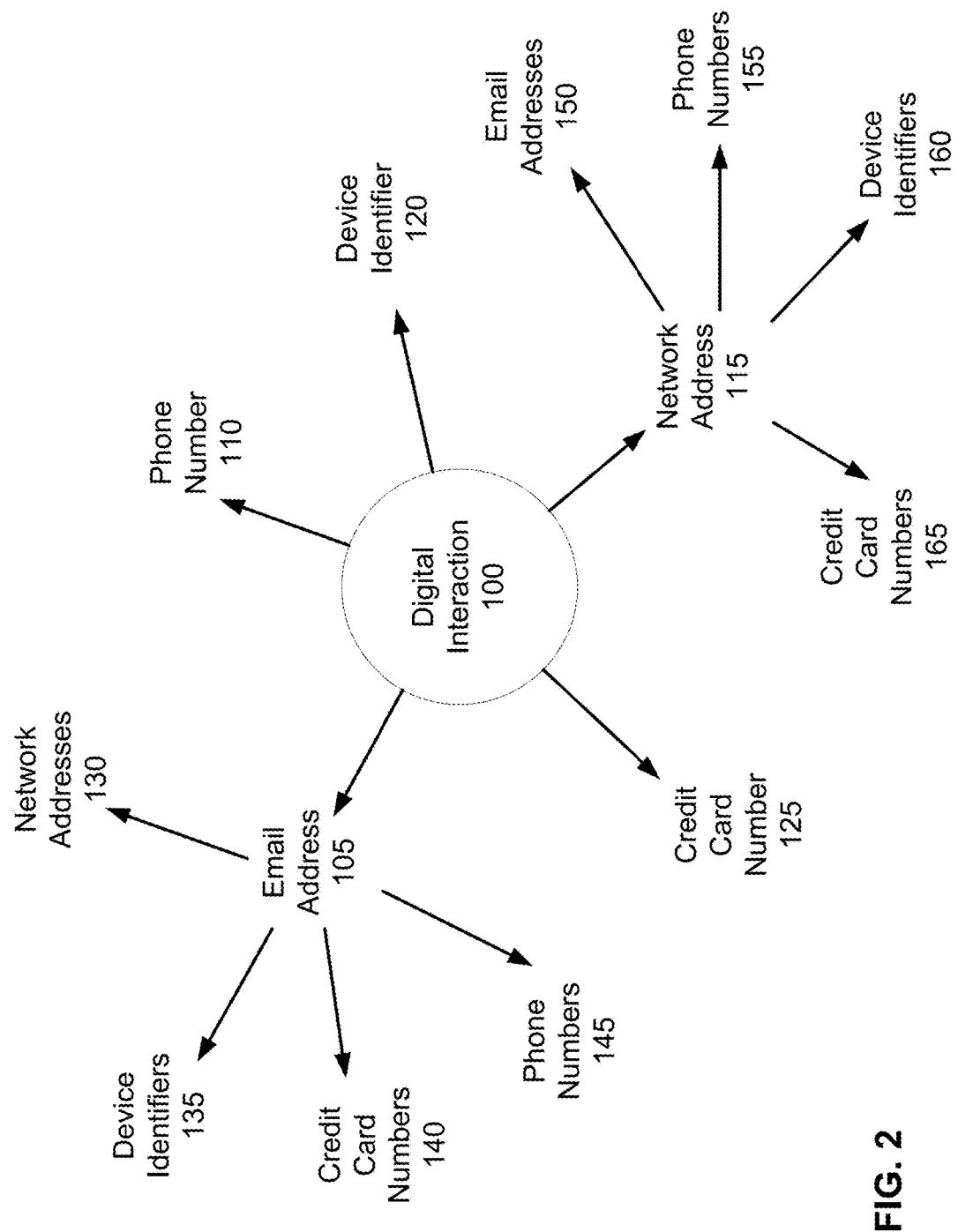
FIG. 2 shows an illustrative digital interaction 100 with a plurality of anchors, in accordance with some embodiments.

FIG. 2 shows an illustrative digital interaction 100 with a plurality of anchors, in accordance with some embodiments. For instance, the digital interaction 100 may be between the user 15 and the illustrative online system 13 shown in FIG. 1A, where the user 15 may use the illustrative user device 11C to make an online purchase from an ecommerce web site hosted by the online system 13. However, it should be appreciated that aspects of the present disclosure are not limited to the analysis of online purchases, as one or more of the techniques described herein may be used to analyze other types of digital interactions, including, but not limited to, opening a new account, checking email, transferring money, etc.

The inventors have recognized and appreciated that, unlike a store clerk who sees a customer in person and remembers what the customer looks like and how the customer behaves, an online system may have limited ways to "see" or "remember" a user. Because of these limitations, user-centric approaches may be ineffective in distinguishing legitimate digital interactions from malicious digital interactions. For instance, a security system may segment data based on user identifier, and may analyze the data associated with each user identifier in isolation. The inventors have recognized and appreciated that such an approach may miss useful associations. For example, a first user from a household may tend to log in with a first email address and charge a first credit card for online purchases, whereas a second user from the same household may tend to log in with a second email address and charge a second credit card for online purchases. If a security system segments data based on email address or credit card only, the security system may only detect an association between the first email address and the first credit card, and a separate association between the second email address and the second credit card, so that a login with the first email address charging the second credit card may appear suspicious. By contrast, a security system that segments data based on multiple anchors may detect an association between the first email address and the second credit card via a device identifier and/or a network address, because the first and second users may use the same home computer to log in.

Accordingly, in some embodiments, a security system may segment data based on a plurality of anchor values, and may use the segmented data in determining whether an entity currently observed in a certain context (e.g., accessing a certain account, charging a certain credit card, sending data packets with a certain device identifier, connecting from a certain network address, etc.) is likely a same user whom a security system has previously encountered in that context or a related context.

In the example shown in FIG. 2, the illustrative digital interaction 100 has five different anchor values: email address 105, phone number 110, network address 115, device identifier 120, and credit card number 125. The anchor values may be observed from the digital interaction 100 and may therefore be referred to as first-degree anchor values.

In some embodiments, one or more first-degree anchor values may have associated second-degree anchor values. For instance, in the example shown in FIG. 2, a security system may maintain a profile for the email address 105, and the profile may store one or more network addresses 130, where each of the one or more network addresses 130 was observed together with the email address 105 in some prior digital interaction. Likewise, the profile may store one or more device identifiers 135 previously observed with the email address 105, one or more credit card numbers 140 previously observed with the email address 105, one or more phone numbers 145 previously observed with the email address 105, etc. These anchor values stored in the profile of the email address 105 may be referred to as second-degree anchor values.

In some embodiments, a security system may store a profile for any one or more of the illustrative first-degree anchor values (e.g., the phone number 110, the network address 115, the device identifier 120, and/or the credit card number 125), in addition to, or instead of storing a profile for the email address 105. For instance, in the example shown in FIG. 2, a profile may be stored for the network address 115, including one or more email addresses 150 previously observed with the network address 115, one or more phone numbers 155 previously observed with the network address 115, one or more device identifiers 160 previously observed with the network address 115, one or more credit card numbers 165 previously observed with the network address 115, etc.

It should be appreciated that the first-degree anchor values shown in FIG. 2 are provided solely for purposes of illustration, as in various embodiments any suitable anchor type or combination of anchor types may be used. Furthermore, a digital interaction may have multiple anchor values of a same type. For instance, a user may initiate an online purchase while connecting from one network address (e.g., home network) but finish the online purchase while connecting from another network address (e.g., office network). It should also be appreciated that the illustrative second-degree anchor values shown in FIG. 2 are provided solely for purposes of illustration, as any suitable combination of second-degree anchor values may be stored in a profile of a first-degree anchor value.

Figure 3:
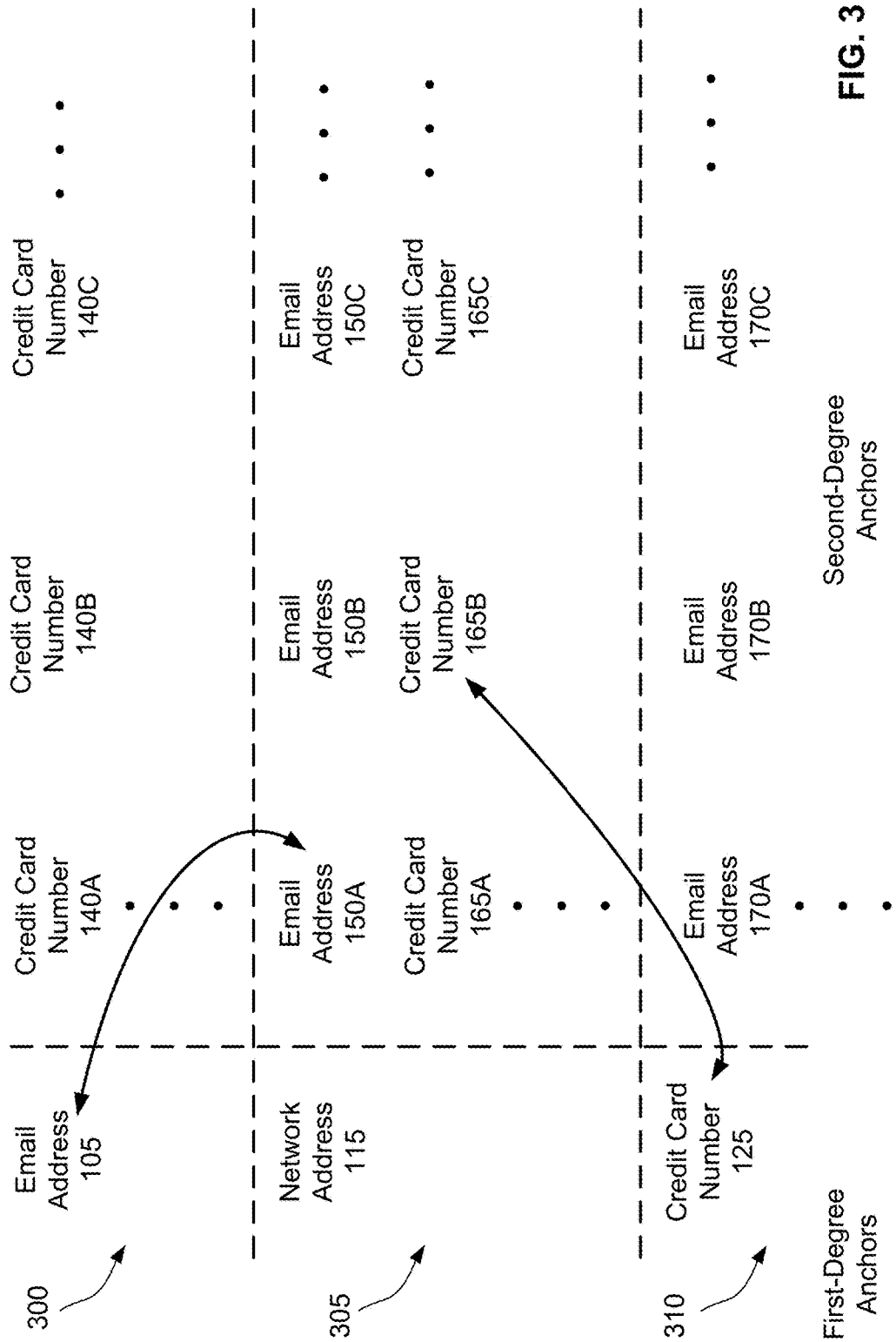
FIG. 3 shows illustrative profiles 300, 305, and 310, in accordance with some embodiments.

FIG. 3 shows illustrative profiles 300, 305, and 310, in accordance with some embodiments. For instance, the profile 300 may be a profile of the illustrative first-degree email address 105 shown in FIG. 2, the profile 305 may be a profile of the illustrative first-degree network address 115 shown in FIG. 2, and the profile 310 may be a profile of the illustrative first-degree credit card number 125 shown in FIG. 2.

In the example shown in FIG. 3, the profile 300 of the email address 105 stores a plurality of second-degree credit card numbers 140A, 140B, 140C, etc., the profile 305 of the network address 115 stores a plurality of second-degree email addresses 150A, 150B, 150C, etc. and a plurality of second-degree credit card numbers 165A, 165B, 165C, etc., and the profile 310 of the first-degree credit card number stores a plurality of second-degree email addresses 170A, 170B, 170C, etc. In this manner, even if the first-degree credit card number 125 has not previously been seen with the first-degree email address 105, an association may be detected via the network address 115.

For instance, the first-degree credit card number 125 may not be among the second-degree credit card numbers 140A, 140B, 140C, etc. stored in the profile of the first-degree email address 105, and the first-degree email address 105 may not be among the second-degree email addresses 170A, 170B, 170C, etc. stored in the profile of the first-degree credit card number 125. Nevertheless, the first-degree email address 105 may be one of the second-degree email addresses (e.g., the second-degree email address 150A) stored in the profile of the network address 115, and the first-degree credit card number 125 may be one of the second-degree credit card numbers (e.g., the second-degree credit card number 165B) stored in the profile of the network address 115. A security system may determine that both the second-degree email address 150A (which is the same as the first-degree email address 105) and the second-degree credit card number 165B (which is the same as the first-degree credit card number 125) are associated with the network address 115, and therefore the digital interaction is likely to be legitimate even though the first-degree email address 105 and the first-degree credit card number 125 have never before been observed together.

The inventors have recognized and appreciated that it may be desirable to determine an extent to which two anchor values are associated with each other. For instance, in the above example, if both the second-degree email address 150A (which is the same as the first-degree email address 105) and the second-degree credit card number 165B (which is the same as the first-degree credit card number 125) are strongly associated with the network address 115, the security system may have higher confidence that the digital interaction is legitimate. Accordingly, in some embodiments, techniques are provided for determining how strongly two anchor values are associated with each other.

Figure 4:
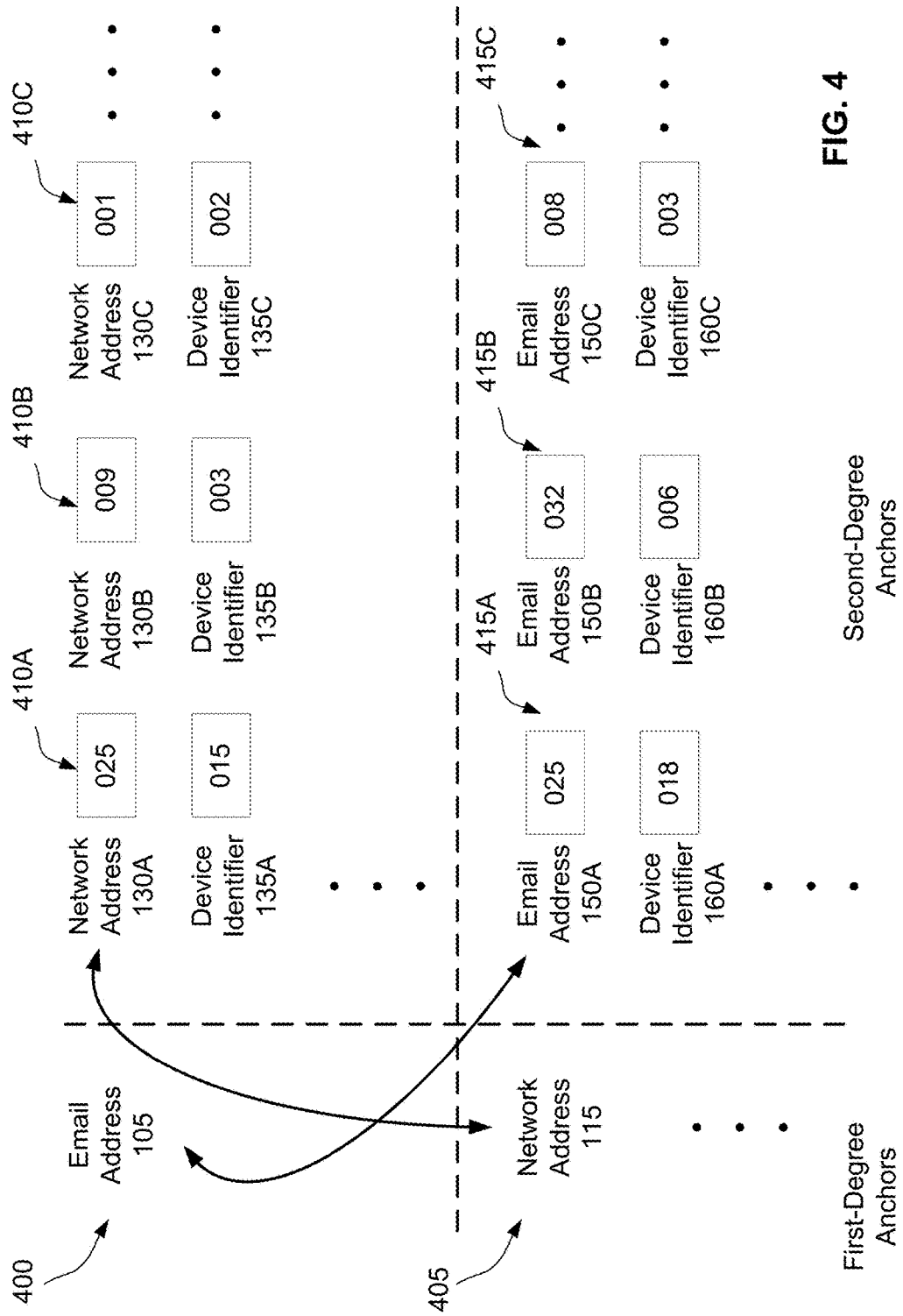
FIG. 4 shows illustrative profiles 400 and 405, in accordance with some embodiments.

FIG. 4 shows illustrative profiles 400 and 405, in accordance with some embodiments. For instance, the profile 400 may be a profile of the illustrative first-degree email address 105 shown in FIG. 2, and the profile 405 may be a profile of the illustrative first-degree network address 115 shown in FIG. 2.

In the example shown in FIG. 4, a security system maintains a counter for each second-degree anchor value in the profiles 400 and 405. For instance, a counter 410A (respectively, 410B, 410C, etc.) may be provided to keep track of a number of times the second-degree network address 130A (respectively, 130B, 130C, etc.) has been observed with the first-degree email address 105 in some specified period of time (e.g., past five minutes, past hour, past day, past week, past two weeks, etc.). Using these counters, the security system may be able to determine a frequency by which the second-degree network address 130A has been observed with the first-degree email address 105 (e.g., as a percentage of the sum of the counters 410A, 410B, 410C, etc.), and likewise for the second-degree network addresses 130B, 130C, etc.

Similarly, a counter 415A (respectively, 415B, 415C, etc.) may be provided to keep track of a number of times the second-degree email address 150A (respectively, 150B, 150C, etc.) has been observed with the first-degree network address 115 in some specified period of time (e.g., past five minutes, past hour, past day, past week, past two weeks, etc.). Using these counters, the security system may be able to determine a frequency by which the second-degree email address 150A has been observed with the first-degree network address 115 (e.g., as a percentage of the sum of the counters 415A, 415B, 415C, etc.), and likewise for the second-degree email addresses 150B, 150C, etc.

In some embodiments, the security system may assign a score to the second-degree network address 130A based on a ratio between the counter 410A and a highest counter among the counters 410A, 410B, 410C, etc. For instance, in the example shown in FIG. 4, the second-degree network address 130A may be assigned a score of 25/25=1.00. Likewise, the second-degree network address 130B may be assigned a score of 9/25=0.360, the second-degree network address 130C may be assigned a score of 1/25=0.040, etc., and the second-degree email address 150A may be assigned a score of 25/32=0.781, the second-degree email address 150B may be assigned a score of 32/32=1.00, the second-degree email address 150A may be assigned a score of 8/32=0.250, etc.

Thus, in this example, two different scores may be assigned to the pair <email address 105, network address 115>. When the email address 105 is treated as a first-degree anchor value and the network address 115 is treated as a second-degree anchor value (e.g., the second-degree network address 130A), a score of 1.00 may be assigned. By contrast, when the network address 115 is treated as a first-degree anchor value and the email address 105 is treated as a second-degree anchor value (e.g., the second-degree email address 150A), a score of 0.781 may be assigned.

In some embodiments, the security system may determine an association score between the email address 105 and the network address 115 by choosing one of these two scores. As one example, the security system may choose a higher of the two scores (e.g., 1.00). As another example, the security system may determine which anchor type (e.g., email address vs. network address) is more useful for matching sameness and may treat an anchor value of that type as a first-degree anchor value. For instance, email address may be more useful than network address because an email address is likely to be used by a small set of one or more users, whereas a network address may be shared by a large set of users. Accordingly, the score corresponding to the first-degree email address 105 and the second-degree network address 130A (namely, 1.00), may be used. Although both approaches result in a score of 1.00 in this example, it should be appreciated that in some instances these approaches may lead to different scores. Moreover, aspects of the present disclosure are not limited to determining an association score by choosing between different scores. In some embodiments, the different scores may be combined in some suitable manner, for example, into a weighted sum. Any suitable combination of weights may be used, including 0 and 1.

It should also be appreciated that aspects of the present disclosure are not limited to determining an association score between two anchor values, or any association score at all. In some embodiments, a security system may determine an association score for a set of more than two anchor values. As one example, the security system may select an anchor value (e.g., based on usefulness for matching sameness) and bundle the rest of the anchor values. For instance, the email address 105 may be treated as a first-degree anchor value, and a separate counter may be maintained for each combination of device identifier and network address. Thus, there may be a separate counter for each of the pairs <network address 130A, device identifier 135A>, <network address 130A, device identifier 135B>, . . . , <network address 130B, device identifier 135A>, <network address 130B, device identifier 135B>, . . . , <network address 130C, device identifier 135A>, <network address 130C, device identifier 135B>, . . . , etc. In this manner, a three-way association score may be determined using any suitable approach for determining a two-way association score, and likewise for an N-way association score for any N>3.

As another example, the security system may order the anchor values based on anchor type (e.g., email address X, device identifier Y, network address Z, phone number U, etc.) The ordering may be selected in any suitable manner, for instance, based on usefulness for matching sameness. The security system may then compute pairwise association scores (e.g., <email address X, device identifier Y>, <device identifier Y, network address Z>, <network address Z, phone number U>, etc.). The pairwise association scores may then be combined, for instance, as a weighted sum.

As another example, the security system may select one or more pairs of anchor values. For instance, the security system may rank pairs of anchor values, and then compute pairwise association scores for the N best pairs, where N may be determined based on a time budget (e.g., a target response time specified by an organization for which the security system is requested to perform sameness matching). As in the previous example, the pairwise association scores may be combined, for instance, as a weighted sum.

In some embodiments, pairs of anchor values may be ranked based on anchor type. For instance, the pair <email address X, device identifier Y> may be selected only if for a sufficiently large portion of a population (e.g., over some threshold percentage of accounts with a certain organization), there is a strong association between an email address and a device identifier (e.g., with an association score that is higher than some threshold score).

Figure 5:
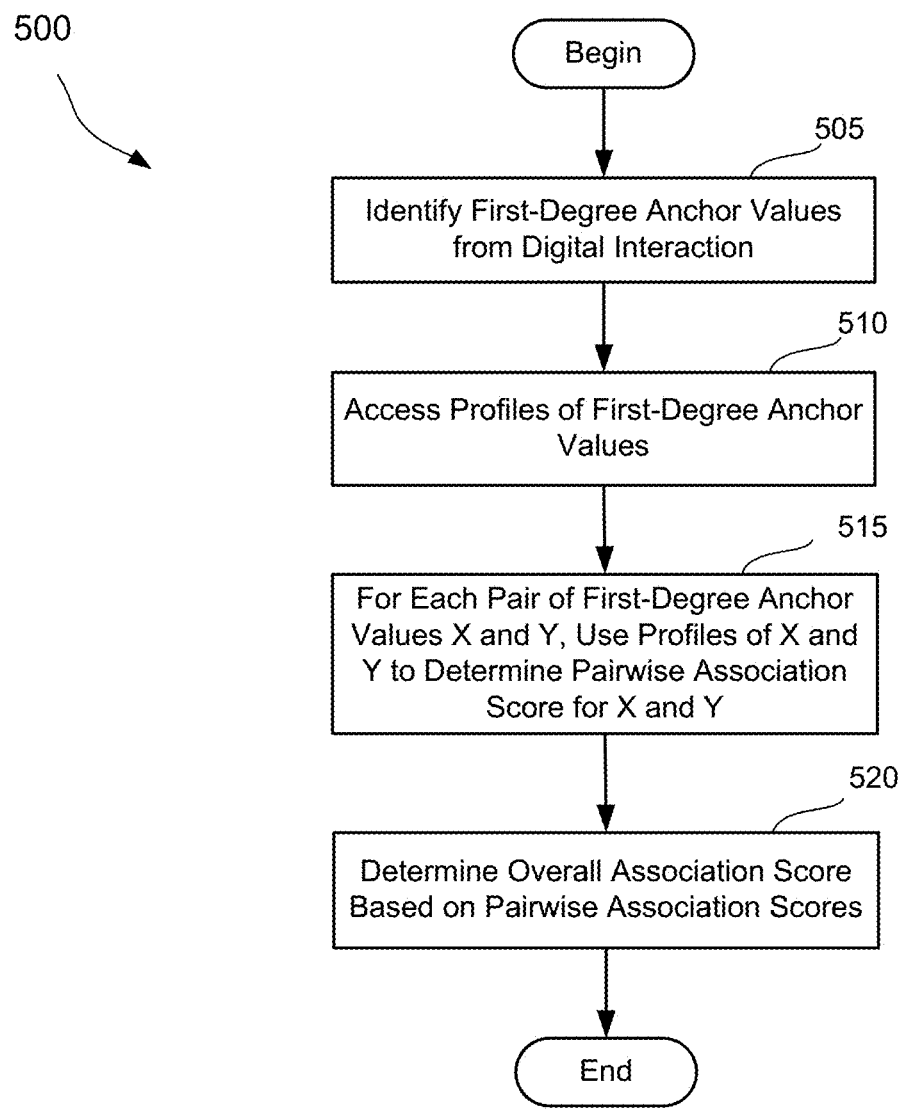
FIG. 5 shows an illustrative process 500 that may be performed by a security system to determine how closely a plurality of first-degree anchors are associated, in accordance with some embodiments.

FIG. 5 shows an illustrative process 500 that may be performed by a security system to determine how closely a plurality of first-degree anchors are associated, in accordance with some embodiments. For example, the process 500 may be used by the illustrative security system 14 shown in FIG. 1A to analyze the illustrative digital interaction 100 shown in FIG. 2.

At act 505, the security system may analyze a digital interaction to identify a plurality of first-degree anchor values. As one example, the digital interaction may include an attempt to log in, and an email address (e.g., the illustrative first-degree email address 105 shown in FIG. 2) may be submitted to identify an account associated with the email address. However, that is not required, as in some embodiments a separate account identifier may be submitted and an email address on record for that account may be identified.

As another example, the digital interaction may include an online purchase. A phone number (e.g., the illustrative first-degree phone number 110 shown in FIG. 2) may be submitted for scheduling a delivery, and a credit card number (e.g., the illustrative first-degree credit card number 125 shown in FIG. 2) may be submitted for billing. However, that is not required, as in some embodiments a phone number and/or a credit card number may be identified from a record of the account from which the online purchase is made.

As another example, the security system may examine data packets received in connection with the digital interaction and extract, from the data packets, information such as a source network address (e.g., the illustrative first-degree network address 115 shown in FIG. 2) and a source device identifier (e.g., the illustrative first-degree device identifier 120 shown in FIG. 2).

It should be appreciated that the examples described above are merely illustrative, as aspects of the present disclosure are not limited to the use of any particular anchor type, or any particular method for identifying an anchor value. Examples of anchor types include, but are not limited to the following.

User information
  account identifier
    real name, social security number, driver's license number, passport number, etc.
  email address
    user name, country of user registration, date of user registration, etc.
    email domain, DNS, server status/type/availability/capabilities/software/etc., network details, domain registrar and associated details (e.g., country of domain registrant, contact information of domain registrant, etc.), age of domain, country of domain registration, etc.
  phone number
    subscriber number, country prefix, country of number, area code, state/province/parish/etc. of area code or number location, if the number is activated, if the number is forwarded, billing type (e.g. premium rate), ownership details (e.g., personal, business, and associated details regarding email, domain, network address, etc.), hardware changes, etc.
  location
    GPS coordinates, continent, country, territory, state, province, parish, city, time zone, designated market area, metropolitan statistical area, postal code, street name, street number, apartment number, address type (e.g., billing, shipping, home, etc.), etc.
  payment
    plain text or hash of number of credit card, payment card, debit card, bank card, etc., card type, primary account number (PAN), issuer identification number (IIN), IIN details (e.g., name, address, etc.), date of issue, date of expiration, etc.

Device information
brand, model, operating system, user agent, installed components, rendering artifacts, browser capabilities, installed software, available features, available external hardware (e.g. displays, keyboards, network and available associated data), etc.
device identifier, cookie/HTML storage, other device-based storage, secure password storage (e.g., iOS Keychain), etc.
device fingerprint (e.g., from network and environment characteristics)

Network information
network address (e.g., IP address, sub address, etc.), network identifier, network access identifier, mobile station equipment identity (IMEI), media access control address (MAC), subscriber identity module (SIM), etc.
IP routing type (e.g. fixed connection, aol, pop, super-pop, satellite, cache proxy, international proxy, regional proxy, mobile gateway, etc.), proxy type (e.g., anonymous, distorting, elite/concealing, transparent, http, service provider, socks/socks http, web, etc.), connection type (e.g., anonymized, VPN, Tor, etc.), network speed, network operator, autonomous system number (ASN), carrier, registering organization of network address, organization NAICS code, organization ISIC code, if the organization is a hosting facility, etc.

Returning to FIG. 5, the security system may, at act 510, access one or more profiles associated, respectively, with one or more of the first-degree anchor values identified at act 505. Then, at act 515, the security system may, for each pair of first-degree anchor values X and Y, determine a pairwise association score for X and Y based on information in the profiles of X and Y. Examples of profiles and methods for determining pairwise association scores are discussed above in connection with FIG. 4.

At act 520, the security system may determine an overall association score based on the pairwise association scores determined at act 515. Any suitable technique or combination of techniques may be used to combine pairwise association scores. Examples include, but are not limited to, those described in connection with FIG. 4.

In some embodiments, the security system may, for a pair of first-degree anchor values X and Y (e.g., the illustrative email address 105 and credit card number 125 shown in FIG. 3) with a pairwise associate score below a selected threshold, look for one or more first-degree anchor values Z (e.g., the illustrative network address 115 shown in FIG. 3) with which both X and Y are associated.

It should be appreciated that details of implementation are shown in FIG. 5 and discussed above solely for purposes of illustration, as aspects of the present disclosure are not limited to any particular manner of implementation. For instance, the security system may access profiles of some, but not all, of the first-degree anchor values. Similarly, the security system may determine pairwise associate scores for some, but not all, of the pairs of first-degree anchor values X and Y.

In some embodiments, a security system may detect an account takeover attack by examining various anchor values associated with a network address. For instance, the security system may determine:
whether attempted accesses from that network address are associated with a same account and use a same password;
whether attempted accesses from that network address are associated with a same account but use different passwords (which may suggest an attacker attempting to guess a correct password);
whether attempted accesses from that network address are associated with different accounts but use a same password or a small number of passwords (which may suggest an attacker attempting to gain access by trying many accounts using a small number of common passwords);
whether attempted accesses from that network address are associated with different accounts and use a same password for each account;
whether attempted accesses from that network address are associated with different accounts and use different passwords for each account;
etc.

In some embodiments, each password may be hashmodded into one of a plurality of buckets, and a counter may be maintained for each bucket, and likewise for each account identifier. Such counters may be used to detect one or more of the above patterns. For example, if a large number of account buckets are hit, but only a small number of password buckets are hit, the security system may infer that an attacker is attempting to gain access by trying many accounts using a small number of common passwords.

Additionally, or alternatively, a security system may detect an account takeover attack by examining various anchor values associated with an account identifier. For instance, the security system may determine:
whether attempted accesses for that account identifier are from a same device identifier and a same network address;
whether attempted accesses for that account identifier are from a same device identifier but different network addresses;
whether attempted accesses for that account identifier are from different device identifiers but a same network address;
whether attempted accesses for that account identifier are from consistent pairings of device identifiers and network addresses;
whether attempted accesses for that account identifier are from many different device identifiers and many different network addresses, with no consistent pairing;
a number of different device identifiers with at least one attempted access for that account identifier;
a number of different network addresses with at least one attempted access for that account identifier;
etc.

In some embodiments, each device identifier may be hashmodded into one of a plurality of buckets, and a counter may be maintained for each bucket, and likewise for each network address. Such counters may be used to detect one or more of the above patterns. For example, if a large number of device identifier buckets are hit, but only one network address bucket is hit, the security system may infer that attempted accesses for that account identifier are from many different device identifiers but likely a same network address.

In some embodiments, a security system may examine email addresses submitted with attempts to create new accounts. As one example, the security system may use one or more counters (e.g., the illustrative data structure 600 shown in FIG. 6) to keep track of a number of times any email address with a certain domain has been used to create a new account. In this manner, an anomaly may be detected when a higher than expected number of attempts are observed from a certain domain over some period of time.

As another example, the security system may retrieve meta data for a domain, such as registrar, registering entity, etc. The security system may use one or more counters (e.g., the illustrative data structure 600 shown in FIG. 6) to keep track of a number of times any email address with any domain having a certain registrar (or a certain registering entity, etc.) has been used to create a new account. In this manner, an anomaly may be detected when a higher than expected number of attempts are observed from a certain registrar (or a certain registering entity, etc.) over some period of time.

As another example, the security system may examine a local part of an email address. For instance, the security system may determine if the local part resembles a real name, includes mostly numerals, and/or includes a feature that violates one or more rules set forth in a relevant standard. Examples of such a feature include, but are not limited to .@., spaces in quotes, "name.@.name" as such in quotes, (comments), etc. The security system may use one or more counters (e.g., the illustrative data structure 600 shown in FIG. 6) to keep track of a number of times a certain type of peculiarity is observed at account creation. In this manner, an anomaly may be detected when a higher than expected number of attempts are observed with a certain type of peculiarity over some period of time.

In some embodiments, the security system may strip comments, numbers, symbols, and unusual characters from local parts of email addresses. The remainders may be hashmodded into a plurality of buckets, and one or more counters (e.g., the illustrative data structure 600 shown in FIG. 6) may be maintained for each bucket. In this manner, an anomaly may be detected when a higher than expected number of attempts are observed for a certain bucket over some period of time.

In some embodiments, a security system may examine activities associated with an area code. For instance, the security system may hashmod area codes into a plurality of buckets and maintain a counter for each bucket to keep track of a number of digital interactions in which any phone number with an area code in that bucket is observed. In this manner, an anomaly may be detected when a higher than expected number of interactions are observed for a certain bucket over some period of time.

In some embodiments, a security system may examine various anchor values associated with an area code. For instance, the security system may, for each of a plurality of area codes, examine bank identification numbers (BINs) of credit card numbers associated with that area code (e.g., credit card numbers used in transactions in which a phone number with that area code is observed). The inventors have recognized and appreciated that BINs may be used as a type of location indicator, as consumers may tend to apply for credit cards from local banks.

In some embodiments, the security system may determine:
whether a certain BIN is commonly associated with a certain area code;
whether a certain BIN is widely distributed (e.g., associated with many different area codes) compared to other BINs (which may indicate a data breach or stolen card);
whether a certain BIN occurs in a large of number of activities over a short period of time (which may indicate a data breach or stolen card);
whether a small number of different BINs are associated with a certain area code (which may be expected);
whether a large number of different BINs are associated with a certain area code (which may indicate an anomaly);
etc.

In some embodiments, each BIN may be hashmodded into one of a plurality of buckets, and a counter may be maintained for each bucket to keep track of a number of digital interactions in which any BIN in that bucket is observed with a certain area code. Such counters may be used to detect one or more of the above patterns. For example, if a large number of buckets are hit, the security system may infer that a large number of different BINs are associated with that area code.

Additionally, or alternatively, each area code may be hashmodded into one of a plurality of buckets, and a counter may be maintained for each bucket to keep track of a number of digital interactions in which any area code in that bucket is observed with a certain BIN. Such counters may be used to detect one or more of the above patterns.

In some embodiments, the security system may combine (e.g., concatenate) an area code with a BIN and hashmod the result into one of a plurality of buckets. A counter may be maintained for each bucket. If a particular bucket has a higher count compared to other buckets, the security system may infer that a data breach or stolen card may have occurred with an area code and BIN combination in that bucket.

In some embodiments, the security system may examine a combination of a certain area code and a certain zip code. For instance, if a large number of different BINs are associated with a certain area code, the security system may determine whether many of the different BINs are associated with a particular area code and zip code combination (which may further evidence an anomaly).

In some embodiments, a security system may apply any one or more of the techniques described above in connection with BINs to another type of location indicator, such as network addresses (e.g., IP subnet).

Figure 8A:
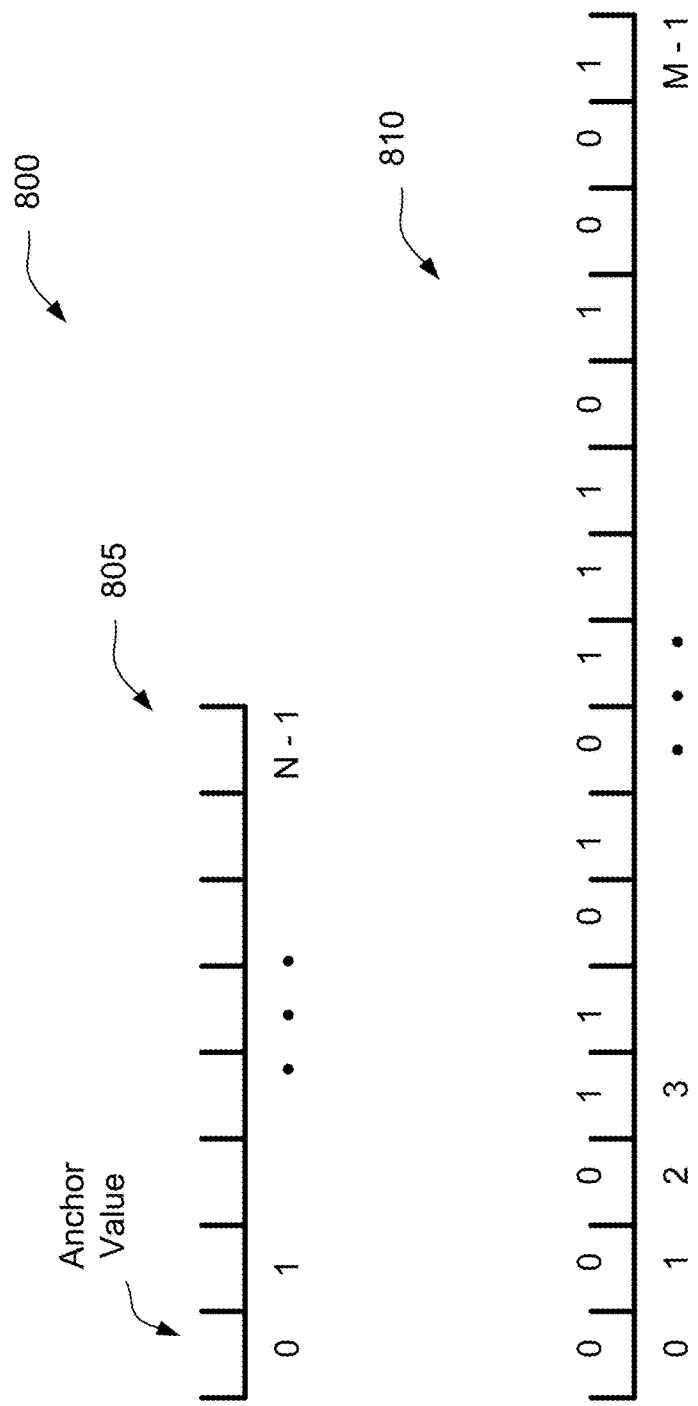
FIG. 8A shows an illustrative data structure 800 for recording observations from a digital interaction, in accordance with some embodiments.
Figure 8B:
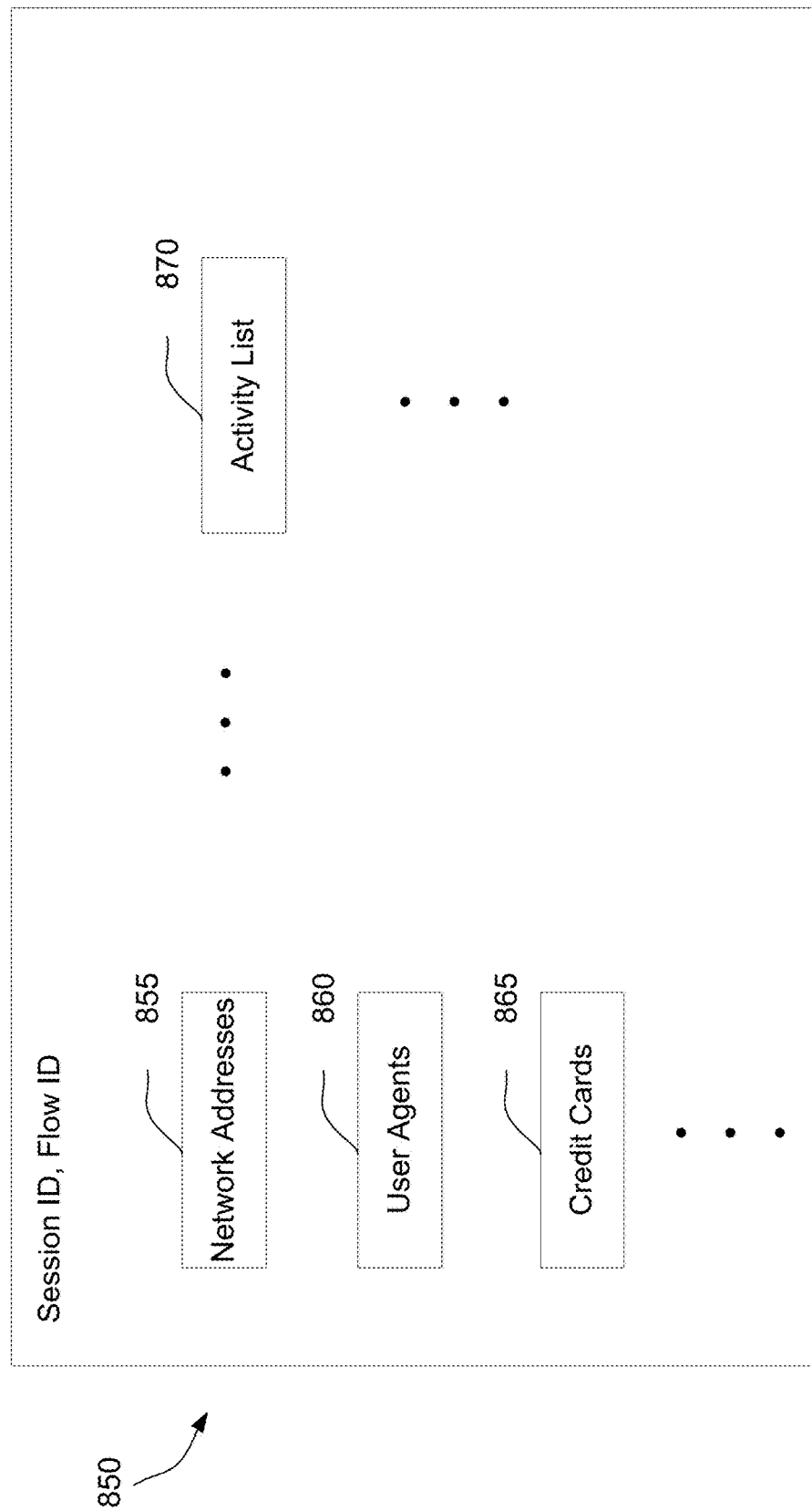
FIG. 8B shows an illustrative data structure 850 for recording observations from a digital interaction, in accordance with some embodiments.

FIG. 8A shows an illustrative data structure 800 for recording observations from a digital interaction, in accordance with some embodiments. For instance, the data structure 800 may be used by a security system (e.g., the illustrative security system 14 shown in FIG. 1A) to record distinct anchor values of a same type that have been observed in a certain context. However, that is not required, as in some embodiments the data structure 800 may be used to record other distinct values, instead of, or in addition to, anchor values.

In some embodiments, the data structure 800 may be used to store up to N distinct anchor values of a same type (e.g., N distinct credit card numbers) that have been seen in a digital interaction. For instance, in some embodiments, the data structure 800 may include an array 805 of a certain size N. Once the array has been filled, a suitable method may be used to determine whether to discard a newly observed credit card number, or replace one of the stored credit card numbers with the newly observed credit card number. In this manner, only a bounded amount of data may be analyzed in response to a query, regardless of an amount of raw data that has been received.

In some embodiments, the number N of distinct values may be chosen to provide sufficient information without using an excessive amount of storage space. For instance, a security system may store more distinct values (e.g., 8-16) if precise values are useful for matching sameness, and fewer distinct values (e.g., 2-4) if precise values are less important. In some embodiments, N may be 8-16 for network addresses, 4-8 for credit card numbers, and 2-4 for user agents. The security system may use the network addresses to determine if there is a legitimate reason for multiple network addresses being observed (e.g., a user traveling and connecting to a sequence of access points along the way), whereas the security system may only look for a simple indication that multiple user agents have been observed.

It should be appreciated that aspects of the present disclosure are not limited to the use of an array to store distinct anchor values. Other data structures, such as linked list, tree, etc., may also be used.

The inventors have recognized and appreciated that it may be desirable to store additional information in the data structure 800, beyond N distinct observed values. For instance, it may be desirable to store an indication of how many distinct values have been observed overall, and how such values are distributed. Accordingly, in some embodiments, possible values may be divided into a plurality of M buckets, and a bit string 810 of length M may be stored in addition to, or instead of, N distinct observed values. Each bit in the bit string 810 may correspond to a respective bucket, and may be initialized to 0. Whenever a value in a bucket is observed, the bit corresponding to that bucket may be set to 1.

Possible values may be divided into buckets in any suitable manner. For instance, in some embodiments, a hash function may be applied to possible values and a modulo operation (with modulus M) may be applied to divide the resulting hashes into M buckets. The modulus M may be chosen to achieve a desired balance between precision and efficiency. For instance, a larger number of buckets may provide a higher resolution (e.g., fewer possible values being lumped together and becoming indistinguishable), but the bit string 810 may take up more storage space, and it may be computationally more complex to update and/or access the bit string 810.

It should be appreciated that aspects of the present disclosure are not limited to the use of hash-modding to divide possible values into buckets, as other methods may also be suitable. For instance, in some embodiments, one or more techniques based on Bloom filters may be used.

FIG. 8B shows an illustrative data structure 850 for recording observations from a digital interaction, in accordance with some embodiments. For instance, the data structure 850 may be used by a security system (e.g., the illustrative security system 14 shown in FIG. 1A) to record distinct anchor values that have been observed in a certain context. However, that is not required, as in some embodiments the data structure 850 may be used to record other distinct values, instead of, or in addition to, anchor values.

In the example shown in FIG. 8B, the data structure 850 may be indexed by a session identifier and a flow identifier. The session identifier may be an identifier assigned by a web server for a web session. The flow identifier may identifier a flow (e.g., the illustrative flow 40 shown in FIG. 1C), which may include a sequence of activities. The security system may use the session and flow identifiers to match a detected activity to the digital interaction. However, it should be appreciated that aspects of the present disclosure are not limited to the use of a session identifier and a flow identifier to identify a digital interaction.

In some embodiments, the data structure 850 may include a plurality of components, such as components 855, 860, 865, and 870 shown in FIG. 8B. Each of the components 855, 860, 865, and 870 may be similar to the illustrative data structure 800 shown in FIG. 8A. For instance, the component 855 may store up to a certain number of distinct network addresses observed from the digital interaction, the component 860 may store up to a certain number of distinct user agents observed from the digital interaction, the component 865 may store up to a certain number of distinct credit card numbers observed from the digital interaction, etc.

In some embodiments, the data structure 850 may include a relatively small number (e.g., 10, 20, 30, etc.) of components such as 855, 860, 865, and 870. In this manner, a relatively small amount of data may be stored for each on-going digital interaction, while still allowing a security system to conduct an effective sameness analysis.

In some embodiments, the component 870 may store a list of lists of indices, where each list of indices may correspond to an activity that took place in the digital interaction. For instance, with reference to the illustrative flow 40 shown in FIG. 1C, a first list of indices may correspond to logging in, a second list of indices may corresponding to changing billing address, a third list of indices may correspond to viewing the first product, a fourth list of indices may correspond to viewing the second product, a fifth list of indices may correspond to adding the second product to the shopping cart, and a sixth list of indices may correspond to checking out.

In some embodiments, each list of indices may indicate anchor values observed from the corresponding activity. For instance, a list [1, 3, 2, . . . ] may indicate the first network address stored in the component 855, the third user agent stored in the component 860, the second credit card stored in the component 865, etc. This may provide a compact representation of the anchor values observed from each activity.

In some embodiments, if an anchor value stored in a component is replaced by another anchor value, one or more lists of indices including the anchor value being replaced may be updated. For instance, if the first network address stored in the component 855 is replaced by another network address, the list [1, 3, 2, . . . ] may be updated as [ϕ, 3, 2, . . . ], where ϕ is any suitable default value (e.g., N+1, where N is the capacity of the component 855).

In some embodiments, a security system may use a list of lists of indices to determine how frequently an anchor value has been observed. For instance, the security system may count a number of lists in which the index 1 appears at the first position. This may indicate a number of times the first network address stored in the component 855 has been observed.

It should be appreciated that the components 855, 860, 865, and 870 shown in FIG. 8B and discussed above solely for purposes of illustration, as aspects of the present disclosure are not limited to storing any particular information about a current digital interaction, or to any particular way of representing the stored information. For instance, other types of component data structures may be used in addition to, or instead of, the illustrative data structure 800 shown in FIG. 8A.

Figure 9:
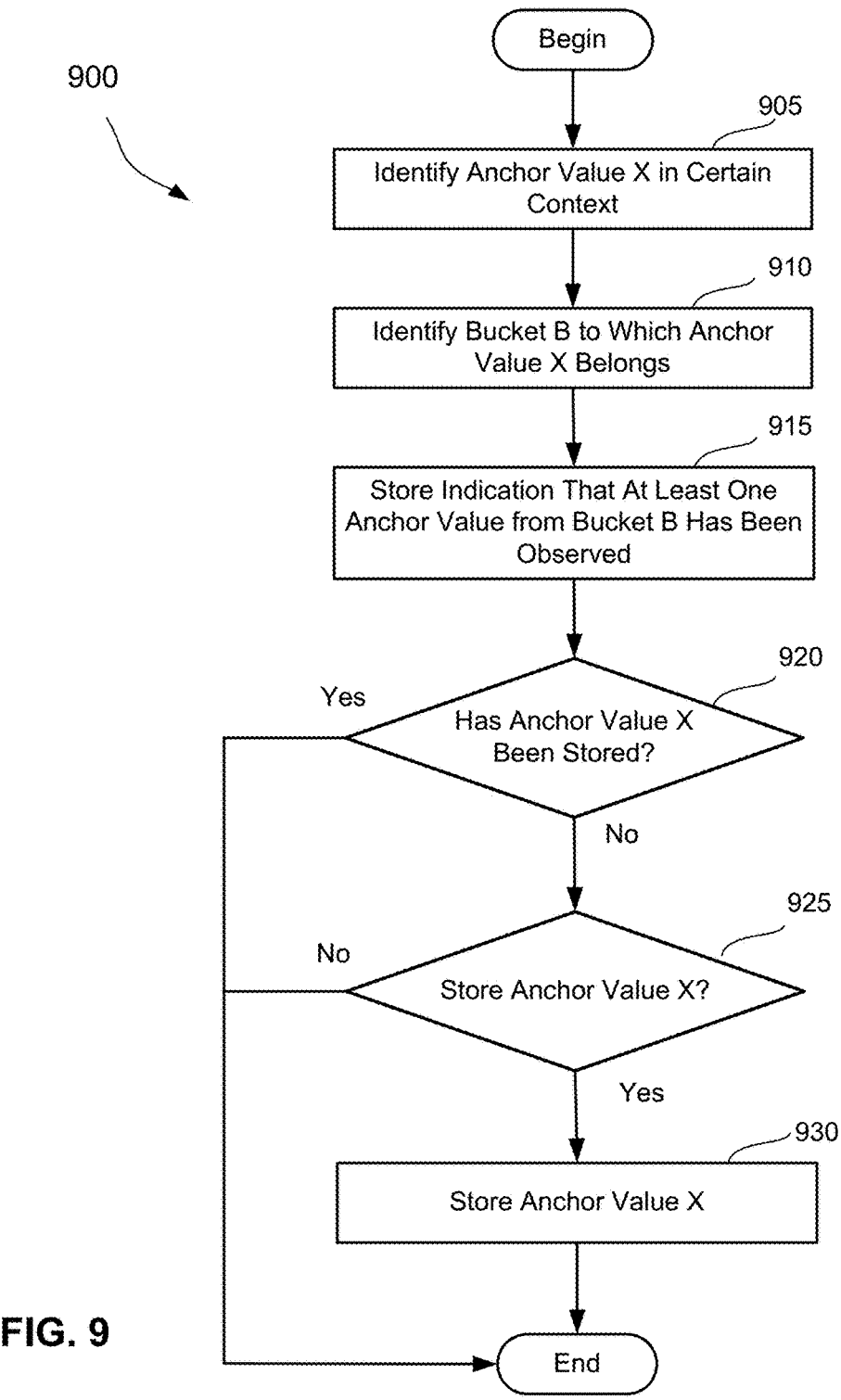
FIG. 9 shows an illustrative process 900 for recording observations from a digital interaction, in accordance with some embodiments.

FIG. 9 shows an illustrative process 900 for recording observations from a digital interaction, in accordance with some embodiments. For instance, the process 900 may be performed by a security system (e.g., the illustrative security system 14 shown in FIG. 1A) to record distinct values of a same type (e.g., N distinct credit card numbers) that have been observed in a certain context (e.g., in a certain digital interaction). The distinct values may be recorded in a data structure such as the illustrative data structure 800 shown in FIG. 8A.

At act 905, the security system may identify an anchor value X in a certain context. For instance, in some embodiments, the anchor value X may be observed from a certain digital interaction. This may be done in any suitable manner, for example, as discussed in connection with act 505 of FIG. 5. In some embodiments, the security system may access a record of the digital interaction, and may identify from the record a data structure associated with a type T of the anchor value X. For instance, if the anchor value X is a credit card number, the security system may identify, from the record of the digital interaction, a data structure for storing credit card numbers observed from the digital interaction.

At act 910, the security system may identify a bucket B to which the anchor value X belongs. For instance, in some embodiments, a hash-modding operation may be performed to map the anchor value X to the bucket B as described above in connection with FIG. 8A.

At act 915, the security system may store an indication that at least one anchor value from the bucket B has been observed in connection with the digital interaction. For instance, the security system may operate on the data structure identified at act 905. With reference with the example shown in FIG. 8A, the security system may identify, in the illustrative bit string 810, a position that corresponds to the bucket B identified at act 910 and write 1 into that position.

At act 920, the security system may determine whether the anchor value X has already been stored in connection with the relevant context. For instance, the security system may check if the anchor value X has already been stored in the data structure identified at act 905. With reference to the example shown in FIG. 8A, the security system may look up the anchor value X in the illustrative array 805. This lookup may be performed in any suitable manner. For instance, if the array 805 is sorted, the security system may perform a binary search to determine if the anchor value X is already stored in the array 805.

If it is determined at act 920 that the anchor value X has already been stored, the process 900 may end. Although not shown, the security system may, in some embodiments, increment one or more counters for the anchor value X prior to ending the process 900.

If it is determined at act 920 that the anchor value X has not already been stored, the security system may proceed to act 925 to determine whether to store the anchor value X. With reference to the example shown in FIG. 8A, the security system may, in some embodiments, store the anchor value X if the array 805 is not yet full. If the array 805 is full, the security system may determine whether to replace one of the stored anchor values with the anchor value X.

As one example, the security system may store in the array 805 the first N distinct anchor values of the type T observed from the digital interaction, and may discard every subsequently observed anchor value of the type T. As another example, the security system may replace the oldest stored anchor value with the newly observed anchor value, so that the array 805 stores the last N distinct values of the type T observed in the digital interaction. As another example, the security system may store in the array 805 a suitable combination of N anchor values of the type T, such as one or more anchor values observed near a beginning of the digital interaction, one or more anchor values most recently observed from the digital interaction, one or more anchor values most frequently observed from the digital interaction (e.g., based on respective counters stored for anchor values, or lists of indices such as the illustrative component 870 shown in FIG. 8B), and/or one or more other anchor values of interest (e.g., one or more credit card numbers previously involved in credit card cycling attacks).

In some embodiments, a security system may maintain historical information (e.g., statistics regarding an anchor value or a combination of anchor values) in a data structure adapted for efficient access. The inventors have recognized and appreciated that, while a counter may be used to keep track of a total number of times an event occurred over some period of time, it may desirable to maintain additional information, such as how occurrences of the event are distributed over that period of time. For instance, 10 occurrences spread out over a week may be assessed differently from a burst of 10 occurrences within one hour. Accordingly, in some embodiments, a plurality of counters are used to provide variable time resolution.

FIG. 6 shows an illustrative data structure 600 for maintaining statistics over one or more intervals of time, in accordance with some embodiments. For example, the data structure 600 may be used by a security system (e.g., the illustrative security system 14 shown in FIG. 1A) to keep track of how frequently a second-degree anchor value is observed with a first-degree anchor value. In some embodiments, such a data structure may be stored in a profile of a first-degree anchor value (e.g., replacing the illustrative counter 410A shown in FIG. 4 to keep track of how frequently the illustrative second-degree network address 130A is seen with the illustrative first-degree email 105). However, that is not required, as the data structure 600 may be used to keep track of occurrences of any suitable type of event and may be stored in any suitable manner.

In the example shown in FIG. 6, the data structure 600 includes three sets of counters—605, 610, and 615. Each counter may correspond to a respective time interval and may keep track of a number of times a certain event (e.g., a certain second-degree anchor value being observed with a certain first-degree anchor value). The set 605 may correspond to a two-week interval (e.g., past two weeks), and may include 14 counters, one for each one-day interval to keep track of a number of times the event is observed during that one-day interval. The set 610 may correspond to a one-day interval (e.g., past day), and may include 24 counters, one for each one-hour interval to keep track of a number of times the event is observed during that one-hour interval. The set 615 may correspond to a one-hour interval (e.g., past hour), and may include 12 counters, one for each five-minute interval to keep track of a number of times the event is observed during that five-minute interval.

The inventors have recognized and appreciated that by maintaining multiple sets of counters with different time resolutions, a security system may be able to answer interesting queries by analyzing a bounded amount of data. For instance, if a security system only maintains the most recent N occurrences of an event, where N is a certain number, a recent spike of more than N occurrences may displace useful historical information. By contrast, a security system that maintains a data structure such as the data structure 600 may have ready access to historical information over some period of time (e.g., two weeks), regardless of any recent spike. Furthermore, a security system that maintains a data structure such as the data structure 600 may be able to "zoom in" from most recent two weeks to most recent day, to most recent hour, to most recent five minutes, etc., without having to analyze raw data on the fly.

It should be appreciated that the example shown in FIG. 6 and described above is provided solely for purposes of illustration, as aspects of the present disclosure are not limited to the use of any particular number of counters, or to any particular time resolution. As one example, 10-min (or 15-min) intervals may be used instead of five-min intervals, so that the set 615 may include six (or four) counters, instead of 12. As another example, the set 605 may include seven one-day counters, instead of 14. As another example, another set of counters may be maintained, including any suitable number of one-week counters (e.g., 4, 8, 12, 16, etc.). The inventors have recognized and appreciated that the length of intervals (e.g., five minutes, one hour, one day, etc.) may be chosen to achieve a desired balance between reducing storage requirement and providing a higher time resolution, and the number of counters and/or the number of sets of counters may be chosen to achieve a desired balance between reducing storage requirement and making more historical information readily accessible. Furthermore, it should be appreciated that each set of counters may be implemented in any suitable manner, including, but not limited to, as an array or linked list.

Figure 7A:
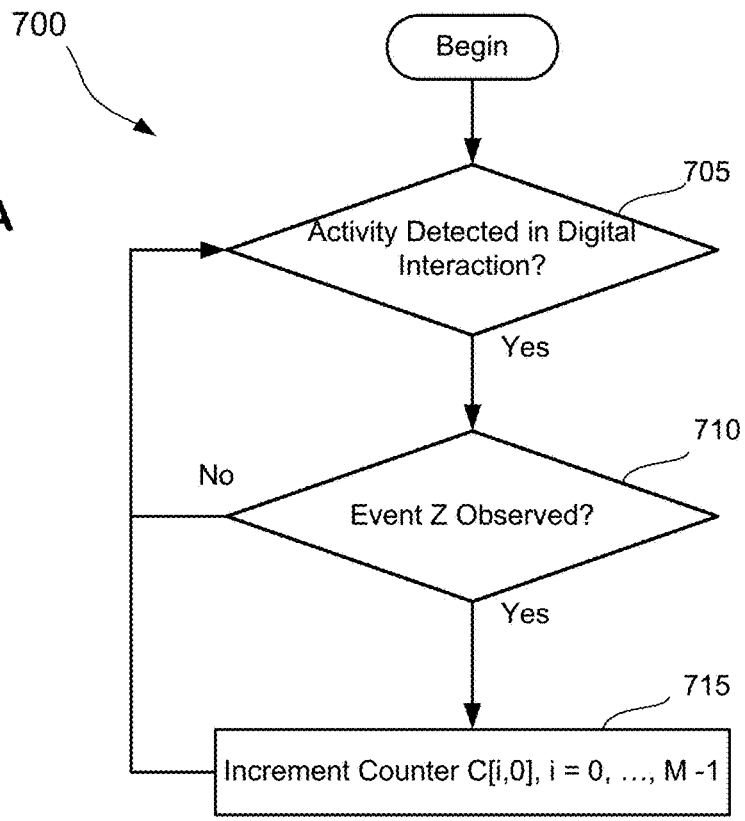
FIG. 7A shows an illustrative process 700 that may be performed by a security system to update a set of counters, in accordance with some embodiments.

FIG. 7A shows an illustrative process 700 that may be performed by a security system to update a set of counters, in accordance with some embodiments. For example, the process 700 may be used by a security system (e.g., the illustrative security system 14 shown in FIG. 1A) to update a data structure for maintaining statistics regarding a certain event (e.g., the illustrative data structure 600 shown in FIG. 6).

At act 705, the security system may detect an activity in a digital interaction. For example, the security system may receive information regarding a new digital interaction (e.g., a user arriving at a certain web site) or an on-going digital interaction. Such information may be received from a user device via which the user is browsing, an online system serving the web site to the user, or some other suitable system (e.g., firewall, network accelerator, dedicated network device used by the security system, etc.).

In some embodiments, the security system may use a session identifier and a flow identifier to identify a digital interaction. The session identifier may be an identifier assigned by a web server for a web session. The flow identifier may identifier a flow, which may include a sequence of activities by a user, such as logging in, changing account information, making a purchase or transfer, etc. The security system may use the session and flow identifiers to match a detected activity to an on-going digital interaction.

At act 710, the security system may determine if an event Z is observed in connection with the digital interaction detect at act 705. For instance, in some embodiments, the event Z may be observing anchor values X and Y from the digital interaction. The anchor values X and Y may be identified in any suitable manner, for example, as discussed in connection with act 505 of FIG. 5. Other examples of events include, but are not limited to, the following:

- observing a certain anchor value (e.g., network address, registrar, account identifier, device fingerprint, device identifier, phone number, credit card number hash, BIN, gift card number, etc.);
- observing a certain login disposition (e.g., incomplete, failed, success, etc.);
- a certain product (e.g., SKU, name, etc.) or product category being viewed or added to shopping cart;
- observing a certain checkout attribute (e.g., success/fail, number of items in shopping cart, total amount, etc.);
- a certain score being assigned to a digital interaction (e.g., account takeover, automation, consumer value, etc.);
- etc.

In some embodiments, any of the above (or other) event may be defined based on buckets. For instance, anchor values of a same type may be hashmodded into a plurality of buckets, and an event may include observing any anchor value from a certain bucket. Additionally, or alternatively, an event may be defined based on a combination of observations (e.g., a combination of an account identifier, a device fingerprint, and a device identifier, a combination of an email domain and a zip code, a sequence of activities such as login, registration, and checkout, etc.)

In response to determining that an event Z is observed in connection with the digital interaction detected at act 705, the security system may, at act 715, update one or more counters. For instance, with reference to the example shown in FIG. 6, the security system may increment each of the counters C[0,0] (e.g., past five minutes), C[1,0] (e.g., past hour), and C[2,0] (e.g., past day). In this manner, the counters may be kept up-to-date and ready for use. For instance, in some embodiments, the counters may be kept in memory. Whenever one or more counter values are needed, the security system may simply look up the counters from memory, without having to access data from disk storage.

Once the appropriate counters have been updated, the security system may return to act 705 to process another activity. The system may also return to act 705 if it is determined at act 710 that the event Z is not observed.

Figure 7B:
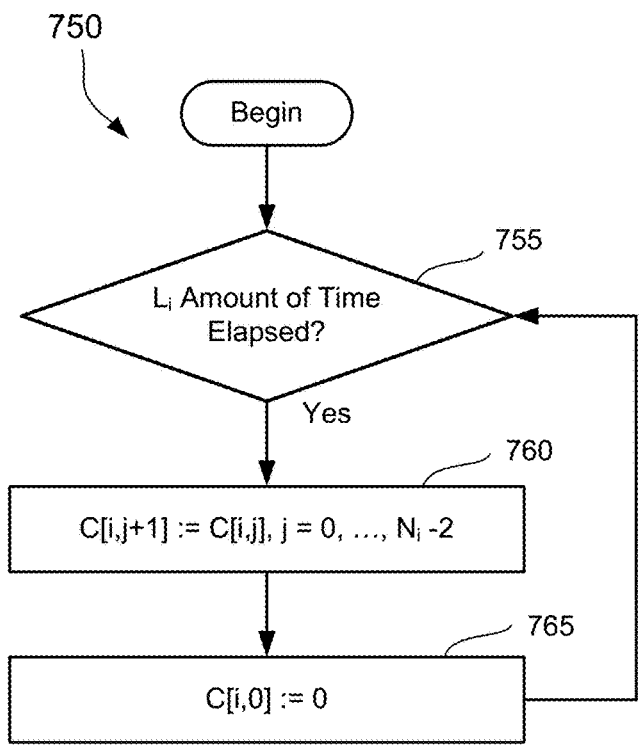
FIG. 7B shows an illustrative process 750 that may be performed by a security system to update a set of counters, in accordance with some embodiments.

FIG. 7B shows an illustrative process 750 that may be performed by a security system to update a set of counters, in accordance with some embodiments. For example, the process 700 may be used by a security system (e.g., the illustrative security system 14 shown in FIG. 1A) to update a data structure for maintaining statistics regarding a certain event (e.g., the illustrative data structure 600 shown in FIG. 6). The process 750 may be performed in addition to, or instead of, the illustrative process 700 shown in FIG. 7A.

The inventors have recognized and appreciated that while it may be desirable to have some ability to access historical information, more recent information (e.g., activities from the past five minutes, one hour, one day, etc.) may be more valuable than older information (e.g., activities from a week ago, two weeks ago, a month ago, etc.). Accordingly, in some embodiments, counters corresponding to consecutive time intervals may be shifted periodically, where the value in the counter corresponding to the oldest interval may be discarded or moved to some other storage (e.g., mass storage that is cheaper but less accessible). As a result, the counters may take up only a bounded amount of storage.

Referring to the example shown in FIG. 6, a period $L_i$ for shifting counters may be five minutes (or one hour, one day, etc.). At act 755, the security system may determine if an $L_i$ amount of time has elapsed since the last time the counters are shifted. If it is determined that an $L_i$ amount of time has elapsed since the last time the counters are shifted, the security system may proceed to act 760 to shift the counters. For instance, in some embodiments, each set of counters may be implemented as an array, and the value in each counter may be copied into the next counter, where the value in the counter corresponding to the oldest interval may simply be overwritten. The security system may then proceed to act 765 to reset the counter corresponding to the most recent interval to 0.

It should be appreciated that the details shown in FIGS. 7A-B are provided solely for purposes of illustration, as aspects of the present disclosure are not limited to any particular manner of implementation. For instance, in some embodiments, each set of counters may be implemented as a linked list in reverse chronological order, and the security system may, at act 760 of the illustrative process 750, remove the counter corresponding to the oldest interval from the end of the list. Then, at act 765, the security system may add a counter that is initialized to 0 at the beginning of the list, corresponding to the most recent interval.

The inventors have recognized and appreciated that as the volume of digital interactions processed by a security system increases, the collection of counters maintained by the security system may become unwieldy. Accordingly, in some embodiments, a lower-resolution event may be defined to encompass a plurality of higher-resolution events, and a set of counters may be maintained for the lower-resolution event, as opposed to maintaining a separate set of counters for each higher-resolution event. For instance, anchor values of a same type (e.g., network address) may be divided into a plurality of buckets. Rather than maintaining one or more counters for each anchor value, the security system may maintain one or more counters for each bucket of anchor values.

As an example, a counter may keep track of a number of times any network address from a bucket B of network addresses is seen with an email address X, as opposed to a number of times a particular network address Y is seen with the email address X. Thus, multiple counters (e.g., a separate counter for each anchor value in the bucket B) may be replaced with a single counter (e.g., an aggregate counter for all anchor values in the bucket B). In this manner, a desired balance between precision and efficiency may be achieved by selecting an appropriate number of buckets. For instance, a large number of buckets may provide a higher event resolution, but more counters may be maintained and updated, whereas a smaller number of buckets may reduce storage requirement and speed up retrieval and updates, but more information may be lost (e.g., more network addresses being lumped together and becoming indistinguishable).

The inventors have recognized and appreciated that it may be desirable to spread anchor values roughly evenly across a plurality of buckets. Accordingly, in some embodiments, a hash function may be applied to anchor values and a modulo operation may be applied to divide the resulting hashes into a plurality of buckets, where there may be one bucket for each possible residue of the modulo operation. An appropriate modulus may be chosen based on how many buckets are desired, and an appropriate hash function may be chosen to spread the anchor values evenly across possible hashes. Examples of hash functions include, but are not limited to, MD5, MD6, SHA-1, SHA-2, SHA-3, etc. However, it should be appreciated that aspects of the present disclosure are not limited to the use of hash-modding to divide anchor values into buckets, as other methods may also be suitable.

The inventors have recognized and appreciated that although a security system may perform database queries to answer questions about histories of anchor values, such queries may be complex and hence slow. A security system may not be able to respond to a request to match sameness within fractions of a second if the security system were to run complex database queries each time such a request is received. Accordingly, in some embodiments, a security system may maintain an aggregate data structure for an anchor value. The aggregate data structure may store information that summarizes activities observed from the anchor value over some suitable period of time (e.g., one day, one week, one month, etc.), and the security system may store any suitable number of such aggregate data structures (e.g., one, two, three, six, nine, 12, 13, 15, etc.). The aggregate data structure may be adapted to be accessed efficiently, and the security system may keep the aggregate data structure up-to-date as additional raw data arrives.

FIG. 10 shows an illustrative aggregate data structure 1000 for an anchor value, in accordance with some embodiments. For instance, the aggregate data structure 1000 may be stored in a profile of an email address X (e.g., the illustrative profile 400 shown in FIG. 4 for the illustrative first-degree email address 105 shown in FIG. 2). In some embodiments, a security system may maintain an aggregate data structure such as the aggregate data structure 1000 for each anchor value and/or each bucket of anchor values (e.g., based on a hash-modding operation).

In the example shown in FIG. 10, the aggregate data structure 1000 includes M monthly aggregates, such as the monthly aggregate 1005. However, it should be appreciated that aspects of the present disclosure are not limited to aggregating data on a monthly basis. An amount of time covered by each aggregate may be varied to provide a desirable time resolution. Moreover, the number M of aggregates may be selected to make sufficient historical information readily accessible, without taking up an excessive amount of storage.

In some embodiments, an aggregate data structure may include a plurality of aggregate counters. For instance, in the example shown in FIG. 10, the monthly aggregate 1005 includes aggregate counters 1010, 1015, 1020, 1025, and 1030. In some embodiments, each of these aggregate counters may be an array of one or more dimensions. For instance, the aggregate counter 1010 may be an array, IP_Add [ ], which may be indexed by network addresses. For each network address Y, an array entry IP_Add [Y] may be a counter that counts a number of times the network address Y is observed with the email address X over the past month. Similarly, the aggregate counter 1015 may be an array, Dev_Id [ ], indexed by device identifiers, where an array entry Dev_Id [Z] may be a counter that counts a number of times a device identifier Z is observed with the email address X over the past month, and the aggregate counter 1020 may be an array, Cred_No [ ], indexed by credit card numbers, where an array entry Cred_No [U] may be a counter that counts a number of times a credit card number U is observed with the email address X over the past month.

It should be appreciated that aspects of the present disclosure are not limited to maintaining a counter for each counter value (e.g., network address, device identifier, credit card number, etc.). For instance, as discussed above in connection with FIGS. 6 and 7A-B, a counter may be maintained for a bucket of counter values (as opposed to an individual counter value), and/or a set of counters may be maintained to provide variable time resolution. Furthermore, aspects of the present disclosure are not limited to using an array to store counters. In some embodiments, counters may be stored in a database table, or some other suitable data structure.

In the example shown in FIG. 10, the aggregate counters 1025 and 1030 are multi-dimensional arrays. For instance, the aggregate counter 1025 may be a multi-dimensional array Type [ ] . . . [ ] for keeping track of numbers of occurrences of different types of digital interactions observed with the email address X over the past month. FIG.

11 shows an illustrative tree 1100 of access paths into the array Type [ ] . . . [ ], in accordance with some embodiments.

In some embodiments, each level in the tree 1100 may correspond to a dimension in the array Type [ ] . . . [ ]. For instance, a top level 1105 may correspond to a first dimension indicating an event type (e.g., login, account creation, changing password, etc.), a middle level 1110 may correspond to a second dimension indicating an industry type (e.g., finance, ecommerce, etc.), and a bottom level 1115 may correspond to a third dimension indicating a signal type (e.g., automation, account takeover, etc.). Starting from a root node, an access path (e.g., shown in dashed arrows in FIG. 11) may traverse all three levels in the tree 1100 and reach a leaf node, which may correspond to the following counter.

Counter [Login, Ecommerce, Account_Takeover]

This counter may count a number of times a login event is observed with the email address X, where the login event is for an ecommerce transaction and a security system has labeled the login event as a possible account takeover attempt.

The inventors have recognized and appreciated that access paths may be defined so that queries that are more commonly made may be answered more efficiently. For instance, although the three levels 1105 (event type), 1110 (industry type), and 1115 (signal type) may be arranged in any order, the illustrative ordering shown in FIG. 11 may allow efficient access for commonly made queries. For instance, summing up all counters in a subtree may be easier than summing up counters in selected branches in different subtrees.

Returning to the example of FIG. 10, the aggregate counter 1030 may be a multi-dimensional array Score [ ] . . . [ ] similar to the array Type [ ] . . . [ ]. For instance, the array Score [ ] . . . [ ] may have three dimensions. The first dimension may indicate an event type (e.g., login, account creation, changing password, etc.), a second dimension may indicate a score type (e.g., behavior score, transactional score, etc.), and a third dimension may indicate a score category (e.g., high risk, medium risk, or low risk for behavior score, high value, medium value, or low value for transactional score, etc.). Although not show, an access path may lead to a counter, such as Counter [Login, Behavior, High], which may count a number of times a login event is observed with the email address X, where a security system has assigned a behavior score in a high risk category to the login event.

Figure 11:
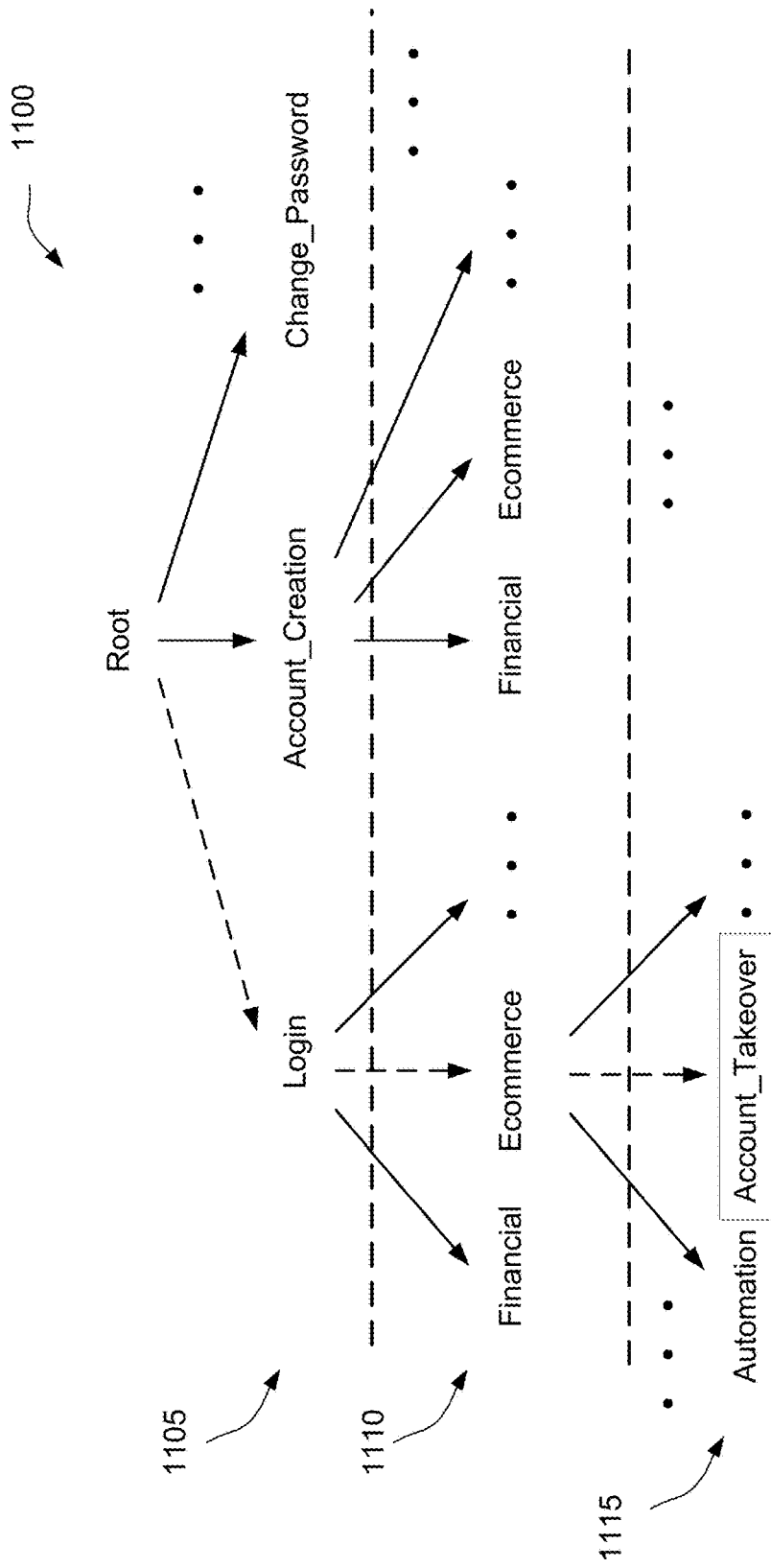
FIG. 11 shows an illustrative tree 1100 of access paths into an array of counters, in accordance with some embodiments.

It should be appreciated that details of implementation are shown in FIGS. 10-11 and described above solely for purposes of illustration. The inventive concepts described herein may be implemented in any suitable manner. For instance, aspects of the present disclosure are not limited to any particular number of levels in an access tree, or to any particular number of nodes at any level in an access tree.

In some embodiments, each leaf node may correspond to a single counter, or a set of counters (e.g., as shown in FIG. 6 to provide variable time resolution). Additionally, or alternatively, a node in an access tree may correspond to a bucket of values, rather than a single value. As one example, a security system may assign a numeric score (e.g., behavior score, transactional score, etc.), and appropriate thresholds may be used to divide possible numeric scores into buckets (e.g., high, medium, and low). As another example, a security system may label events with tens or even hundreds of different possible signals, but, for purposes of the aggregate data structure 1000, the possible signals may be divided into a small number of buckets (e.g., automation, account takeover, etc.).

Figure 12:
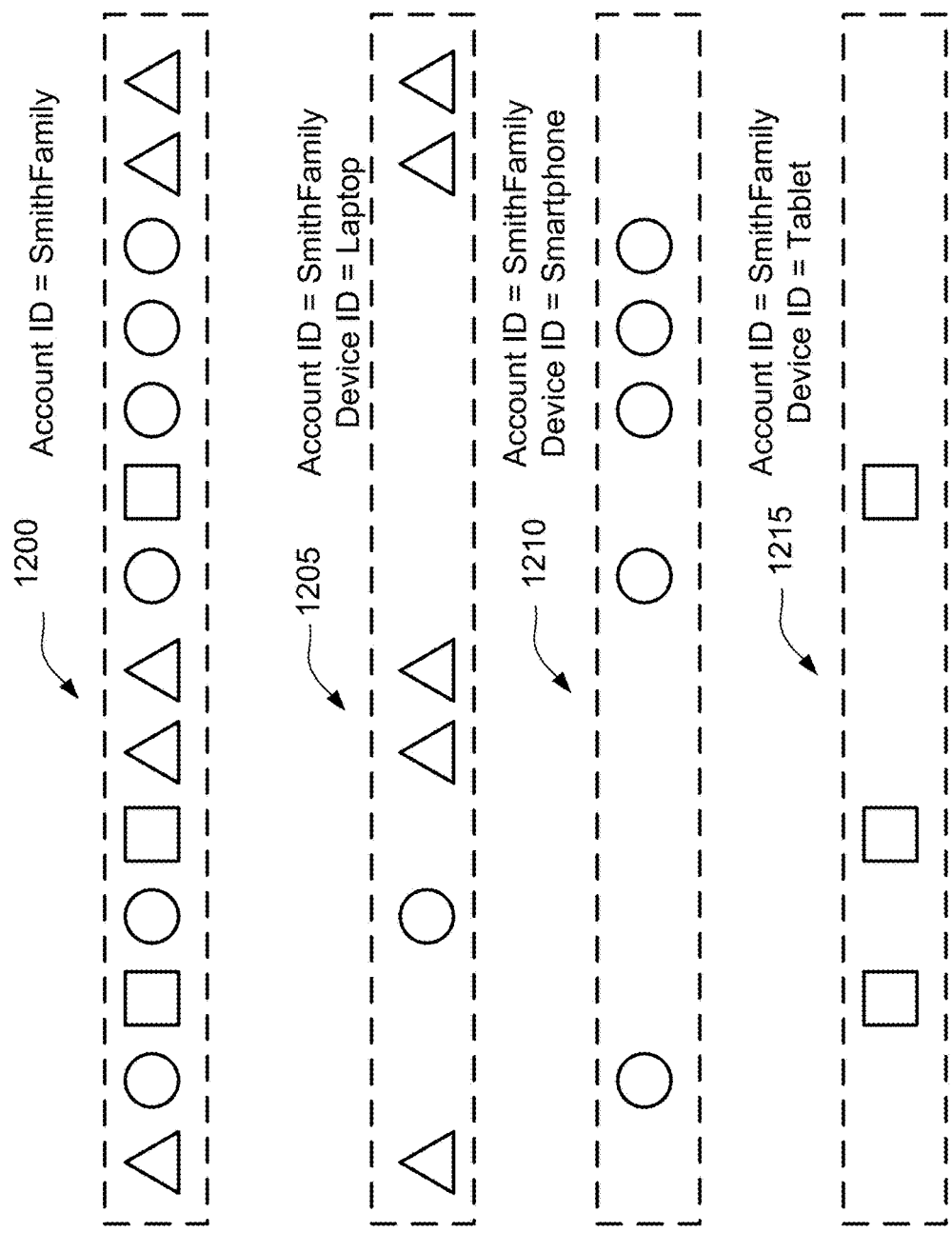
FIG. 12 shows an illustrative data collection 1200 and illustrative segmentations thereof, in accordance with some embodiments.

FIG. 12 shows an illustrative data collection 1200 and illustrative segmentations thereof, in accordance with some embodiments. For instance, the data collection 1200 may include observations from a plurality of digital interactions associated with a certain account (or some other anchor value). The observations may be of any suitable type. In some embodiments, each observation may include measurements taken from physical interactions between a user and a device during a digital interaction. Examples of such measurements include, but are not limited to, device angle, tying cadence, touchscreen gesture, etc. In some embodiments, each observation may include transactional data, such as type of transaction (e.g., opening new account, purchasing goods or services, transferring funds, etc.), value of transaction (e.g., purchase amount, transfer amount, etc.), and/or any other suitable information (e.g., type of goods or services purchased, form of payment, etc.). Other types of observations may also be possible, as aspects of the present disclosure are not limited to the analysis of any particular type of observations from digital interactions.

The inventors have recognized and appreciated that a collection of data such as the collection 1200 may be noisy. For instance, the account may be shared by multiple members of a family. As a result, observations in the collection 1200 may correspond to different users. In the example shown in FIG. 12, a circle may indicate an observation taken from a digital interaction conducted by a first user (e.g. Mom), a triangle may indicate an observation taken from a digital interaction conducted by a second user (e.g. Dad), and a square may indicate an observation taken from a digital interaction conducted by a third user (e.g. Son). Each person may behave differently (e.g., different typing cadence, different browsing pattern, different purchase habit, etc.). As result, no clear pattern may emerge if the data collection 1200 is analyzed without segmentation.

The inventors have recognized and appreciated that patterns may emerge more clearly once a collection of data is segmented along an appropriate dimension. For instance, in the example shown in FIG. 12, the different family members may tend to use different devices to log into the account. For example, Mom may tend to use her smartphone but may occasionally use Dad's laptop, whereas Dad may always use his laptop and Son may always use his tablet. Thus, segmenting the data collection 1205 may help detect useful patterns for matching sameness.

For instance, data collections 1205, 1210, and 1215 may result from segmenting the data collection 1200 by device identifier. Since the data collection 1200 may itself be a result of segmenting a larger collection of data (e.g., segmenting, by account identifier, observations from all digital interactions conducted with a certain online merchant, bank, etc.), each of the data collection 1205, 1210, and 1215 may be viewed as a result of segmenting the larger collection of data by a combination of anchors (e.g., account identifier and device identifier).

In this manner, a security system may perform pattern detection analysis on a less noisy collection of data. For instance, each of the data collection 1205, 1210, and 1215 may include observations taken exclusively or predominantly from a single user. An analysis on the data collection 1205 may detect a stronger pattern, and likewise for an analysis on the data collection 1210 and an analysis on the data collection 1215. The inventors have recognized and appreciated that strong patterns may be useful matching sameness, even if the security system is oblivious as to which pattern belongs to which user, or even which users are using the account. As long as the security system is able to match observations from a digital interaction to one of the three patterns, the security system may be able to infer with a high level of confidence that an entity engaging in the digital interaction is a same user as previously encountered.

It should be appreciated that account identifier and device identifier are used in the example of FIG. 12 solely for purposes of illustration, as aspects of the present disclosure are not limited to the use of any particular combination of anchors for segmenting data. Any one or more anchors (e.g., account identifier, device identifier, network address, email address, credit card number, etc.) may be used to segment data prior to performing pattern detection analysis.

Figure 13:
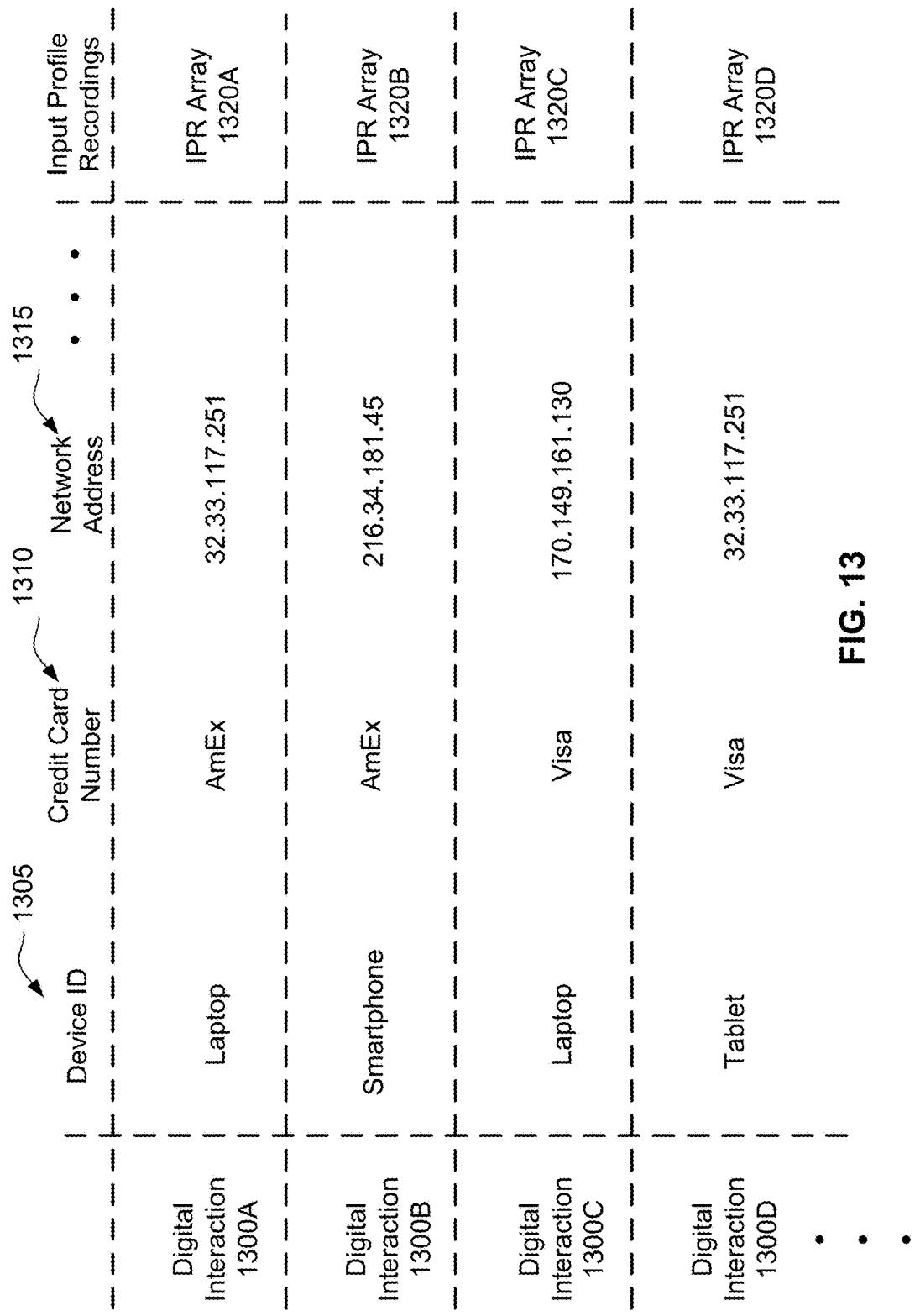
FIG. 13 shows illustrative digital interactions 1300A-D and associated anchor values, in accordance with some embodiments.

FIG. 13 shows illustrative digital interactions 1300A-D and associated anchor values, in accordance with some embodiments. For instance, the digital interactions 1300A-D may be conducted via a same account with a certain online merchant, bank, etc. However, that is not required, as aspects of the present disclosure are not limited to segmenting data by any particular anchor.

In some embodiments, each of the digital interactions 1300A-D may be associated with a plurality of first-degree anchor values. These anchor values may be determined in any suitable manner, for example, as described above in connection with FIGS. 2-5. For instance, each digital interaction may be associated with a device identifier (shown in column 1305 in FIG. 13), a credit card number (shown in column 1310 in FIG. 13), a network address (shown in column 1315 in FIG. 13), etc. For brevity, textual labels "Laptop," "Smartphone," and "Tablet" are used to denote device identifiers, and textual labels "AmEx" and "Visa" are used to denote credit card numbers. It should be appreciated that a device identifier may be of any suitable form, such as a MAC (media access control) address. Likewise, a credit card number may be of any suitable form, such as a number with 15-19 digits.

In some embodiments, one or more input profile recordings (IPRs) may be stored for each of the digital interactions 1300A-D. For instance, IPR arrays 1320A-D may be stored, respectively, for the digital interactions 1300A-D. An IPR may include one or more measurements taken from physical interactions between a user and a device during a digital interaction. For example, an IPR in the array 1320A may include sequences of keystrokes, mouse clicks, pointer locations, gyroscope readings, accelerometer readings, light sensor readings, pressure sensor readings, and/or noise sensor readings recorded from the digital interaction 1300A, along with corresponding timestamps.

An IPR may be include measurements taken over any suitable amount of time, such as a few seconds, a few minutes, 10 minutes, 15 minutes, 30 minutes, an hour, etc. In some embodiments, about 60 kilobytes of data may be captured from a digital interaction per minute, so that an IPR spanning a few minutes may include a few hundred kilobytes of data, whereas an IPR spanning an hour may include a few megabytes of data. In some embodiments, a security system may receive and process billions, tens of billions, hundreds of billions, or trillions of IPRs each year. Accordingly, techniques are provided herein for efficiently storing and/or analyzing a high volume of behavior biometrics data.

Measurements may be taken from a digital interaction in any suitable manner. As one example, a web page loaded in connection with the digital interaction may include software that programs a web browser to interact with one or more sensors (e.g., via an operating system) to collect one or more measurements. As another example, an application via which the digital interaction is conducted may be programmed to interact with one or more sensors (e.g., via an operating system) to collect one or more measurements. The one or more measurements may be sent to an online system (e.g., the illustrative online system 12 or the illustrative online system 13 shown in FIG. 1A), which may then report the one or more measurements to a security system (e.g., the illustrative security system 14 shown in FIG. 1A). Alternatively, or additionally, one or more measurements may be sent directly from a user device (e.g., one of the illustrative user devices 11A-C shown in FIG. 1A) to a security system.

Examples of sensors include, but are not limited to, touchscreen, mouse, keyboard, gyroscope, accelerometer, network interface, etc. A sensor may be onboard a user device, or may be a separate device (e.g., a wearable device such as a smart watch or smart wristband) that is configured to transmit an output signal directly or indirectly to the user device, or directly or indirectly to an online system with or without any notification to the user device.

Examples of measurements that may be taken from a digital interaction include, but are not limited to the following.

Keyboard or touchscreen
    Down rate, up rate, duration of down, time between downs, speed of down, pressure of key down or touch pressure, speed of up, timing (consistency or inconsistency) between ups and downs, cadence between ups and downs, time and cadence between touches or keys for associated key values (e.g., time between keys a and b, vs. time between keys c and d), etc.
    Pressure, size of item touching or causing pressure, consistency of size (e.g., detecting multiple touch items, such as multiple fingers vs. single finger), shape of touch item (e.g., discriminating between different touch items, detecting "left thumb right thumb" typing on mobile device vs. just one finger pecking, etc), etc.

Pointer (e.g., mouse, touchpad, touchscreen, etc.)
    pointer location, mouse click, touch gesture, type and speed of gesture, swipe, timing between gestures, swipes and/or mouse clicks, etc.
    speed of movement, direction and change in direction of movement, pressure of touch or button push for movement, change in pressure across movement, number of touch points and associated parameters, direction of movement, frequency of movement, time between movements, consistency of time between movements, duration of movement, consistency of duration of movements, etc.

Device
    device angle (e.g., gyroscope readings), device movement (e.g., accelerometer and/or gyroscope readings), Other sensors
    light, noise (e.g., microphone), etc.

In some embodiments, a security system may analyze any combination of the above and/or other measurements to determine consistency, frequency, timing, etc. of activities, timing of changes, etc. For example, the inventors have recognized and appreciated that different typing patterns (e.g., typing common words quickly vs. typing numbers slowly but steadily) and/or transitions between different typing patterns may be detected by examining measurements taken from consecutive keystrokes (e.g., two, three, four, etc. consecutive keystrokes). Accordingly, in some embodiments, the security system may analyze triplets of consecutive keystrokes. For instance, a sequence of keystrokes "abcdef" may be decomposed into four triplets: "abc," "bcd," "cde," and "def." One or more of the following measurements may be taken for each triplet:
- time from first keystroke to last keystroke,
- average time of key being depressed,
- average time between keystrokes,
- consistency between key down time and key up time (e.g., deviation between time from "a" to "b," and time from "b" to "c"),
- etc.

Additionally, or alternatively, pointer position (e.g., via mouse, touchscreen, etc.) may be sampled at a certain rate, resulting in a timed sequence of position measurements, and triplets of such measurements may be examined to identify movement patterns for use in sameness matching (e.g., quick and jerky vs. slow and steady). In some embodiments, a sampling rate may be adjusted based on user activity. For instance, a high sampling rate may be used upon login, a low sample sampling rate may be used when no activity has been observed for some threshold amount of time, and a high sampling rate may be used again when an activity is observed.

In some embodiments, user interactions with a stylus may be analyzed in a similar manner. The stylus may be equipped with one or more sensors for measuring translational and/or rotational movement, pressure on a writing surface, location and/or pressure from one or more fingers holding the stylus, etc. Triplets from a timed sequence of measurements may be analyzed to identify patterns for sameness matching.

In some embodiments, a user interface element (e.g., button, menu item, text field, etc.) may be divided into multiple regions (e.g., four quadrants, five vertical strips, etc.). The security system may keep track of how often a user interacts with each region, for example, using the illustrative data structure 600 shown in FIG. 6. Such information may be used for sameness matching. For instance, if past logins to an account exhibited clicking on a left side of a certain button, but a current login exhibits clicking on a right side of the same button, additional analysis may be triggered to determine if an entity that is currently attempting to log in is likely a same user previously logging into the account.

In some embodiments, different types of measurements may be analyzed together to identify any correlation. For example, a mobile device that is not at all moving despite fast typing may suggest a bot playing a keystroke sequence from a stationary device.

Figure 14:
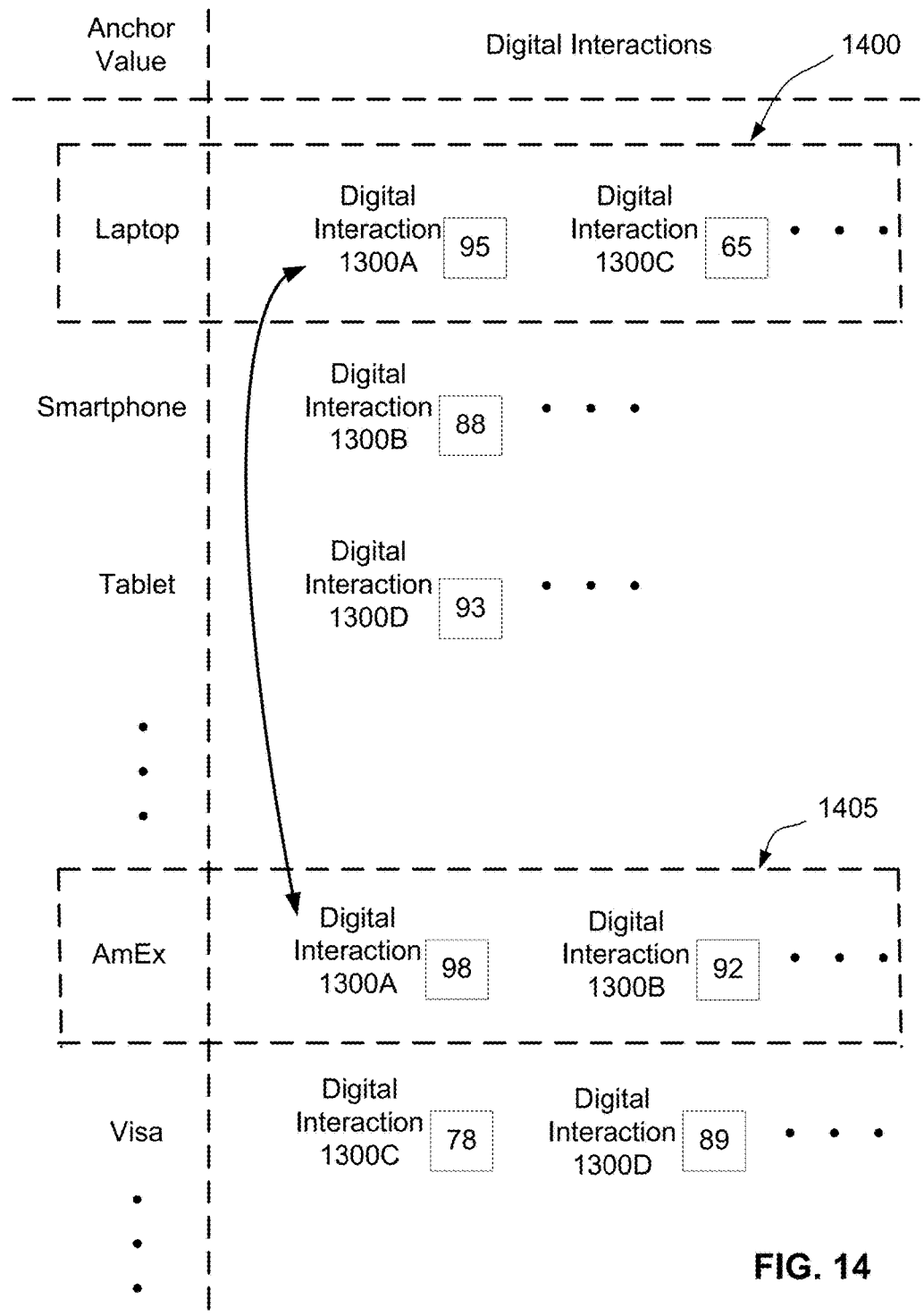
FIG. 14 shows a plurality of illustrative anchor values and respective streams of digital interactions, in accordance with some embodiments.

In some embodiments, the security system may divide environmental measurements (e.g., lighting conditions and/or noise levels) into a plurality of buckets and use a counter to keep track of a number of times any measurement from a certain bucket is observed. For a legitimate user, different lighting and/or noise measurements may be expected throughout some period of time (e.g., one or more hours during day time). Only one bucket being hit consistently may suggest a human farm or a bot being operated in a lab. FIG. 14 shows a plurality of illustrative anchor values and respective streams of digital interactions, in accordance with some embodiments. For instance, the anchor values may include one or more of the illustrative anchor values shown in FIG. 13 (e.g., device identifiers "Laptop," "Smartphone," "Tablet," etc.). Each anchor value may be associated with a stream of digital interactions. For instance, the device identifier "Laptop" may have an associated stream 1400, which may include the illustrative digital interactions 1300A and 1300C shown in FIG. 13, and the credit card number "AmEx" may have an associated stream 1405, which may include the illustrative digital interactions 1300A and 1300B shown in FIG. 13.

In some embodiments, each digital interaction in a stream may be associated with a sameness score, which may be assigned in any suitable manner. For instance, a sameness score may indicate a level of confidence that an entity engaging in the digital interaction is a same user as previously observed with the first-degree anchor value of the stream. As one example, a sameness score of 95 may be assigned to the digital interaction 1300A in the stream 1400, indicating a level of confidence that an entity engaging in the digital interaction 1300A is a same user as previously seen with the device identifier "Laptop." As another example, a sameness score of 98 may be assigned to the digital interaction 1300A in the stream 1405, indicating a level of confidence that an entity engaging in the digital interaction 1300A is a same user as previously seen with the credit card number "AmEx." Thus, the same digital interaction (e.g., 1300A) may be associated with different sameness scores in different streams.

In some embodiments, a security system may link two anchor values if there is a digital interaction that appears in streams of both anchor values, and is assigned a sufficiently high sameness score in each stream. For instance, with reference to the example shown in FIG. 14, the digital interaction 1300A appears in both of the streams 1400 and 1405, and is assigned a high sameness score in both streams (95 and 98, respectively). Accordingly, the security system may link the device identifier "Laptop" and the credit card number "AmEx." The security system may use any suitable threshold for determining whether sameness scores are sufficiently high to justify linking two anchor values. For instance, a sameness score threshold may be selected so as to achieve a desired level of specificity (i.e., true negative rate).

In some embodiments, multiple anchor values may be linked based on:
- the anchor values having been observed in a same digital interaction multiple times (e.g., at least three times);
- the anchor values having been observed together in multiple digital interactions (e.g., multiple purchases) over time (e.g., at least two weeks);
- lack of negative feedback;
- etc.

In some embodiments, anchor values may have different resolutions. As one example, a higher resolution device fingerprint may be generated based on multiple device characteristics (e.g., brand, model, operating system and version, etc.), so that the device fingerprint may change if any of the device characteristics changes (e.g., operating system being upgraded). On the other hand, a lower resolution device fingerprint may be generated based on a subset of the device characteristics (e.g., only brand, model, and operating system, without any version number for the operating system). A digital interaction may appear both in a stream associated with the higher resolution device fingerprint, and in a stream associated with the lower resolution device fingerprint. As another example, a digital interaction may appear both in a stream associated with a particular MAC address, and in a stream associated with a set of MAC addresses that have been linked (e.g., two mobile phones used by a same user).

It should be appreciated that, while a digital interaction may appear in multiple streams, measurements taken from such a digital interaction need not be duplicated. For instance, in some embodiments, each stream may store, for each digital interaction in the stream, a pointer to a location at which one or more measurements (e.g., raw and/or derived data) are stored, as opposed to the measurements themselves. In this manner, less storage may be used.

Figure 15:
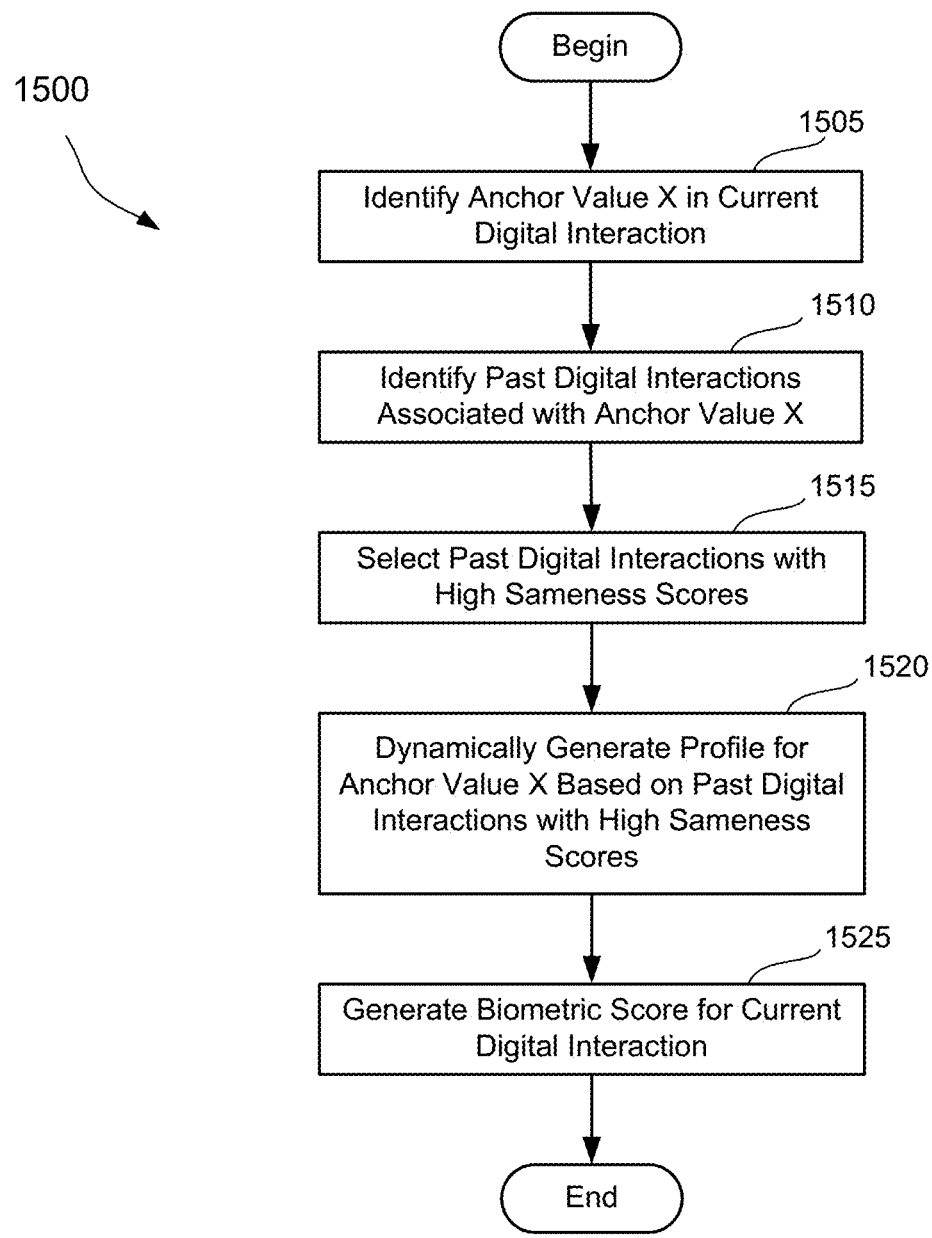
FIG. 15 shows an illustrative process 1500 that may be performed by a security system to generate a sameness score for a digital interaction with respect to an anchor value, in accordance with some embodiments.

FIG. 15 shows an illustrative process 1500 that may be performed by a security system to generate a biometric score for a digital interaction with respect to an anchor value, in accordance with some embodiments. For instance, the process 1500 may be used to generate a biometric score for the illustrative digital interaction 1300A with respect to the illustrative anchor value "Laptop," and the biometric score may be used to generate the sameness score of 95 in the example shown in FIG. 14. Likewise, the process 1500 may be used to generate a biometric score for the illustrative digital interaction 1300A with respect to the illustrative anchor value "AmEx," and the biometric score may be used to generate the sameness score of 98 in the example shown in FIG. 14.

At act 1505, the security system may identify an anchor value X from a current digital interaction. This may be done in any suitable manner, for example, as discussed in connection with act 505 of FIG. 5. The anchor value X may be of any suitable type, such as account identifier, email address, network address, device identifier, credit card number, etc. For instance, the anchor value X may be the illustrative device identifier "Laptop" shown in FIG. 14.

At act 1510, the security system may identify one or more past digital interactions associated with the anchor value X. In some embodiments, the security system may identify one or more past digital interactions from which the anchor value X was observed. For instance, in the example shown in FIG. 14, the illustrative digital interactions 1300A, 1300C, etc. may be associated with the device identifier "Laptop."

The inventors have recognized and appreciated that a user may behave differently on different web sites. Accordingly, in some embodiments, the security system may determine a web site on which the current digital interaction is taking place, and may consider only past digital interactions that took place via that web site and are associated with the anchor value X.

At act 1515, the security system may select, from those past digital interactions identified at act 1510, one or more past digital interactions for use in generating a profile for the anchor value X. In some embodiments, the security system may select one or more past digital interactions based on sameness scores assigned to the past digital interactions. For instance, in the example shown in FIG. 14, sameness scores of 95 and 65 are assigned to the illustrative digital interactions 1300A and 1300C, respectively, in the stream associated with the device identifier "Laptop."

The inventors have recognized and appreciated that it may be desirable to use only those past digital interactions with high sameness scores to generate a profile, so that anomalous measurements (e.g., taken from an imposter or an occasional legitimate user such as a family member) may not taint the profile. Accordingly, in some embodiments, the security system may select one or more past digital interactions having sameness scores above a certain sameness score threshold. Additionally, or alternatively, the security system may select a certain threshold number (e.g., 10) of past digital interactions with highest sameness scores. In this manner, a past digital interaction may be used to generate a profile for the anchor X only if there is a high level of confidence that an entity engaging in the past digital interaction was a same user as previously observed with the anchor value X.

The inventors have recognized and appreciated that a user's habits may change over time (e.g., the user getting used to a new keyboard or a new web site). Therefore, it may be beneficial to exclude digital interactions that are too old. On the other hand, digital interactions that are too recent may be less reliable (e.g., part of a new attack that has not be detected). Accordingly, in some embodiments, the security system may select one or more past digital interactions from a desirable window of time (e.g., older than three days and newer than four months).

It should be appreciated that aspects of the present disclosure are not limited to the use of any particular selection criterion or combination of selection criteria. For example, in some embodiments, the security system may select, from a pool of past digital interactions conducted during a desirable window of time (e.g., older than three days and newer than four months), a certain number (e.g., 10) of digital interactions having the highest sameness scores. Alternatively, or additionally, the security system may, from a pool of past digital interactions conducted during a desirable window of time (e.g., older than three days and newer than four months), a certain number (e.g., 10) of most recent digital interactions that exceed a certain sameness score threshold.

The inventors have further recognized and appreciated that sameness matching may be more reliable when more historical data is available. Accordingly, in some embodiments, the security system may determine whether at least a threshold number (e.g., 10) of past digital interactions are selected in act 1515. The threshold number may be chosen in any suitable manner, for example, by testing various candidate threshold numbers using historical data and selecting a threshold number that provides a desired level of reliability.

If at act 1515 fewer than the threshold number of past digital interactions have been identified, the security system may end the process 1500. Otherwise, the security system may proceed to use the past digital interactions selected at act 1515 to generate a profile for the anchor value X. For instance, the security system may retrieve measurements taken from the past digital interactions selected at act 1515 and analyze the measurements to detect one or more patterns.

At act 1525, the security system may compare measurements taken from the current digital interaction against the one or more patterns detected at act 1515 to generate a biometric score. The biometric score may indicate an extent to which measurements taken from the current digital interaction match the one or more patterns detected at act 1515.

It should be appreciated that details of implementation are shown in FIG. 15 and described above solely for purposes of illustration. Aspects of the present disclosure are not limited to any particular manner of implementation. For instance, in some embodiments, sameness scores used at act 1515 to select past digital interactions may be biometric scores for the past digital interactions and may be generated using processes similar to the process 1500. However, that is not required, as in some embodiments, sameness scores for past digital interactions may be generated based on one or more other types of scores (e.g., device scores, location scores, behavior scores, etc.) in addition to, or instead of, biometric scores.

In some embodiments, a combination of anchor values (e.g., a certain account identifier and a certain device identifier) may be identified at act 1505, instead of a single anchor value. Each past digital interaction identified at act 1510 may be associated with the combination of anchor values (e.g., both the account identifier and the device identifier). In this manner, measurements may be segmented based on a combination of anchor values, rather than an individual anchor value, as discussed in connection with the example shown in FIG. 12.

In some embodiments, the process 1500 may be repeated to generate biometric scores for different anchor values observed from the current digital interaction. These biometric scores may be combined in any suitable manner. As one example, the biometric scores may be combined using a weighted sum or weighted max, where a certain weight may be assigned to each anchor value. The weights may be chosen in any suitable manner, for example, via a statistical training process that tests different combinations of weights on training data and adjusts the weights to improve reliability of the sameness matching process. As another example, the biometric scores may be blended. For instance, a combined score may be calculated as a weighted sum of two highest biometric scores, where the highest score may receive a higher weight (e.g., 60%) and the second highest score may receive a lower weight (e.g., 40%). However, it should be appreciated that aspects of the present disclosure are not limited to the use of two highest scores for blending, or to any particular combination of weights. Any suitable number of highest scores may be blended using any suitable combination of weights.

In some embodiments, one or more commonly used profiles may be generated ahead of time and updated continually. In this manner, the security system may, at act 1520, first check whether a profile has been generated for the anchor value X recently, and may generate a new profile for the anchor value X only if there is no cached profile or a cached profile is stale.

Figure 16:
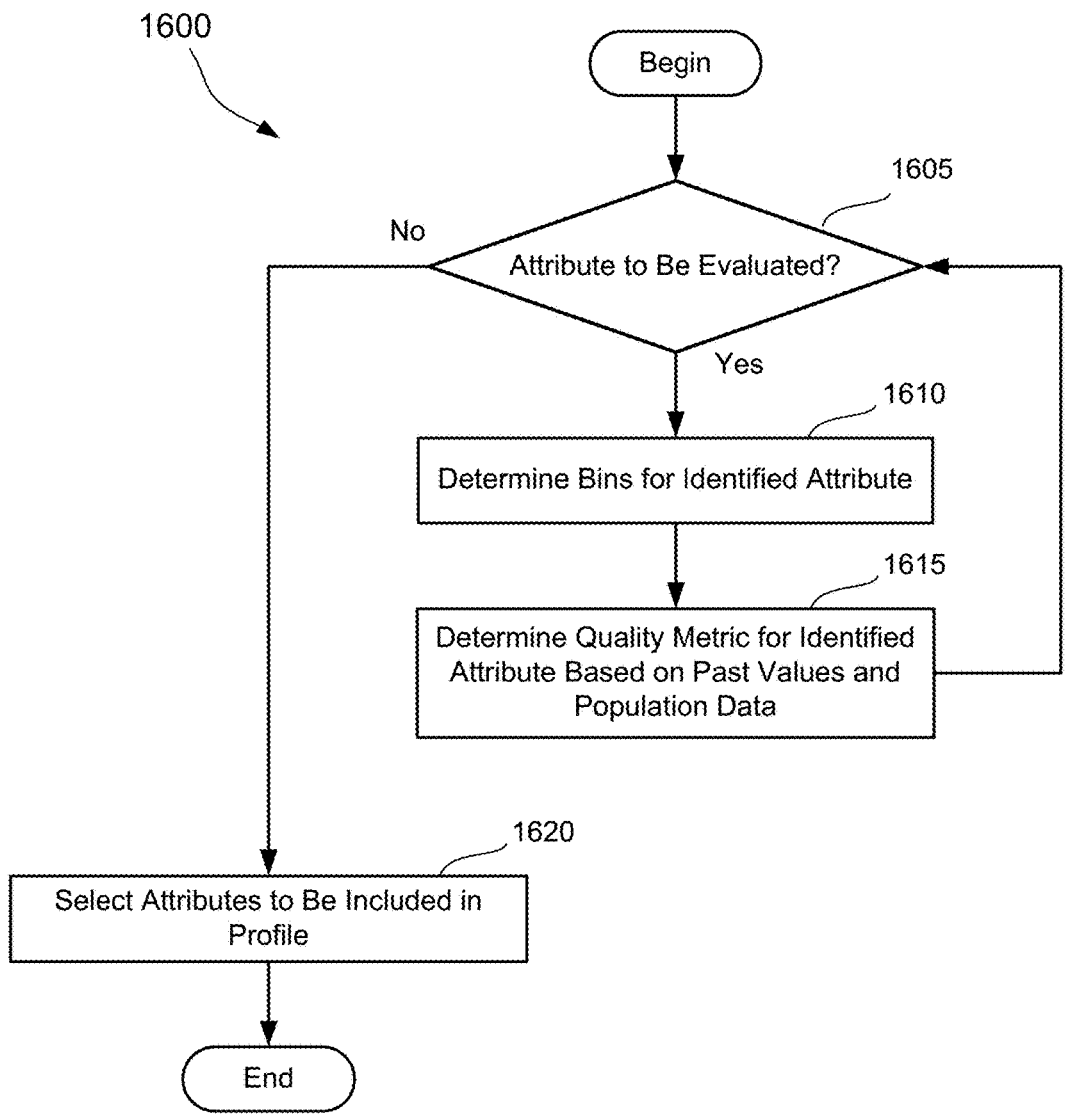
FIG. 16 shows an illustrative process 1600 that may be performed by a security system to generate a profile, in accordance with some embodiments.

FIG. 16 shows an illustrative process 1600 that may be performed by a security system to generate a profile, in accordance with some embodiments. For instance, the process 1600 may be performed by the security system at act 1520 of the illustrative process 1500 shown in FIG. 15 to generate a profile for the anchor value X (or a combination of anchor values such as a certain account identifier and a certain device identifier) using measurements taken from N past digital interactions with high sameness scores.

At act 1605, the security system may determine whether there is an attribute to be evaluated. In some embodiments, an attribute may be a question that may be asked about a digital interaction, and a value for that attribute may be an answer to the question. As one example, a question may be, "how much time elapsed between a user name field being clicked and a first keystroke being recorded in the user name field?" An answer may be a value (e.g., in seconds or milliseconds) calculated based on a timestamp for a click in the user name field and a timestamp for the first keystroke in the user name field following the click. As another example, a question may be, "what was the duration of a fifth keystroke?" An answer may be a value (e.g., in seconds or milliseconds) calculated based on a timestamp for the fifth key being depressed and a timestamp for the subsequent release of the key.

The inventors have recognized and appreciated that answers to such questions may become highly consistent as a user logs into a certain web site and types in a same password repeatedly over time. Answers to such questions may also be sufficiently consistent for similar input fields. For example, a user may type in his name in a similar way even when he is visiting different web sites, and likewise for anything else that the user may type in regularly, such as email address, phone number, home address, social security number, etc.

In some embodiments, the security system may identify an attribute to be evaluated based on a current digital interaction being analyzed. For instance, with reference to the example shown in FIG. 15, the security system may determine a type of the current digital interaction for which a biometric score is being calculated. As one example, if the current digital interaction includes a login attempt, attributes relating to how a user types a password may be evaluated. As another example, if the current digital interaction is conducted via a mobile device, attributes relating to device angle, device movement, etc. may be evaluated.

In some embodiments, the security system may process raw data received from a user device to derive attribute values. For instance, the security system may receive keystroke recordings and answer questions of interest based on keystrokes and corresponding timestamps. Additionally, or alternatively, some computation may be performed by the user device (e.g., by an operating system, an application, and/or a web browser running on the user device). For instance, the user device may discretize an analog output of a sensor (e.g., an accelerometer) by sampling the analog output at a desired rate. Additionally, or alternatively, the user device may convert a first digital output with a first sample rate to a second digital output with a second sample rate. In some embodiments, the second sample rate may be lower than the first sample rate, so that less data is transmitted from the user device to the security system.

Referring again to the example shown in FIG. 16, if at act 1605 the security system identifies an attribute to be evaluated, the security system may proceed to act 1610 to determine a plurality of bins for the attribute identified at act 1605, where each bin may correspond to a set of possible values for the attribute. As one example, if the attribute has numeric values (e.g., accelerometer readings), a bin may correspond to a range of values. As another example, if the attribute has enumerated values (e.g., product SKUs), a bin may correspond to a group of related values (e.g., a product category).

The inventors have recognized and appreciated that bins may be determined to achieve a desired balance between accuracy and efficiency. For instance, a larger number of bins may provide a higher resolution, but more calculations may be performed to generate a biometric score for the current digital interaction, which may lead to longer response time. By contrast, a smaller number of bins may improve response time, but finer distinctions may be lost. For instance, if a duration of a keystroke is usually in the 200-400 msec range, then bins of 100 msec each may be too coarse and may result in attribute values concentrating in a small number of bins (e.g., 200-300 msec and 300-400 msec). An imposter who is typically in the 200-230 msec range may be indistinguishable from a user who is typically in the 260-290 msec range, because both may fall within a same 100 msec bin (e.g., 200-300 msec). By using smaller bins (e.g., 10 msec, 20 msec, or 50 msec each), the imposter may become distinguishable from the user.

The inventors have recognized and appreciated that an attribute with respect to which consistent measurements are taken over time from an anchor value (or a combination of anchor values) may be useful in matching sameness. For instance, if a user almost always holds his device at a certain angle, then device angle may be included as a behavior attribute in a profile (e.g., a profile for an identifier of the user's account, or for the account identifier and an identifier of the user's device, as a combination). By contrast, if no particular pattern is discernable from device angle measurements (e.g., the user holds his device at different angles at different times in an apparently random fashion), then device angle may not be included as a behavior attribute in the profile.

The inventors have further recognized and appreciated that an attribute may be useful in matching sameness if consistent measurements are taken over time with respect to that attribute and such measurements are sufficiently different from typical measurements taken from a population. For instance, if a certain device angle is consistently observed from digital interactions associated with a certain anchor value (e.g., a certain device identifier), and that angle is different from angles commonly observed from digital interactions associated with other anchor values of a same type (e.g., other device identifiers for a same type of mobile device), then observing that peculiar angle in a digital interaction may give a security system confidence that an entity engaging in the digital interaction is indeed a same user as previously encountered. Therefore, the security system may include device angle in a profile generated for that anchor value.

Accordingly, the security system may, at act 1615 in the example shown in FIG. 16, determine a quality metric for the attribute identified at act 1605. The quality metric may indicate how useful the attribute may be for matching sameness. For instance, the quality metric may indicate whether the measurements taken from the N past digital interactions with high sameness scores for the anchor value X are consistent, and/or whether those measurements are sufficiently different from typical measurements taken from a population.

A quality metric may be determined in any suitable manner. Let A denote the attribute identified at act 1605, and let $V_1, \ldots, V_N$ denote values of the attribute A from the N past digital interactions with high sameness scores for the anchor value X (or the combination of anchor values). In some embodiments, the security system may use the bins determined at act 1610 to compute a histogram from the attribute values $V_1, \ldots, V_N$. Additionally, or alternatively, the security system may generate a distribution curve. For instance, the bins may be along the x-direction, and the number of values falling into each bin may be plotted along the y-direction.

In some embodiments, the bins may be adjusted to produce a more smooth curve. For instance, if there is a large jump from a first bin to an adjacent second bin, a larger number of bins may be used, where each bin may become smaller. This may re-distribute the attribute values and produce a more smooth curve. However, it should be appreciated that aspects of the present disclosure are not limited to dynamic adjustment of bins.

In some embodiments, a Gaussian distribution may be used to approximate the distribution of the attribute values $V_1, \ldots, V_N$. For instance, each bin may represent a possible outcome, and a percentage of attribute values falling into that bin may be used as a probability for that possible outcome. A sample mean $\mu$ and a sample standard deviation $\sigma$ may be computed accordingly, and a Gaussian distribution with mean $\mu$ and standard deviation $\sigma$ may be used as an approximation. However, it should be appreciated that aspects of the present disclosure are not limited to the use of a Gaussian distribution to approximate the distribution of the attribute values $V_1, \ldots, V_N$, or any approximation at all. In some embodiments, a multimodal distribution (e.g., a weighted sum of multiple Gaussian distributions) may be used to more accurately approximate the distribution of the attribute values $V_1, \ldots, V_N$.

In some embodiments, the security system may compute a histogram, and/or an approximation for the histogram, for a population using one or more of the above-described techniques. Instead of the attribute values $V_1, \ldots, V_N$, the security system may use values of the attribute A from past digital interactions associated with a suitable population. For instance, if a profile is being developed for a certain device identifier, population data may include values of the attribute A from past digital interactions associated with other device identifiers for a same type of mobile device. Thus, the population data may include a multiset union of a collection of multisets of attribute values, where each multiset corresponds to a respective device identifier. The security system may use the population data to compute a histogram using the same bins as for the attribute values $V_1, \ldots, V_N$ (e.g., including any adjustment made to the bins to obtain a more smooth curve). Additionally, or alternatively, the security system may use the population data to compute a sample mean M and a sample standard deviation $\Sigma$ for a Gaussian distribution as an approximation of the population data.

In some embodiments, a quality metric for the attribute A may be determined based on distribution curves generated from the histogram for the attribute values $V_1, \ldots, V_N$ and the histogram for the population data, respectively. For instance, the distribution curves may be normalized, so that a total area under each curve is 1. A quality metric may then be computed as a sum of a first area and a second area, where the first area is under a first distribution curve (e.g., generated from the histogram for the population data) but not under a second distribution curve (e.g., generated from the histogram for the attribute values $V_1, \ldots, V_N$). The inventors have recognized and appreciated that these two areas diminish as the two distribution curves become more similar to each other. Therefore, the sum of these two areas may be suitable as a quality metric.

Figure 17A:
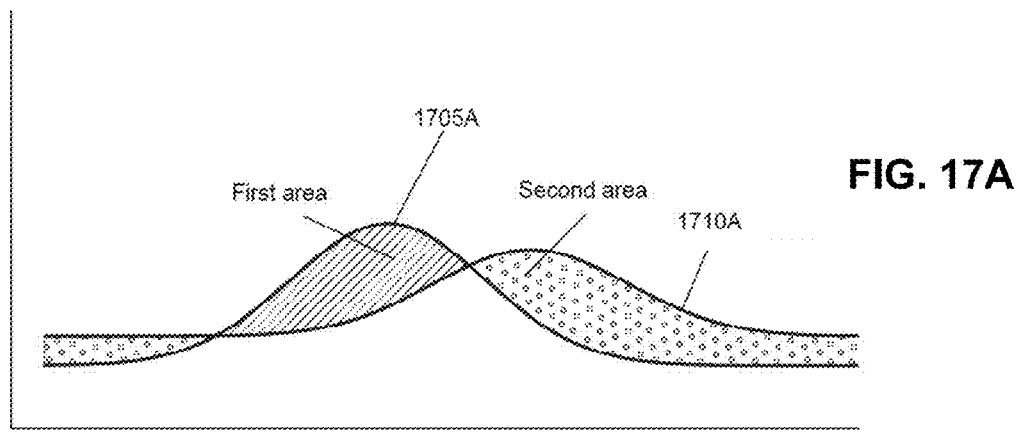
FIG. 17A shows illustrative distribution curves 1705A and 1710A, in accordance with some embodiments.

FIG. 17A shows illustrative distribution curves 1705A and 1710A, in accordance with some embodiments. For instance, the curve 1705A may be generated from the histogram for the population data, whereas the curve 1710A may be generated from the histogram for the attribute values $V_1, \ldots, V_N$. In this example, the curve 1710A may be relatively flat (e.g., large standard deviation $\sigma$), indicating that the attribute values $V_1, \ldots, V_N$ do not exhibit a high level of consistency (e.g., a user holding his device at different angles at different times in an apparently random fashion). Likewise, the curve 1705A may also be relatively flat (e.g., large standard deviation $\Sigma$), indicating that the population data also do not exhibit a high level of consistency (e.g., users of this type of device holding their devices at different angles). As a result, a first area under the curve 1705A but not under the curve 1710A and a second area under the curve 1710A but not under the curve 1705A may be small, resulting in a low quality metric for the attribute A.

Figure 17B:
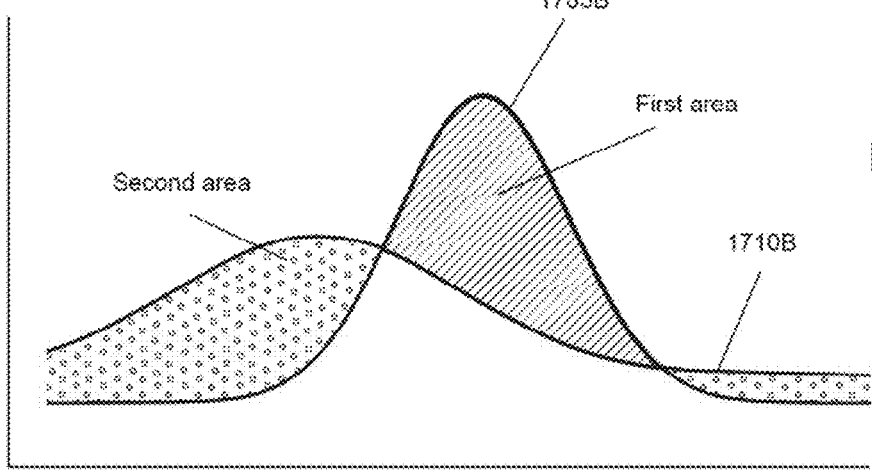
FIG. 17B shows illustrative distribution curves 1705B and 1710B, in accordance with some embodiments.

FIG. 17B shows illustrative distribution curves 1705B and 1710B, in accordance with some embodiments. For instance, the curve 1705B may be generated from the histogram for the population data, whereas the curve 1710B may be generated from the histogram for the attribute values $V_1, \ldots, V_N$. In this example, the curve 1710B may be relatively flat (e.g., large standard deviation $\sigma$), indicating that the attribute values $V_1, \ldots, V_N$ do not exhibit a high level of consistency (e.g., a user holding his device at different angles at different times in an apparently random fashion). However, the curve 1705B may have a pronounced peak (e.g., small standard deviation $\Sigma$), indicating that the population data exhibits a high level of consistency (e.g., users of this type of device holding their devices at roughly a same angle). As a result, a first area under the curve 1705B but not under the curve 1710B may be large, while a second area under the curve 1710B but not under the curve 1705B may be small, resulting in a medium quality metric for the attribute A.

Similarly, if the curve 1710B has a pronounced peak but the curve 1705B is relatively flat, a medium quality metric may also be obtained.

Figure 17C:
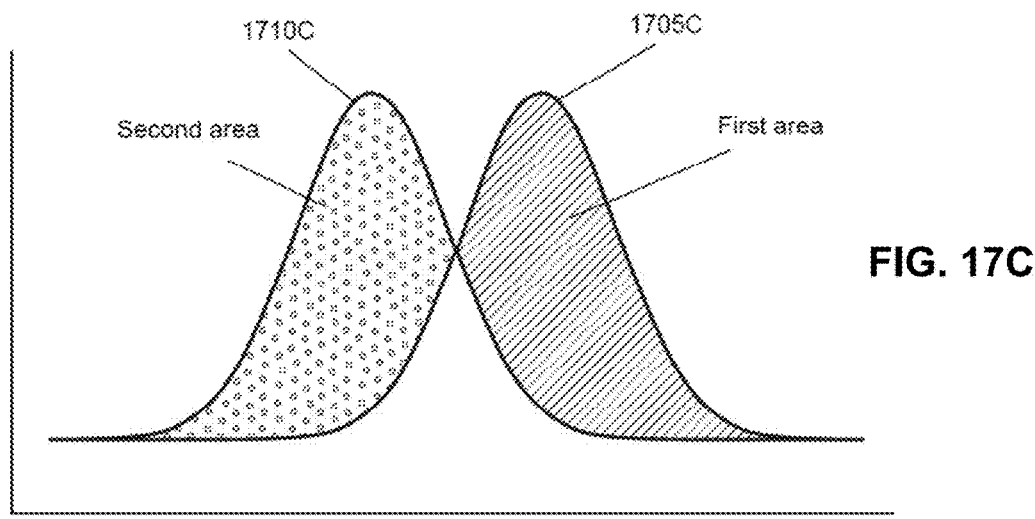
FIG. 17C shows illustrative distribution curves 1705C and 1710C, in accordance with some embodiments.

FIG. 17C shows illustrative distribution curves 1705C and 1710C, in accordance with some embodiments. For instance, the curve 1705C may be generated from the histogram for the population data, whereas the curve 1710C may be generated from the histogram for the attribute values $V_1, \ldots, V_N$. In this example, the curve 1710C may be have a pronounced peak (e.g., small standard deviation $\sigma$), indicating that the attribute values $V_1, \ldots, V_N$ exhibit a high level of consistency (e.g., a user holding his device at roughly a same angle at different times). Likewise, the curve 1705C may also have a pronounced peak (e.g., small standard deviation $\Sigma$), indicating that the population data exhibits a high level of consistency (e.g., users of this type of device holding their devices at roughly a same angle). Furthermore, the peak of the curve 1705C and the peak of the curve 1710C may be offset from each other (e.g., the user holding his device at a different angle compared to the other users). As a result, a first area under the curve 1705B but not under the curve 1710B and a second area under the curve 1710B but not under the curve 1705B may both be large, resulting in a high quality metric for the attribute A.

Additionally, or alternatively, a quality metric for the attribute A may be determined based on a normalized standard deviation for the attribute values $V_1, \ldots, V_N$. For instance, a normalized standard deviation may be computed by dividing the sample standard deviation $\sigma$ by the sample mean $\mu$. If the normalized standard deviation is below a selected threshold, then the security system may determine that the attribute values $V_1, \ldots, V_N$ are sufficiently consistent.

Additionally, or alternatively, a quality metric for the attribute A may be determined based on a difference between the sample mean $\mu$ (for the attribute values $V_1, \ldots, V_N$) and the sample mean M (for the population data). A greater difference may lead to a higher quality metric. Additionally, or alternatively, a smaller sample standard deviation $\sigma$ for the attribute values $V_1, \ldots, V_N$, and/or a smaller sample standard deviation $\Sigma$ for the population data, may lead to a higher quality factor.

The inventors have recognized and appreciated that, in some instances, sample mean and sample standard deviation may not be available (e.g., where an attribute is an ordinal or categorical variable). Accordingly, in some embodiments, a frequency procedure may be used to produce one-way to n-way frequency and cross tabulation tables to compare the attribute values $V_1, \ldots, V_N$ against the population data. For example, a two-way frequency cross-tabulation of ordinal attribute values of mouse speed (e.g., slow, average, fast, very fast, etc.) and typing speed (slow, average, fast, very fast, etc.) may be created to see how many observations fall in each section (e.g., fast mouse speed, but average typing speed). The inventors have recognized and appreciated that a cross-tabulation may reveal interesting correlations between two attributes. Such correlations may be observed for a certain anchor value, a certain combination of anchor values, and/or a population (e.g., all digital interactions on a certain web site via a certain type of device). In this manner, a security system may be able to determine whether any pattern emerge for a certain anchor value or a certain combination of anchor values, and/or whether such pattern is an outlier compared to population data.

Additionally, or alternatively, for n-way tables with n>2, stratified analyses may be performed. As one example, a web server may receive login requests from all over the globe. Unless such requests are stratified by location (e.g., time zone), there may be no apparent relationship between time of day and number of logins. As another example, login requests for a certain account may come from an Internet Explorer browser more often than from a Chrome browser. However, if such login requests are stratified by time of day, it may be seen that login requests during daytime tend to come from an Internet Explorer browser (e.g., work computer), whereas login requests during nighttime tend to come from a Chrome browser (e.g., home computer).

Accordingly, in some embodiments, observations may be divided into different strata. Statistics within in a stratum and/or across strata may be computed to detect correlations among attributes. For instance, in some embodiments, potential effects of one or more background variables (e.g., time of day, device identifier, etc.) may be controlled by stratifying based on the one or more background variables.

Having determined a quality metric for the attribute A at act 1615 in the example shown in FIG. 16, the security system may return to act 1605 to determine whether there is another attribute to be evaluated. If it is determined that no more attribute is to be evaluated, the security system may proceed to act 1620 to select one or more attributes to be included in a profile for the anchor value X (or the combination of anchor values).

In some embodiments, the security system may select one or more attributes having quality metric values above a selected threshold. Additionally, or alternatively, the security system may select a certain threshold number (e.g., 10) of attributes with highest quality metric values. In this manner, the profile for the anchor value X (or the combination of anchor values) may include only attributes for which consistent measurements are taken over time from digital interactions associated with the anchor value X (or the combination of anchor values), and such measurements are sufficiently different from typical measurements taken from a population.

In some embodiments, the security system may store in the profile for the anchor value X (or the combination of anchor values) information regarding one or more attributes selected at act 1620. Any suitable information may be stored, including, but not limited to, quality metric, attribute values, histogram, sample mean, sample standard deviation, etc.

Figure 18:
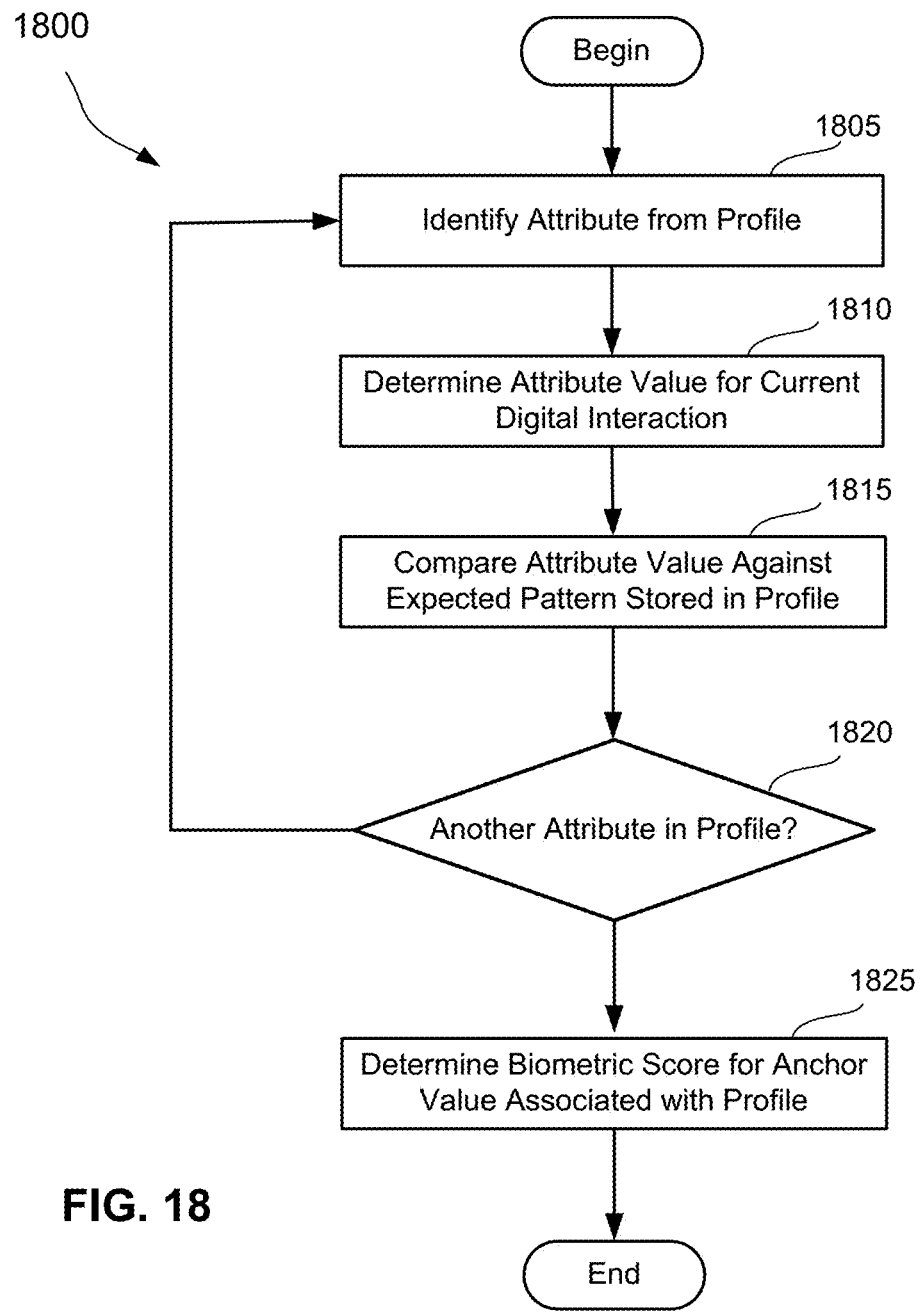
FIG. 18 shows an illustrative process 1800 that may be performed by a security system to determine a biometric score, in accordance with some embodiments.

FIG. 18 shows an illustrative process 1800 that may be performed by a security system to determine a biometric score for a digital interaction, in accordance with some embodiments. For instance, the process 1800 may be performed by the security system at act 1525 of the illustrative process 1500 shown in FIG. 15 to compare one or more measurements taken from a current digital interaction against a profile for an anchor value X (or a combination of anchor values such as a certain account identifier and a certain device identifier). The biometric score may indicate an extent to which the one or more measurements taken from the current digital interaction match one or more patterns from the profile.

In some embodiments, the profile for the anchor value X (or the combination of anchor values) may include information regarding one or more attributes (e.g., as selected using the illustrative process 1600 shown in FIG. 16). At act 1805 of the illustrative process 1800 shown in FIG. 18, the security system may identify, from the profile, an attribute to be evaluated. At act 1810, the security system may determine a value of the attribute identified at act 1805 for the current digital interaction. For instance, in some embodiments, the security system may use one or more measurements taken from the current digital interaction (e.g., a sequence of recorded keystrokes with respective timestamps) to answer a question associated with the attribute identified at act 1805 (e.g., "what was the duration of a fifth keystroke?").

At act 1815, the security system may compare the attribute value determined at act 1810 against one or more patterns stored in the profile. For instance, in some embodiments, the security system may compare the attribute value against a mean and a standard deviation stored the profile. If the attribute value deviates from the mean by at most some selected multiple of the standard deviation (e.g., 1.96 standard deviations), the attribute value may be treated as being within an expected pattern. The standard deviation threshold may be chosen in any suitable manner, for example, by constructing a confidence interval for a desired percentage (e.g., 95%).

Additionally, or alternatively, a confidence level may be assigned to the attribute value. For instance, a higher level of confidence may be assigned if the attribute value is close to the mean, while a lower level of confidence may be assigned if the attribute value is far away from the mean. In this manner, if the attribute value is close to the standard deviation threshold (e.g., 1.96 standard deviations from the mean) without going beyond the threshold, the attribute value may be treated as being within an expected pattern, but a low confidence level may be assigned.

In some embodiments, no mean or standard deviation may be available from the profile. For instance, the attribute may be an ordinal or categorical variable, and the security system may retrieve a histogram from the profile. The histogram may have been generated based on values of the attribute observed from past digital interactions associated with the anchor value X (or the combination of anchor values), for example, as discussed above in connection with FIG. 16. The security system may determine a bin into which the attribute value falls, and may assign a level of confidence to the attribute value based on a frequency of the bin in the histogram. In some embodiments, such a histogram-based approach may be used in addition to, or instead of, an approach based on mean and standard deviation.

At act 1820, the security system may determine whether there is another attribute to be evaluated. If it is determined that there is another attribute to be evaluated, the security system may return to act 1805 to identify an attribute from the profile. If it is determined that all attributes from the profile have been evaluated, the security system may proceed to act 1825 to determine a biometric score for the anchor value X (or the combination of anchor values).

In some embodiments, a biometric score may be determined based on confidence levels determined at act 1815 for one or more attributes in the profile for the anchor value X (or the combination of anchor values). As one example, the confidence levels may be combined using a weighted sum or weighted max, where a certain weight may be assigned to each attribute. The weights may be chosen in any suitable manner, for example, via a statistical training process that tests different combinations of weights on training data and adjusts the weights to improve reliability of the sameness matching process. As another example, the confidence levels may be blended. For instance, the biometric score may be calculated as a weighted sum of two highest confidence levels, where the highest confidence level may receive a higher weight (e.g., 60%) and the second highest confidence level may receive a lower weight (e.g., 40%). However, it should be appreciated that aspects of the present disclosure are not limited to the use of two highest confidence levels for blending, or to any particular combination of weights. Any suitable number of highest confidence levels may be blended using any suitable combination of weights.

Figure 19:
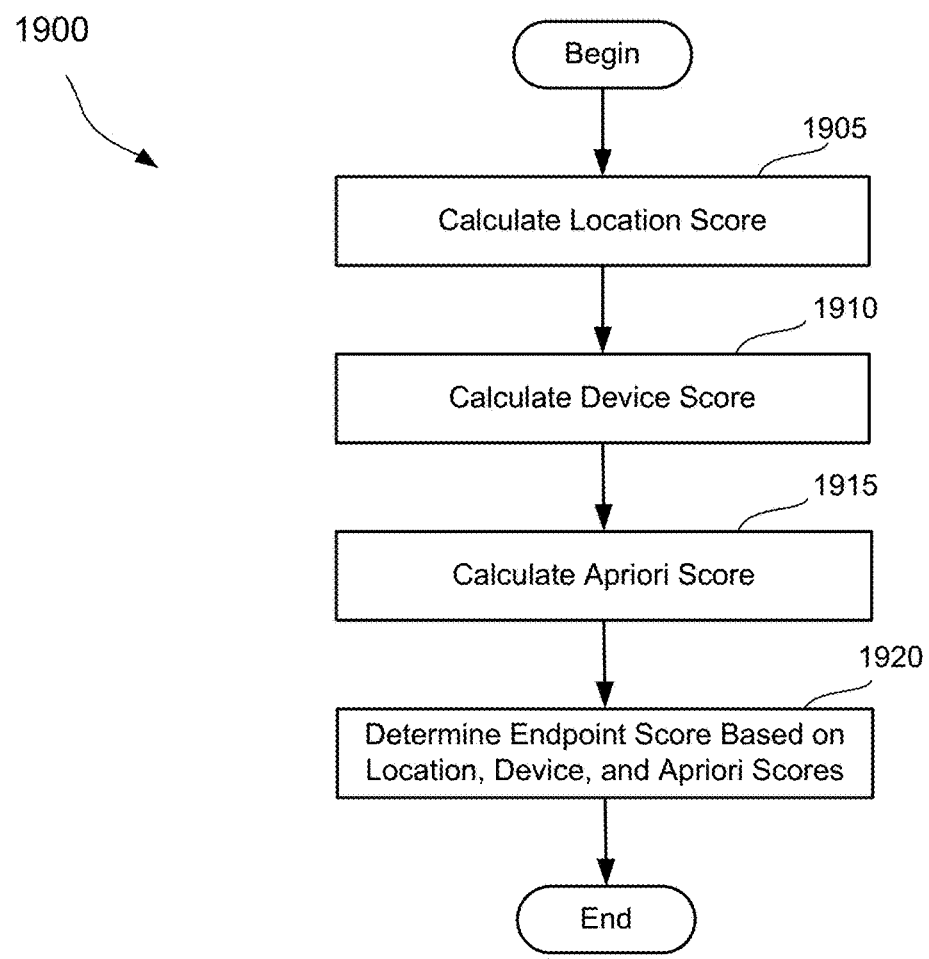
FIG. 19 shows an illustrative process 1900 that may be used by a security system to determine an endpoint score, in accordance with some embodiments.

FIG. 19 shows an illustrative process 1900 that may be used by a security system to calculate an endpoint score for a digital interaction, in accordance with some embodiments. Such an endpoint score may be used in any suitable manner. For instance, an endpoint score may be combined with a biometric score (e.g., as determined using the illustrative process 1800 shown in FIG. 18) to obtain an overall sameness score. The scores may be combined in any suitable way. For example, a mixing algorithm may be used, such as the following.

Overall sameness score=min(1, (sqrt(bio)*0.55+sqrt(endpoint)*0.45))

At act 1905, the security system may calculate a location score for the digital interaction. In some embodiments, the location score may be indicative of an extent of association between a location and an account via which the digital interaction is conducted. A location may be represented in any suitable manner, for example, using a network address, a postal address (e.g., house number, street, city, state, and/or country), GPS coordinates, etc.

In some embodiments, different aspects of a location may be considered. For example, a network address may include the following aspects:

IP address (a.b.c.d)
IP subnet (a.b.c)
Internet Service Provider (ISP)

The security system may assign a score to each aspect, for example, based on how frequently the anchor value for that aspect is associated with the particular account via which the digital interaction is conducted. In some embodiments, the security system may count the number of times the anchor value is associated with the particular account over some period of time (e.g., last week, month, three months, etc.), and may multiply that number by 10%, capping the result at 100%. Thus, if the IP address a.b.c.d have been seen with the account five times over the past month, the IP address may receive a score of 50%.

Additionally, or alternatively, the security system may take into account a length and/or nature of a history of the anchor value. For instance, a higher score may be assigned to the anchor value if the anchor value has a longer history with the particular account (e.g., seen together five times over the past five months, vs. five times over the past five days). Additionally, or alternatively, a higher score may be assigned to the anchor value if the anchor value has a history of one or more types of transactions indicative of trustworthiness (e.g., each of five digital interactions including a confirmed financial transaction, vs. no value attached to any digital interaction).

In some embodiments, the security system may scale the scores obtained for the different aspects. Any suitable combination of scaling factors may be used, such as 100% for IP address, 35% for IP subnet, 40% for ISP, etc. A location score may then be obtained as a max or blend of these scores.

At act 1910, the security system may use any one or more of the techniques described in connection with act 1905 to calculate a device score for the digital interaction. In some embodiments, the device score may be indicative of an extent of association between a device and an account via which the digital interaction is conducted. A device may be represented in any suitable manner, for example, using a device identifier (e.g., a MAC address), a device fingerprint, one or more device characteristics (e.g., operating system, browser, etc.), etc. Any suitable combination of scaling factors may be used, such as 100% for device identifier, 80% for device fingerprint, 35% for device characteristics, etc.

At act 1915, the security system may calculate an association score for one or more anchor values observed from the digital interaction, for example, using one of more of the illustrative techniques described above in connection with FIG. 4.

In some embodiments, an endpoint score may be determined based on the location, device, and association scores calculated at acts 1905, 1910, and 1915, respectively. As one example, the location, device, and association scores may be combined using a weighted sum or weighted max, where a certain weight may be assigned to each score. The weights may be chosen in any suitable manner, for example, via a statistical training process that tests different combinations of weights on training data and adjusts the weights to improve reliability of the sameness matching process. As another example, the location, device, and association 20 scores may be blended. For instance, the endpoint score may be calculated as a weighted sum of two highest scores, where the highest score may receive a higher weight (e.g., 60%) and the second highest score may receive a lower weight (e.g., 40%). However, it should be appreciated that aspects of the present disclosure are not limited to the use of two highest scores for blending, or to any particular combination of weights. Any suitable number of highest scores may be blended using any suitable combination of weights.

The inventors have recognized and appreciated that some behavior analysis systems focus on identifying and deactivating compromised accounts. In some embodiments, one or more of the techniques provided herein may be used to identify trusted users, in addition to, or instead of, merely identifying compromised accounts. For example, one or more of the techniques provided herein may be used to determine whether a certain observation increases or decreases a level of confidence that a user is trusted. In some embodiments, a behavior pattern of a user may be measured, and an alert may be raised when that behavior pattern falls outside of some expected norm (e.g., some expected set of behavior patterns as constructed from behavior profiles of trusted users).

In accordance with some embodiments, a system is provided that monitors and records one or more behaviors when an entity interacts with a web site or application. Whether the entity is a human user or a bot may be unknown to the system, and the system may simply associate the observed behaviors with an anchor value. The anchor value may include any suitable combination of one or more pieces of information, including, but not limited to, IP address, name, account ID, email address, device ID, device fingerprint, user ID, and/or hashed credit card number.

In some embodiments, a behavior profile may be generated and associated with an anchor value. The behavior profile may include any suitable information relating to one or more aspects of a user's interaction with a web site or application. Examples of interactions include, but are not limited to, opening an account, checking email, making a purchase, etc. For instance, the behavior profile may include attribute information indicative of one or more habits of the user. Examples of such attribute information include, but are not limited to, typing speed, navigation pattern, mouse tracking, gesture tracking, device preference, device angle, and/or device motion.

In some embodiments, one or more behaviors may be captured every time a user interacts with a certain web site or application, and one or more pieces of attribute information in the user's behavior profile may be updated accordingly. For example, in addition to, or instead of, recording a most recent value for an attribute, a moving average may be computed and recorded. In this manner, historical patterns may be observed in addition to behaviors associated with a current interaction. For example, one or more observed behaviors may be compiled into a virtual fingerprint associated with an anchor value.

In some embodiments, user verification and user identification may be carried out as separate processes. For instance, a user identification process may be performed to answer the question, "Who is this user?" By contrast, a user verification process may be performed to answer the question, "Is this user who he says he is?"

The inventors have recognized and appreciated that some existing user-based security systems rely on password verification to positively identify a user. For example, a system may prompt a user to enter a user name and password, and may grant access to a web site or application only if the user name and password combination match a previously-established set of credentials. The inventors have recognized and appreciated that such a mechanism may not be effective in a situation in which a malicious user somehow obtains the user name and password for a legitimate user and attempts to log in using the stolen credentials. Therefore, a user name and password combination alone may not provide reliable identification.

Some security systems provide a layer of user verification in addition to, or instead of, verifying a user name and password combination. Non-limiting examples of user verification techniques include:

CAPTCHA challenges (e.g., scrambled and/or distorted text that is difficult for a computer to recognize, but relatively easy for a human to read) to verify that an entity is a human and not a computer program designed to simulate a human.

Knowledge-based authentication (KBA) questions with answers known to a user (e.g., "What is your mother's maiden name?" or "What was your third grade teacher's name?")

IP Geolocation checks to identify a country or region from which an entity is connecting.

Multifactor Authentication (MFA) tokens (e.g., unique strings of text) generated only for a particular user, for example, through a peripheral device like a keychain fob or an independent application.

Although the techniques listed above may be effective in some circumstances, the inventors have recognized and appreciated some disadvantages of such techniques. For example, the above techniques may require a user to participate actively (e.g., by providing a piece of information), and the user may therefore be aware that he is being challenged. Furthermore, in some instances, a legitimate user may be unable to complete a challenge successfully. For example, a user may be unable to read a CAPTCHA challenge, forget a knowledge-based authentication answer, travel outside a typical country or region, or lose access to a multifactor authentication token.

Accordingly, in some embodiments, user verification techniques are provided that do not require a user to actively perform a verification task. For example, one or more attributes of the user may be measured and analyzed, without the user becoming aware that his identity is being verified. Such a verification may be less burdensome for the user, as the user may not be required to remember or possess a particular piece of information (e.g., a knowledge-based authentication answer or a multifactor authentication token), or to perform a challenging task (e.g., reading a CAPTCHA or typing in a randomly generated text string). Such a verification may also be more secure, as it may be more difficult for an attacker to forge attribute values, than to steal and forward a piece of information such as a knowledge-based authentication answer or a multifactor authentication token.

In some embodiments, a security system may perform passive user verification by measuring and analyzing behavioral attributes, including, but not limited to, typing rhythm, mouse rhythm, and/or behavioral "tics."

In some embodiments, a security system may analyze a user's typing rhythm by measuring delays between key presses. For instance, the inventors have recognized and appreciated that when typing something familiar, like a user name or password, a user may tend to use the same rhythm or pattern. As an example, for the username "soccerfan86," a user may have a characteristic delay between "soccer" and "fan," or there may be a pause as the user moves his fingers away from home-row typing positions (e.g., "JKL;" for the right hand on a QWERTY keyboard) to type "86."

The inventors have recognized and appreciated that the way a user moves his mouse may also be used as a behavior attribute. In some embodiments, a security system may analyze a user's mouse rhythm by measuring mouse acceleration and/or velocity. Similar measurements may be taken for touch events (e.g., on devices with touchscreens). Additionally, or alternatively, accelerometer data and/or pointer location may be used.

The inventors have further recognized and appreciated that a user may consistently engage in some measurable behavior (consciously or subconsciously), so that the behavior may be used to identify the user. For example:

Some users double click on links or buttons that only require a single-click.
  Some users absentmindedly move the cursor in particular patterns while waiting for page loads.
  Some users move between text fields with the tab key while others may use mouse clicks.
  Some users may favor particular special characters in their passwords (e.g., "%" or "&" or "#") and therefore may be faster at typing these characters due to familiarity with the key combinations.
  Some users may type quickly with high accuracy and therefore do not utilize the backspace key very often.

In some embodiments, a security system may run a piece of software on a particular webpage (e.g., a login page), or a screen of a mobile device app (e.g., a login screen), to collect any one or more of the data points described above. This may be done with or without alerting the user. The software may be written in any suitable language, including, but not limited to, JavaScript.

In some embodiments, data points such as those discussed above may be collected for a user across multiple logins at a same web site or application, and/or across multiple web sites and/or applications. The collected data points may be used to generate a behavior profile that is indicative of one or more expected behaviors for that user. The behavior profile may be established for an anchor value (e.g., account ID, device ID, etc.) associated with the user. In some embodiments, the user may not be alerted to the collection of this data, so as to avoid the user consciously or subconsciously changing his behaviors knowing that he is being monitored. This may improve the quality of the resulting behavior profile. However, aspects of the present disclosure are not limited to the collection of data in a user-transparent manner, as in some embodiments a user may be made aware of the data collection.

In some embodiments, a security system may collect data points such as those discussed above during a current interaction with an entity purporting to be a particular user. The collected data points may be analyzed and compared against a behavior profile that is indicative of one or more expected behaviors for that user (e.g., a behavior profile established for an anchor value associated with the user). For example, the behavior profile may have been generated using data points collected during previous interactions with that user (e.g., previous interactions from which the anchor value is observed). If the data points collected during the current interaction matches the behavior profile, the verification may be deemed to have been completed successfully. Otherwise, the security system may determine one or more actions to be taken, including, but not limited to, prompting the entity to participate in an active verification task.

Figure 20:
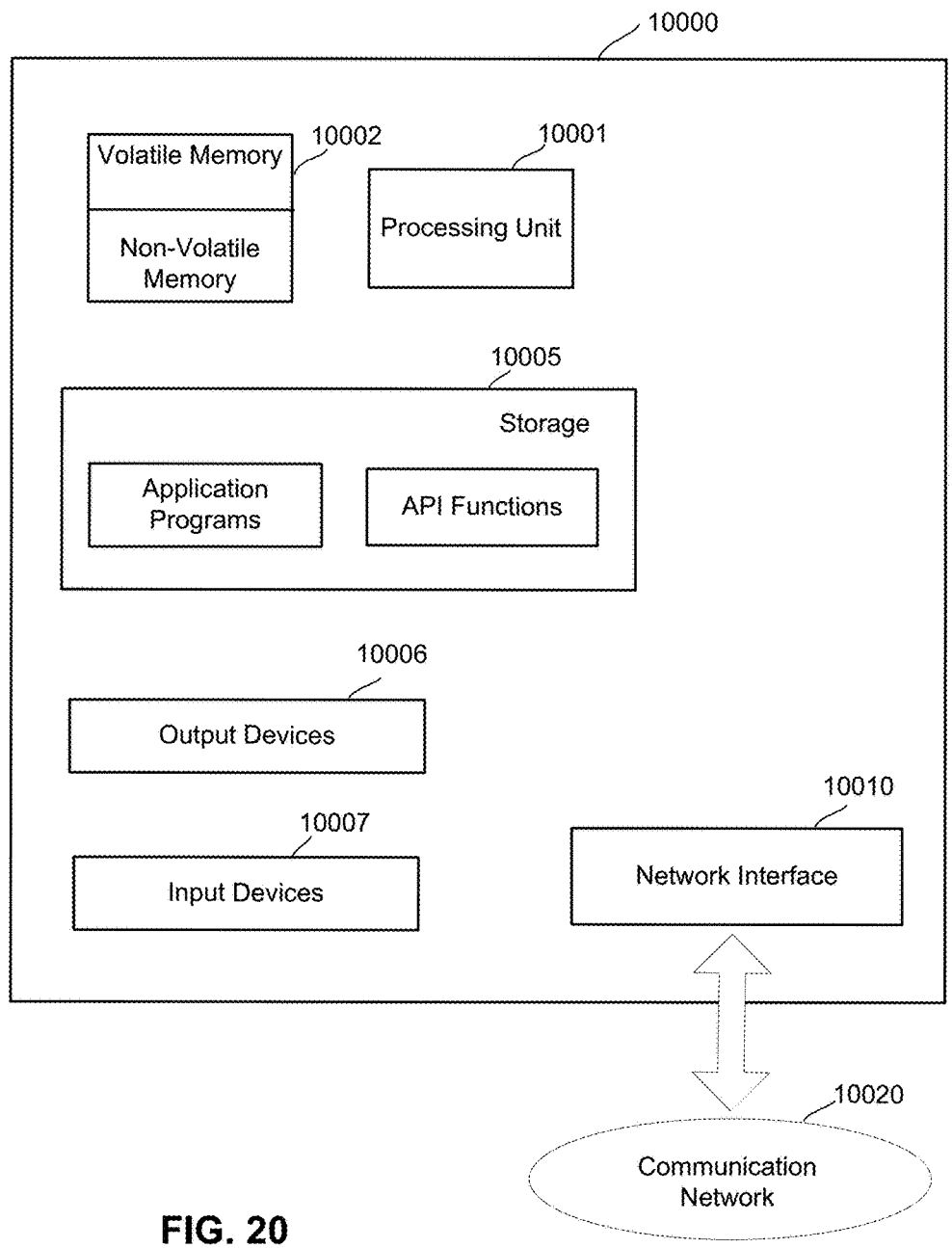
FIG. 20 shows, schematically, an illustrative computer 1000 on which any aspect of the present disclosure may be implemented.

FIG. 20 shows, schematically, an illustrative computer 10000 on which any aspect of the present disclosure may be implemented. In the embodiment shown in FIG. 20, the computer 10000 includes a processing unit 10001 having one or more processors and a non-transitory computer-readable storage medium 10002 that may include, for example, volatile and/or non-volatile memory. The memory 10002 may store one or more instructions to program the processing unit 10001 to perform any of the functions described herein. The computer 10000 may also include other types of non-transitory computer-readable medium, such as storage 10005 (e.g., one or more disk drives) in addition to the system memory 10002. The storage 10005 may also store one or more application programs and/or external components used by application programs (e.g., software libraries), which may be loaded into the memory 10002.

The computer 10000 may have one or more input devices and/or output devices, such as devices 10006 and 10007 illustrated in FIG. 20. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 10007 may include a microphone for capturing audio signals, and the output devices 10006 may include a display screen for visually rendering, and/or a speaker for audibly rendering, recognized text.

As shown in FIG. 20, the computer 10000 may also comprise one or more network interfaces (e.g., the network interface 10010) to enable communication via various networks (e.g., the network 10020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A computer-implemented method for analyzing a web site or mobile device app interaction, the method comprising acts of:
   identifying an anchor value X from the web site or mobile device app interaction;
   identifying, in a record of the web site or mobile device app interaction, a data structure associated with an anchor type T of the anchor value X, wherein a plurality of anchor values of the anchor type T are divided into a plurality of buckets of anchor values, and wherein the anchor type T is selected from a group consisting of network address, account identifier, email address, phone number, credit card number, location, device characteristic, and device identifier;
   identifying a bucket B of the plurality of buckets of anchor values, wherein the anchor value X falls into the bucket B;
   operating on the data structure associated with the anchor type T to indicate that at least one anchor value from the bucket B has been observed in connection with the web site or mobile device app interaction;
   looking up the anchor value X in the data structure associated with the anchor type T to determine if the anchor value X has been stored in the data structure associated with the anchor type T;
   in response to determining that the anchor value X has not been stored in the data structure associated with the anchor type T, storing the anchor value X in the data structure associated with the anchor type T;
   using the data structure associated with the anchor type T to generate a score indicative of a level of risk associated with the web site or mobile device app interaction; and if the score is above a selected threshold, alerting an operator of a web site or mobile device app via which the web site or mobile device app interaction is conducted.

2. The computer-implemented method of claim 1, wherein:
the plurality of anchor values of the anchor type T are divided into a plurality of buckets of anchor values at least in part by applying a hash-modding operation on the plurality of anchor values of the anchor type T.

3. The computer-implemented method of claim 2, wherein:
the hash-modding operation divides the plurality of anchor values of the anchor type T into M buckets;
the data structure associated with the anchor type T comprises an M-bit value, wherein each bit of the M-bit value corresponds to a respective bucket of the M buckets; and
operating on the data structure associated with the anchor type T to indicate that at least one anchor value from the bucket B has been observed in connection with the web site or mobile device app interaction comprises setting a bit of the M-bit value to 1, the bit corresponding to the bucket B.

4. The computer-implemented method of claim 1, wherein:
the data structure associated with the anchor type T is configured to store N distinct anchor values of the anchor type T.

5. The computer-implemented method of claim 4, further comprising an act of:
determining if N distinct anchor values have been stored in the data structure associated with the anchor type T, wherein:
the anchor value X is stored in the data structure associated with the anchor type T in response to determining that fewer than N distinct anchor values have been stored in the data structure associated with the anchor type T.

6. The computer-implemented method of claim 4, wherein:
if N distinct anchor values have been stored in the data structure associated with the anchor type T, the anchor value X replaces an oldest anchor value in the data structure associated with the anchor type T.

7. The computer-implemented method of claim 4, further comprising acts of:
determining if N distinct anchor values have been stored in the data structure associated with the anchor type T; and
determining if the anchor value X has a higher utility than at least one anchor value stored in the data structure associated with the anchor type T, wherein:
the anchor value X is stored in the data structure associated with the anchor type T in response to determining that N distinct anchor values have been stored in the data structure associated with the anchor type T, but the anchor value X has a higher utility than at least one anchor value stored in the data structure associated with the anchor type T; and
the anchor value X replaces a lowest utility anchor value in the data structure associated with the anchor type T.

8. The computer-implemented method of claim 1, wherein:
the record of the web site or mobile device app interaction comprises a plurality of data structures associated, respectively, with a plurality of anchor types; and
for each anchor type of the plurality of anchor types, the data structure associated with that anchor type stores a plurality of distinct anchor values of that anchor type.

9. A system comprising at least one processor and at least one computer-readable storage medium having stored thereon instructions which, when executed, program the at least one processor to perform a method for analyzing a web site or mobile device app interaction, the method comprising acts of:
identifying an anchor value X from the web site or mobile device app interaction;
identifying, in a record of the web site or mobile device app interaction, a data structure associated with an anchor type T of the anchor value X, wherein a plurality of anchor values of the anchor type T are divided into a plurality of buckets of anchor values, and wherein the anchor type T is selected from a group consisting of network address, account identifier, email address, phone number, credit card number, location, device characteristic, and device identifier;
identifying a bucket B of the plurality of buckets of anchor values, wherein the anchor value X falls into the bucket B;
operating on the data structure associated with the anchor type T to indicate that at least one anchor value from the bucket B has been observed in connection with the web site or mobile device app interaction;
looking up the anchor value X in the data structure associated with the anchor type T to determine if the anchor value X has been stored in the data structure associated with the anchor type T;
in response to determining that the anchor value X has not been stored in the data structure associated with the anchor type T, storing the anchor value X in the data structure associated with the anchor type T;
using the data structure associated with the anchor type T to generate a score indicative of a level of risk associated with the web site or mobile device app interaction; and
if the score is above a selected threshold, alerting an operator of a web site or mobile device app via which the web site or mobile device app interaction is conducted.

10. The system of claim 9, wherein:
the plurality of anchor values of the anchor type T are divided into a plurality of buckets of anchor values at least in part by applying a hash-modding operation on the plurality of anchor values of the anchor type T.

11. The system of claim 10, wherein:
the hash-modding operation divides the plurality of anchor values of the anchor type T into M buckets;
the data structure associated with the anchor type T comprises an M-bit value, wherein each bit of the M-bit value corresponds to a respective bucket of the M buckets; and
operating on the data structure associated with the anchor type T to indicate that at least one anchor value from the bucket B has been observed in connection with the web site or mobile device app interaction comprises setting a bit of the M-bit value to 1, the bit corresponding to the bucket B.

12. The system of claim 9, wherein:
the data structure associated with the anchor type T is configured to store N distinct anchor values of the anchor type T.

13. The system of claim 12, wherein the method further comprises an act of:
determining if N distinct anchor values have been stored in the data structure associated with the anchor type T, wherein:
the anchor value X is stored in the data structure associated with the anchor type T in response to determining that fewer than N distinct anchor values have been stored in the data structure associated with the anchor type T.

14. The system of claim 12, wherein:
if N distinct anchor values have been stored in the data structure associated with the anchor type T, the anchor value X replaces an oldest anchor value in the data structure associated with the anchor type T.

15. The system of claim 12, wherein the method further comprises acts of:
determining if N distinct anchor values have been stored in the data structure associated with the anchor type T; and
determining if the anchor value X has a higher utility than at least one anchor value stored in the data structure associated with the anchor type T, wherein:
the anchor value X is stored in the data structure associated with the anchor type T in response to determining that N distinct anchor values have been stored in the data structure associated with the anchor type T, but the anchor value X has a higher utility than at least one anchor value stored in the data structure associated with the anchor type T; and
the anchor value X replaces a lowest utility anchor value in the data structure associated with the anchor type T.

16. The system of claim 9, wherein:
the record of the web site or mobile device app interaction comprises a plurality of data structures associated, respectively, with a plurality of anchor types; and
for each anchor type of the plurality of anchor types, the data structure associated with that anchor type stores a plurality of distinct anchor values of that anchor type.

17. At least one non-transitory computer-readable storage medium having stored thereon instructions which, when executed, program at least one processor to perform a method for analyzing a web site or mobile device app interaction, the method comprising acts of:
identifying an anchor value X from the web site or mobile device app interaction;
identifying, in a record of the web site or mobile device app interaction, a data structure associated with an anchor type T of the anchor value X, wherein a plurality of anchor values of the anchor type T are divided into a plurality of buckets of anchor values, and wherein the anchor type T is selected from a group consisting of network address, account identifier, email address, phone number, credit card number, location, device characteristic, and device identifier;
identifying a bucket B of the plurality of buckets of anchor values, wherein the anchor value X falls into the bucket B;
operating on the data structure associated with the anchor type T to indicate that at least one anchor value from the bucket B has been observed in connection with the web site or mobile device app interaction;
looking up the anchor value X in the data structure associated with the anchor type T to determine if the anchor value X has been stored in the data structure associated with the anchor type T;
in response to determining that the anchor value X has not been stored in the data structure associated with the anchor type T, storing the anchor value X in the data structure associated with the anchor type T;
using the data structure associated with the anchor type T to generate a score indicative of a level of risk associated with the web site or mobile device app interaction; and
if the score is above a selected threshold, alerting an operator of a web site or mobile device app via which the web site or mobile device app interaction is conducted.

18. The at least one non-transitory computer-readable storage medium of claim 17, wherein:
the plurality of anchor values of the anchor type T are divided into a plurality of buckets of anchor values at least in part by applying a hash-modding operation on the plurality of anchor values of the anchor type T.

19. The at least one non-transitory computer-readable storage medium of claim 18, wherein:
the hash-modding operation divides the plurality of anchor values of the anchor type T into M buckets;
the data structure associated with the anchor type T comprises an M-bit value, wherein each bit of the M-bit value corresponds to a respective bucket of the M buckets; and
operating on the data structure associated with the anchor type T to indicate that at least one anchor value from the bucket B has been observed in connection with the web site or mobile device app interaction comprises setting a bit of the M-bit value to 1, the bit corresponding to the bucket B.

20. The at least one non-transitory computer-readable storage medium of claim 17, wherein:
the data structure associated with the anchor type T is configured to store N distinct anchor values of the anchor type T.

21. The at least one non-transitory computer-readable storage medium of claim 20, wherein the method further comprises an act of:
determining if N distinct anchor values have been stored in the data structure associated with the anchor type T, wherein:
the anchor value X is stored in the data structure associated with the anchor type T in response to determining that fewer than N distinct anchor values have been stored in the data structure associated with the anchor type T.

22. The at least one non-transitory computer-readable storage medium of claim 20, wherein:
if N distinct anchor values have been stored in the data structure associated with the anchor type T, the anchor value X replaces an oldest anchor value in the data structure associated with the anchor type T.

23. The at least one non-transitory computer-readable storage medium of claim 20, wherein the method further comprises acts of:
determining if N distinct anchor values have been stored in the data structure associated with the anchor type T; and
determining if the anchor value X has a higher utility than at least one anchor value stored in the data structure associated with the anchor type T, wherein:

the anchor value X is stored in the data structure associated with the anchor type T in response to determining that N distinct anchor values have been stored in the data structure associated with the anchor type T, but the anchor value X has a higher utility than at least one anchor value stored in the data structure associated with the anchor type T; and the anchor value X replaces a lowest utility anchor value in the data structure associated with the anchor type T.

24. The at least one non-transitory computer-readable storage medium of claim 17, wherein:

the record of the web site or mobile device app interaction comprises a plurality of data structures associated, respectively, with a plurality of anchor types; and for each anchor type of the plurality of anchor types, the data structure associated with that anchor type stores a plurality of distinct anchor values of that anchor type.

* * * * *